(12) United States Patent
Morisawa et al.

(10) Patent No.: US 11,012,674 B2
(45) Date of Patent: May 18, 2021

(54) INFORMATION PROCESSING APPARATUS, IMAGE GENERATION METHOD, CONTROL METHOD, AND PROGRAM

(71) Applicant: CANON KABUSHIKI KAISHA, Tokyo (JP)

(72) Inventors: Keisuke Morisawa, Kawasaki (JP); Masahiro Handa, Tokyo (JP); Michio Aizawa, Yokohama (JP); Shogo Mizuno, Tokyo (JP); Katsumasa Tanaka, Kawasaki (JP); Akihiro Matsushita, Tokyo (JP); Tomohiro Yano, Yokohama (JP); Mai Komiyama, Kamakura (JP); Kenichi Fujii, Tokyo (JP); Atsushi Date, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 16/303,461

(22) PCT Filed: May 22, 2017

(86) PCT No.: PCT/JP2017/019076
§ 371 (c)(1),
(2) Date: Nov. 20, 2018

(87) PCT Pub. No.: WO2017/204171
PCT Pub. Date: Nov. 30, 2017

(65) Prior Publication Data
US 2020/0336719 A1    Oct. 22, 2020

(30) Foreign Application Priority Data

May 25, 2016    (JP) ............................. JP2016-104431

(51) Int. Cl.
*G06T 15/20*    (2011.01)
*H04N 13/111*    (2018.01)
(Continued)

(52) U.S. Cl.
CPC .......... *H04N 13/111* (2018.05); *G06T 15/205* (2013.01); *H04N 5/232941* (2018.08);
(Continued)

(58) Field of Classification Search
None
See application file for complete search history.

(56) References Cited

U.S. PATENT DOCUMENTS

2002/0030675 A1*  3/2002  Kawai ................. H04N 13/178
                                                                345/204
2012/0307092 A1   12/2012  Kotani
(Continued)

FOREIGN PATENT DOCUMENTS

CN    103650492 A    3/2014
JP    2004-086508 A  3/2004
(Continued)

*Primary Examiner* — Tapas Mazumder
(74) *Attorney, Agent, or Firm* — Canon U.S.A., Inc. IP Division

(57) ABSTRACT

An information processing apparatus for a system generates a virtual viewpoint image based on image data obtained by performing imaging from a plurality of directions using a plurality of cameras. The information processing apparatus includes a determination unit configured to determine a generation method for generating a virtual viewpoint image using the image data from among a plurality of generation methods depending on a situation of imaging using the plurality of cameras, and an output unit configured to output data in accordance with a result of the determination performed by the determination unit.

13 Claims, 52 Drawing Sheets

(51) Int. Cl.
  *H04N 5/232*     (2006.01)
  *H04N 13/239*    (2018.01)
  *H04N 13/243*    (2018.01)
  *H04N 21/218*    (2011.01)

(52) U.S. Cl.
  CPC ......... *H04N 13/239* (2018.05); *H04N 13/243* (2018.05); *H04N 21/21805* (2013.01)

(56) References Cited

U.S. PATENT DOCUMENTS

2014/0132718 A1* 5/2014 Suh .................. H04N 21/816
                                                           348/43
2016/0165148 A1   6/2016 Itoh et al.
2017/0293413 A1* 10/2017 Matsushita ............ H04N 5/247

FOREIGN PATENT DOCUMENTS

| JP | 2009211335 A   | 9/2009  |
| JP | 2010020487 A   | 1/2010  |
| JP | 2011-198349 A  | 10/2011 |
| JP | 2012-253626 A  | 12/2012 |
| JP | 2015019271 A   | 1/2015  |
| KR | 10-2014-0039231 A | 4/2014 |
| WO | 2011/105044 A1 | 9/2011  |
| WO | 2015/054235 A1 | 4/2015  |

* cited by examiner

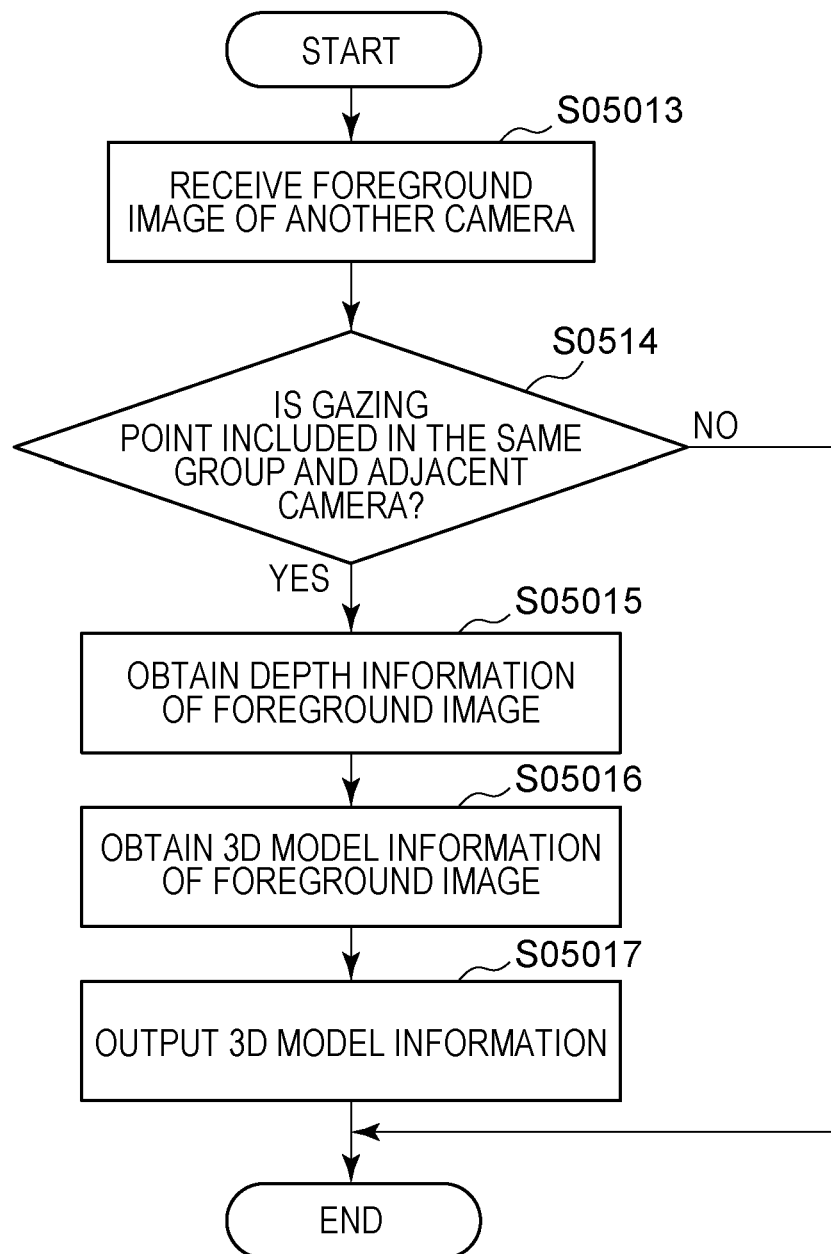

FIG. 46

| | 46101 | 46102 | 46103 | 46104 | 46105 | 46106 | 46107 | 46108 | |
|---|---|---|---|---|---|---|---|---|---|
| IMAGING NUMBER | NAME OF GAME | ESTIMATED TIME: START | ESTIMATED TIME: END | GAZING POINT (COORDINATE); THE NUMBER OF GAZING POINTS; POSITIONS OF GAZING POINT AND TARGET CAMERA | CAMERAWORK | CALIBRATION FILE | TYPE OF IMAGE GENERATION ALGORITHM | FOREGROUND/BACKGROUND TRANSMISSION (FG: FOREGROUND/BG: BACKGROUND) COMPRESSION RATE | FRAME RATE (fps) |
| 1 | OPENING CEREMONY | 10:00am | 11:30am | THE NUMBER OF GAZING POINTS = 2 (1) CENTER OF FIELD (COORDINATE), Gr (1) CAMERA NUMBER (2) ENTRANCE GATE (COORDINATE), Gr (2) CAMERA NUMBER | (1) ALL AROUND (2) HALF AROUND | (1) CAL1_1 (2) CAL1_2 | IBR | FG 1/10 BG 1/30 | FG 30 BG 5 |
| 2 | SOCCER | 12:00pm | 2:30pm | THE NUMBER OF GAZING POINTS = 1 (1) CENTER OF FIELD, Gr (1) CAMERA NUMBER | (1) ALL AROUND | (1) CAL2_1 | MBR/IBR | FG 1/3 BG NON | FG 60 BG NON |
| 3 | SHOT-PUTTING HIGH-JUMP | 3:00pm | 5:00pm | THE NUMBER OF GAZING POINTS = 2 (1) POSITION OF PLAYER OF SHOT-PUTTING, Gr (1) CAMERA NUMBER (2) CENTER OF BAR OF HIGH-JUMP, Gr (2) CAMERA NUMBER | (1) ROTATION TO TRAJECTORY OF SHOT (2) ROTATION | (1) CAL3_1 (2) CAL3_2 | MBR | FG NON-COMPRESSION BG NON | FG 30 BG NON |

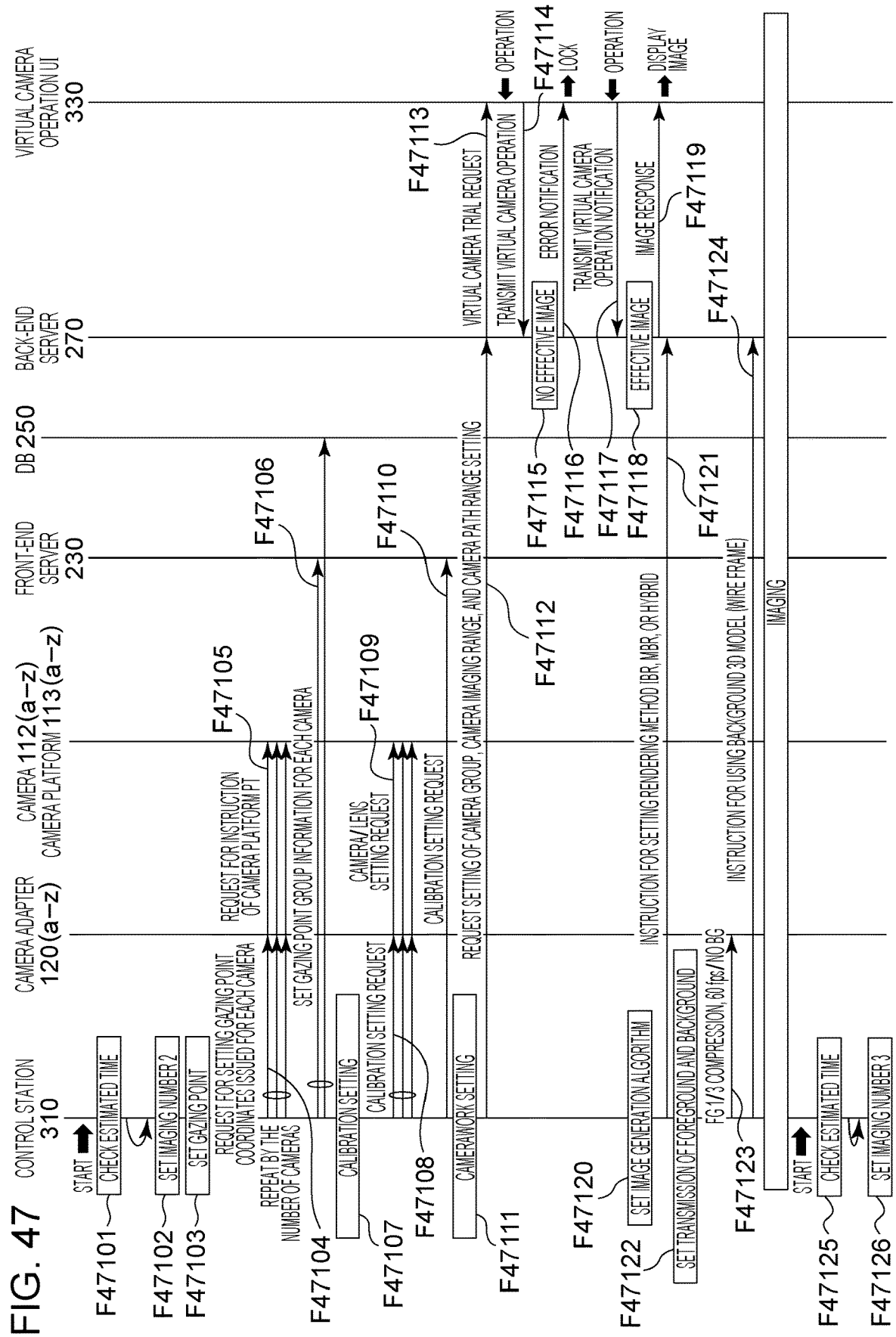

INFORMATION PROCESSING APPARATUS, IMAGE GENERATION METHOD, CONTROL METHOD, AND PROGRAM

CROSS-REFERENCE TO RELATED APPLICATIONS

The present application is a National Phase application of International Patent Application No. PCT/JP2017/019076, filed May 22, 2017, entitled "INFORMATION PROCESSING APPARATUS, IMAGE GENERATION METHOD, CONTROL METHOD, AND PROGRAM", which claims priority to Japanese Patent Application No. 2016-104431, filed on May 25, 2016, all of which are hereby expressly incorporated by reference herein in their entirety.

TECHNICAL FIELD

The present invention relates to a system for generating a virtual viewpoint image.

BACKGROUND ART

In recent years, a technique of generating virtual viewpoint content using multiple viewpoint images obtained by performing synchronous imaging from multiple viewpoints by different camera installed in different positions has attracted attention. According to the technique of generating virtual viewpoint content using multiple viewpoint images described above, a user may view a highlight scene of soccer or basketball in various angles with higher realistic sensations when compared with normal images.

The generation and browsing of the virtual viewpoint content based on the multiple viewpoint images may be realized by collecting images captured by a plurality of cameras in an image processor, performing processes including 3D model generation and rendering using the image processor, and transmitting the processed images to a user terminal.

Furthermore, PTL 1 discloses a technique of displaying a moving image by selectively using, among a plurality of rendering methods, a highest detailing method for completion of rendering for one frame within a frame period of the moving image.

However, in the technique disclosed in PTL 1, a method for generating a virtual viewpoint image may not be appropriately determined. For example, a designation available range of a viewpoint associated with generation of a virtual viewpoint image or the number of cameras required for generation of a virtual viewpoint image having sufficient image quality may vary. Specifically, in a method for generating a virtual viewpoint image by a projection conversion process, for example, the designation available range may be narrow. In a method for generating a virtual viewpoint image using a 3D model, if the number of cameras is small, accuracy of model generation may be lowered. In such cases, if a generation method appropriate for a situation is not employed, an appropriate virtual viewpoint image may not be generated.

CITATION LIST

Patent Literature

PTL 1: Japanese Patent Laid-Open No. 2004-86508

SUMMARY OF INVENTION

According to an embodiment of the present invention, an information processing apparatus for a system generates a virtual viewpoint image based on image data obtained by performing imaging from a plurality of directions using a plurality of cameras. The information processing apparatus includes a determination unit configured to determine a generation method for generating a virtual viewpoint image using the image data from among a plurality of generation methods depending on a situation of imaging using the plurality of cameras, and an output unit configured to output data in accordance with a result of the determination performed by the determination unit.

Further features of the present invention will become apparent from the following description of exemplary embodiments with reference to the attached drawings.

BRIEF DESCRIPTION OF DRAWINGS

FIG. 35E is a flowchart of separation between a foreground and a background.

FIG. 46 is a diagram illustrating a setting list generated by the workflow performed after installation.

FIG. 47 is a sequence diagram illustrating a process of changing setting information performed by the control station.

DESCRIPTION OF EMBODIMENT

Figure 1:
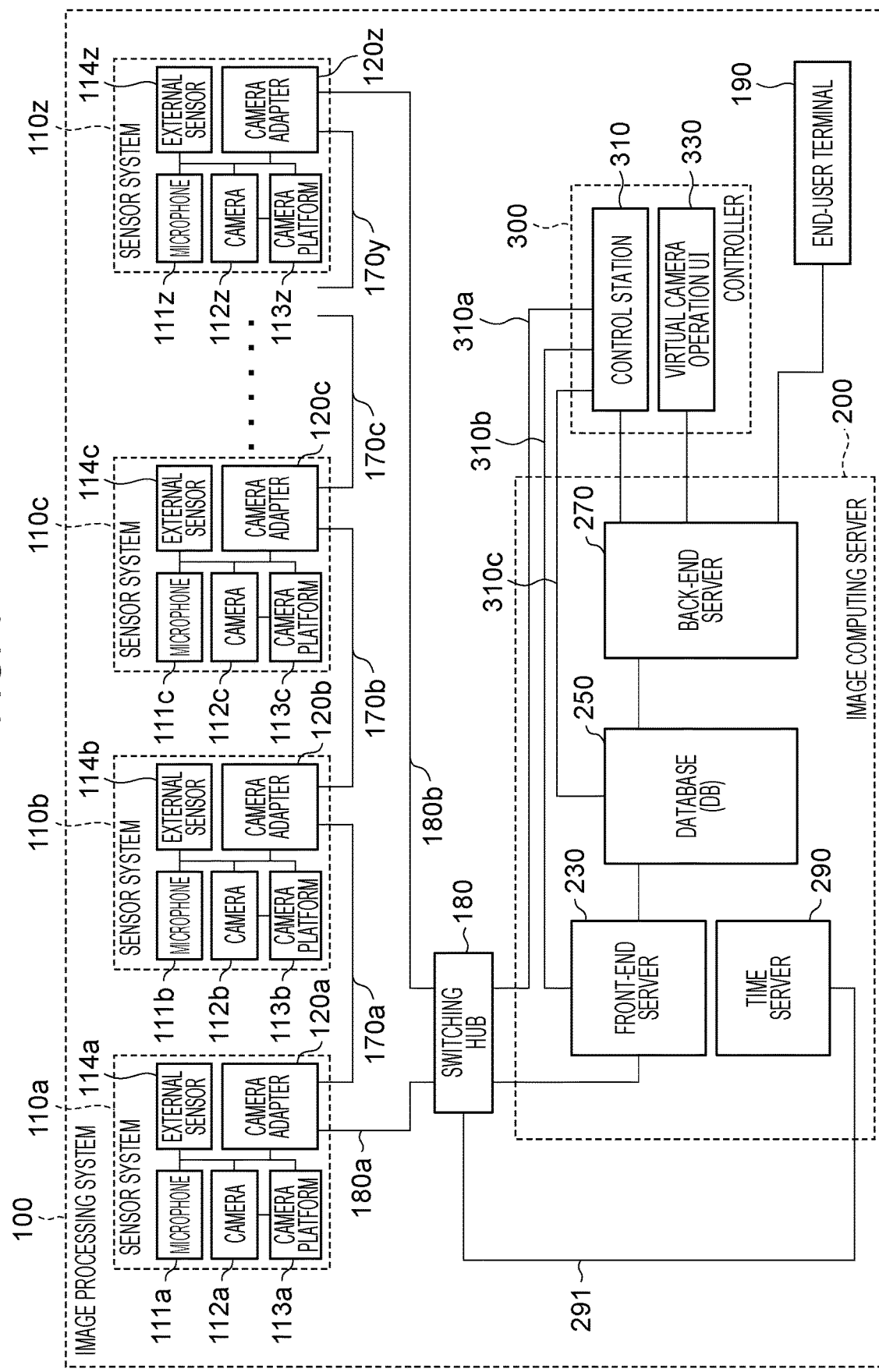
FIG. 1 is a diagram illustrating a configuration of an image processing system.

A system in which a plurality of cameras and a plurality of microphones are installed so as to capture images and collect sound in stadiums and concert halls will be described with reference to a diagram of a system configuration illustrated in FIG. 1. An image processing system 100 includes sensor systems 110a to 110z, an image computing server 200, a controller 300, a switching hub 180, and an end-user terminal 190.

The controller 300 includes a control station 310 and a virtual camera operation user interface (UI) 330. The control station 310 performs management of operation states, control of a parameter setting, and the like on blocks included in the image processing system 100 through networks 310a to 310c, networks 180a and 180b, and networks 170a to 170y. Here, the networks may be GbE (gigabit Ethernet (registered trademark)) or 10 GbE based on the IEEE standard which is the Ethernet or a combination of an interconnect Infiniband, an industrial Ethernet, and the like. Alternatively, the networks are not limited to these and other types of network may be employed.

First, an operation of transmitting 26 sets of images and sound of the sensor systems 110a to 110z from the sensor system 110z to the image computing server 200 will be described. In the image processing system 100 of this embodiment, the sensor systems 110a to 110z are connected to one another by daisy chain.

In this embodiment, the 26 sets of systems of the sensor systems 110a to 110z are not distinguished from one another and described as a sensor system 110 unless otherwise described. Similarly, devices included in each of the sensor systems 110 are not distinguished and are described as a microphone 111, a camera 112, a camera platform 113, an external sensor 114, and a camera adapter 120 unless otherwise described. Note that 26 which is the number of sensor systems is merely an example, and the number of sensor systems is not limited to this. Furthermore, the plurality of sensor systems 110 may not have the same configuration and may be different types of device, for example. Note that, in this embodiment, a term "image" includes a concept of a moving image and a still image unless otherwise noted. Specifically, the image processing system 100 of this embodiment is capable of processing both of still images and moving images. Furthermore, although a case where virtual viewpoint content provided by the image processing system 100 includes a virtual viewpoint image and a virtual viewpoint sound is mainly described in this embodiment, the present invention is not limited to this. For example, the virtual viewpoint content may not include sounds. Furthermore, sound included in the virtual viewpoint content may be collected by a microphone positioned closest to a virtual viewpoint, for example. Furthermore, although description of sound is partially omitted for simplicity of description in this embodiment, an image and sound is basically processed at the same time.

The sensor systems 110a to 110z have respective cameras 112a to 112z. Specifically, the image processing system 100 includes a plurality of cameras 112 for capturing images of an object from a plurality of directions. Although the plurality of cameras 112 are described by the same reference numerals, capabilities and types of the cameras 112 may be different from one another. The plurality of sensor systems 110 are connected to one another through the daisy chain. With this connection form, effects of reduction of the number of connection cables and reduction of wiring works may be attained when an amount of image data is increased due to high resolution and a high frame rate required for 4K or 8K of captured images.

Note that the connection form is not limited to this and a star type network configuration in which the sensor systems 110a to 110z are individually connected to the switching hub 180 and perform data transmission and reception through the switching hub 180 may be employed.

Although all the sensor systems 110a to 110z are connected by cascade connection so that the daisy chain is configured in FIG. 1, the connection form is not limited to this. For example, the plurality of sensor systems 110 may be divided into groups and the sensor systems 110 may be connected by the daisy chain in a unit of group obtained by the division. Then the camera adapters 120 serving as terminals of the division units may be connected to the switching hub 180 so that images are supplied to the image computing server 200. Such a configuration is particularly effective in stadiums. It is assumed here that a stadium has a plurality of floors and the sensor systems 110 are installed in the individual floors. In this case, input to the image computing server 200 may be performed for each floor or for each half circumference of the stadium, and accordingly, installation of the sensor systems 110 may be simplified and the image processing system 100 may be flexible even in a location where wiring of all the sensor systems 110 by one daisy chain is difficult.

Furthermore, control of an image process performed by the image computing server 200 is changed depending on a result of a determination as to whether the number of camera adapters 120 which are connected by the daisy chain and which perform image input to the image computing server 200 is 1 or 2 or more. Specifically, the control is changed depending on a result of a determination as to whether the sensor systems 110 are divided in a plurality of groups. In a case where only one camera adapter 120 performs image input, an image of an all-around the stadium is generated while image transmission is performed by the daisy chin connection, and therefore, timings when the image computing server 200 obtains image data for all-around the stadium are synchronized. Specifically, if the sensor systems 110 are not divided into groups, synchronization is attained.

However, in a case where a plurality of camera adapters 120 are used for image input, different delays for a period from when an image is captured to when the image is input to the image computing server 200 may occur in different lanes (paths) of the daisy chain. Specifically, when the sensor systems 110 are divided into groups, timings when the image computing server 200 obtains image data for all around the stadium may not be synchronized. Therefore, in the image computing server 200, an image process is to be performed in a later stage while a mass of image data is checked by synchronization control in which synchronization is performed by waiting image data for all around the stadium.

In this embodiment, the sensor system 110a includes a microphone 111a, a camera 112a, a camera platform 113a, an external sensor 114a, and a camera adapter 120a. Note that the configuration is not limited to this as long as the sensor system 110a includes at least one camera adapter 120a and one camera 112a or one microphone 111a. Furthermore, the sensor system 110a may include one camera adapter 120a and a plurality of cameras 112a or include one camera 112a and a plurality of camera adapters 120a, for example. Specifically, the plurality of cameras 112 and the plurality of camera adapters 120 included in the image processing system 100 have the relationship of a ratio of N:M (N and M are integers not less than 1). Furthermore, the sensor system 110 may include devices, in addition to the microphone 11a, the camera 112a, the camera platform 113a, and the camera adapter 120a. Moreover, the camera 112 and the camera adapter 120 may be integrated with each other. Furthermore, a front-end server 230 may have at least a portion of a function of the camera adapter 120. Since the sensor systems 110b to 110z have configurations the same as that of the sensor system 110a, descriptions of the configurations of the sensor systems 110b to 110z are omitted. Note that the configurations are not limited to the configuration of the sensor system 110a and the different sensor systems 110 may have different configurations.

Sound collected by the microphone 111a and an image captured by the camera 112a are subjected to image processing described below performed by the camera adapter 120a before being transmitted to a camera adapter 120b included in the sensor system 110b through a daisy chain 170a. Similarly, the sensor system 110b transmits collected sound and a captured image, in addition to the image and the sound supplied from the sensor system 110a, to the sensor system 110c.

By continuously performing the operation described above, images and sound obtained by the sensor systems 110a to 110z are transmitted to the switching hub 180 from the sensor system 110z through the network 180b before being transmitted to the image computing server 200.

Note that, although the cameras 112a to 112z are separated from the camera adapters 120a to 120z in this embodiment, the cameras 112a to 112z and the camera adapters 120a to 120z may be integrated in the same cases. In this case, the microphones 111a to 111z may be incorporated in the integrated camera 112 or externally connected to the camera 112.

Next, a configuration and an operation of the image computing server 200 will be described. The image computing server 200 of this embodiment processes data obtained from the sensor system 110z. The image computing server 200 includes the front-end server 230, a database 250 (hereinafter also referred to as a "DB"), a back-end server 270, and a time server 290.

The time server 290 has a function of delivering a time and a synchronization signal, and delivers a time and a synchronization signal to the sensor systems 110a to 110z through the switching hub 180. The camera adapters 120a to 120z which have received the time and the synchronization signal performs generator locking (Genlock) on the cameras 112a to 112z based on the time and the synchronization signal so as to perform image frame synchronization. Specifically, the time server 290 synchronizes imaging timings of the plurality of cameras 112. By this, the image processing system 100 may generate a virtual viewpoint image based on a plurality of images captured at the same timing, and therefore, degradation of quality of the virtual viewpoint image caused by a difference among the imaging timings may be suppressed. Although the time server 290 manages the time synchronization of the plurality of cameras 112 in this embodiment, the present invention is not limited to this and the individual cameras 112 or the individual camera adapters 120 may perform a process for the time synchronization.

The front-end server 230 reconstructs segmented transmission packets using images and sound obtained from the sensor system 110z and converts a data format before writing the images and the sound into the database 250 in accordance with identifiers of the cameras, data types, and frame numbers.

Next, the back-end server 270 receives specifying of a viewpoint from the virtual camera operation UI 330, reads an image and sound data from the database 250 in accordance with the received viewpoint, and generates a virtual viewpoint image by performing a rendering process.

The configuration of the image computing server 200 is not limited to this. For example, at least two of the front-end server 230, the database 250, and the back-end server 270 may be integrated. Furthermore, at least one of the front-end server 230, the database 250, and the back-end server 270 may be included in plural in the image computing server 200. A device other than the devices described above may be included in an arbitrary position of the image computing server 200. Moreover, the end-user terminal 190 or the virtual camera operation UI 330 may have at least some of functions of the image computing server 200.

An image which has been subjected to the rendering process is transmitted from the back-end server 270 to the end-user terminal 190 so that a user who operates the end-user terminal 190 may view the image and listen to sound corresponding to the specified a viewpoint. Specifically, the back-end server 270 generates virtual viewpoint content based on images captured by the plurality of cameras 112 (multiple viewpoint images) and viewpoint information. More specifically, the back-end server 270 generates virtual viewpoint content based on image data of a certain region extracted by the plurality of camera adapters 120 from the images captured by the plurality of cameras 112 and a viewpoint specified by a user operation. The back-end server 270 supplies the generated virtual viewpoint content to the end-user terminal 190. The extraction of a certain region performed by the camera adapters 120 will be described in detail below. Note that the virtual viewpoint content is generated by the image computing server 200 in this embodiment, and in particular, a case where the virtual viewpoint content is generated by the back-end server 270 will be mainly described. However, the virtual viewpoint content may be generated by a device included in the image computing server 200 other than the back-end server 270, or may be generated by the controller 300 or the end-user terminal 190.

The virtual viewpoint content of this embodiment includes a virtual viewpoint image obtained when a subject is imaged from a virtual viewpoint. In other words, the virtual viewpoint image represents a view from the specified viewpoint. A virtual viewpoint may be specified by a user or may be automatically specified based on a result of image analysis or the like. Specifically, examples of the virtual viewpoint image include an arbitrary viewpoint image (a free viewpoint image) corresponding to a viewpoint arbitrarily specified by a user. The examples of the virtual viewpoint image further includes an image corresponding to a viewpoint specified by a user from among a plurality of candidates and an image corresponding to a viewpoint automatically specified by a device. Although a case where the virtual viewpoint content includes sound data (audio data) is mainly described as an example in this embodiment, the sound data may not be included in the virtual viewpoint content. Furthermore, the back-end server 270 may perform compression coding on the virtual viewpoint image in accordance with a coding method, such as H.264 or HEVC before transmitting the virtual viewpoint image to the end-user terminal 190 using an MPEG-DASH protocol. Furthermore, the virtual viewpoint image may be transmitted to the end-user terminal 190 without compression. In particular, the former method using the compression coding is employed when a smart phone or a tablet is used as the end-user terminal 190 whereas the latter method without compression is employed when a display capable of displaying an uncompressed image is used. Specifically, an image format is changeable depending on a type of the end-user terminal 190. Furthermore, the transmission protocol of an image is not limited to MPEG-DASH, HTTP live streaming (HLS) or other transmission methods may be used.

As described above, the image processing system 100 has three functional domains, i.e., a video collection domain, a data storage domain, and a video generation domain. The video collection domain includes the sensor systems 110a to 110z, the data storage domain includes the database 250, the front-end server 230, and the back-end server 270, and the video generation domain includes the virtual camera operation UI 330, and the end-user terminal 190. The configuration is not limited to this, and the virtual camera operation UI 330 may directly obtain images from the sensor systems 110a to 110z, for example. However, a method for arranging the data storage function in an intermediate portion is employed instead of the method for directly obtaining images from the sensor systems 110a to 110z in this embodiment. Specifically, the front-end server 230 converts image data and sound data generated by the sensor systems 110a to 110z and metadata of the data into common schema and a common data type of the database 250. By this, even if a type of the cameras 112 of the sensor systems 110a to 110z is changed to another type, a difference in the change may be absorbed by the front-end server 230 and registered in the database 250. Accordingly, possibility that the virtual camera operation UI 330 does not appropriately operate when a type of the cameras 112 is changed to another type may be reduced.

Furthermore, the virtual camera operation UI 330 does not directly access the database 250 but accesses the database 250 through the back-end server 270. The back-end server 270 performs a common process associated with an image generation process, and the virtual camera operation UI 330 processes a difference portion of an application associated with an operation UI. Accordingly, development of the virtual camera operation UI 330, development of a UI operation device, and development for functional requirements of an UI for operating a virtual viewpoint image to be generated may be focused on. Furthermore, the back-end server 270 may add or delete a common process associated with an image generation process in response to a request supplied from the virtual camera operation UI 330. In this way, a request supplied from the virtual camera operation UI 330 is flexibly coped with.

As described above, the back-end server 270 generates a virtual viewpoint image based on image data obtained by imaging performed by the plurality of cameras 112 for capturing images of a subject from a plurality of direction in the image processing system 100. The configuration of the image processing system 100 of this embodiment is not limited to the physical configuration described above, and the image processing system 100 may be logically configured. Furthermore, although a technique of generating a virtual viewpoint image based on images captured by the cameras 112 is described in this embodiment, this embodiment may be employed in a case where a virtual viewpoint image is generated based on images generated by computer graphics instead of captured images, for example.

Next, a functional block diagram of nodes (the camera adapter 120, the front-end server 230, the database 250, the back-end server 270, the virtual camera operation UI 330, and the end-user terminal 190) in the system of FIG. 1 will be described.

A functional block of the camera adapter 120 in this embodiment is described with reference to FIG. 2. Note that a data flow among functional blocks of the camera adapters 120 will be described in detail below with reference to FIG. 29.

The camera adapter 120 includes a network adapter 06110, a transmission unit 06120, an image processor 06130, and an external device controller 06140. The network adapter 06110 includes a data transmission/reception unit 06111 and a time controller 06112.

The data transmission/reception unit 06111 performs data communication with other camera adapters 120, the front-end server 230, the time server 290, and the control station 310 through a daisy chain 170 and networks 291 and 310*a*. For example, the data transmission/reception unit 06111 outputs a foreground image and a background image in an image captured by the camera 112 which are separated by a foreground/background separation unit 06131 to one of the other camera adapters 120, for example. The camera adapter 120 serving as an output destination is one of the camera adapters 120 included in the image processing system 100 which is to be processed next in predetermined order determined in accordance with a process performed by a data routing processor 06122. The individual camera adapters 120 output foreground images and background images, and a virtual viewpoint image is generated based on the foreground images and the background images captured from a plurality of viewpoints. Note that the camera adapters 120 may not output background images but output foreground images separated from captured images.

The time controller 06112 conforms with OrdinaryClock based on the IEEE 1588 standard, for example, has a function of storing a time stamp of data which is transmitted to and received from the time server 290, and performs time synchronization with the time server 290. The time controller 06112 may realize the time synchronization with the time server 290 in accordance with other standards, such as the EtherAVB standard or a unique protocol instead of the IEEE 1588 standard. Although a network interface card (NIC) is used as the network adapter 06110 in this embodiment, other similar interfaces may be used instead of the NIC. Furthermore, the IEEE 1588 is updated as standards, such as the IEEE 1588-2002 or the IEEE 1588-2008, and the IEEE 1588-2008 is also referred to as "precision time protocol version 2 (PTPv2)".

The transmission unit 06120 has a function of controlling transmission of data to the switching hub 180 and the like through the network adapter 06110 and has the following functional units.

A data compression/decompression unit 06121 has a function of performing compression on data transmitted and received through the data transmission/reception unit 06111 using a predetermined compression method, a predetermined compression rate, and a predetermined frame rate and a function of decompressing compressed data.

The data routing processor 06122 determines routing destinations of data received by the data transmission/reception unit 06111 and data processed by the image processor 06130 using data stored in a data routing information storage unit 06125 to be described below. The data routing processor 06122 further has a function of transmitting data to a determined routing destination. The routing destination preferably corresponds to one of the camera adapters 120 which corresponds to one of the cameras 112 which focuses on the same gazing point in terms of image processing since the image frame correlation among the cameras 112 is high. Order of the camera adapters 120 which output the foreground images and the background images in a relay manner in the image processing system 100 is determined in accordance with determinations performed by the data routing processor 06122 of the plurality of camera adapters 120.

A time synchronization controller 06123 conforms to a precision time protocol (PTP) of the IEEE 1588 standard and has a function of performing a process associated with the time synchronization with the time server 290. The time synchronization controller 06123 may perform the time synchronization using, instead of the PTP, other similar protocols.

An image/sound transmission processor 06124 has a function of generating a message for transferring image data or sound data to one of the other camera adapters 120 or the front-end server 230 through the data transmission/reception unit 06111. The message includes the image data or the sound data and metadata of the image data or the sound data. The metadata of this embodiment includes a time code obtained at a time when an image is captured or sound is sampled or a sequence number, a data type, and an identifier of the camera 112 or the microphone 111. Note that the image data to be transmitted or the sound data to be transmitted may be compressed by the data compression/decompression unit 06121. Furthermore, the image/sound transmission processor 06124 receives a message through the data transmission/reception unit 06111 from one of the other camera adapters 120. Thereafter, the image/sound transmission processor 06124 performs restoration on data information which is fragmented in a packet size prescribed by a transmission protocol so as to obtain image data or sound data in accordance with a data type included in the message. Note that, in a case where data is in a compressed state after the data is restored, the data compression/decompression unit 06121 performs the decompression process.

The data routing information storage unit 06125 has a function of storing address information for determining a transmission destination of data transmitted or received by the data transmission/reception unit 06111. A routing method will be described below.

The image processor 06130 has a function of performing a process on image data captured by the camera 112 and image data supplied from one of the other camera adapters 120 under control of a camera controller 06141, and has functional units described below.

The foreground/background separation unit 06131 has a function of separating a foreground image and a background image from each other in image data captured by the camera 112. Specifically, each of the plurality of camera adapters 120 operates as an image processing device which extracts a predetermined region from an image captured by a corresponding one of the plurality of cameras 112. The predetermined region is a foreground image obtained as a result of object detection performed on a captured image, for example. The foreground/background separation unit 06131 separates a foreground image and a background image from each other in a captured image by the extraction. Note that the object corresponds to a person, for example. The object may be a specific person (a player, a coach, and/or a referee) or may be a ball or a goal which has a predetermined image pattern. Alternatively, a moving body may be detected as the object. When a foreground image including an important object, such as a person, and a background region which does not include such an important object are processed after being separated from each other, quality of an image of a portion corresponding to the object in a virtual viewpoint image generated in the image processing system 100 may be improved. Furthermore, the separation between a foreground image and a background image is performed by each of the camera adapters 120 so that a load in the image processing system 100 including the plurality of cameras 112 may be dispersed. Note that the predetermined region may be a background image, for example, instead of a foreground image.

A 3D model information generation unit 06132 has a function of generating image information associated with a 3D model in accordance with a stereo camera principle, for example, using a foreground image separated by the foreground/background separation unit 06131 and a foreground image supplied from one of the other camera adapters 120.

A calibration controller 06133 has a function of obtaining image data required for calibration from the camera 112 through the camera controller 06141 and transmitting the image data to the front-end server 230 which performs a calculation process associated with the calibration. The calibration of this embodiment is a process of associating parameters with the individual camera 112 so as to attain matching. As the calibration, a process of performing control such that world coordinate systems of the installed cameras 112 match one another and a color correction process for suppressing color variation among the cameras 112 are performed, for example. Note that concrete processing content of the calibration is not limited to this. Furthermore, although the calculation process associated with the calibration is performed by the front-end server 230 in this embodiment, a node which performs the calculation process is not limited to the front-end server 230. For example, the calculation process may be performed by another node, such as the control station 310 or the camera adapter 120 (including the other camera adapters 120). The calibration controller 06133 has a function of performing calibration on image data supplied from the camera 112 through the camera controller 06141 during imaging in accordance with a preset parameter (dynamic calibration).

The external device controller 06140 has a function of controlling the devices connected to the camera adapter 120 and has functional blocks described below.

The camera controller 06141 is connected to the camera 112 and has a function of performing control of the camera 112, obtainment of a captured image, supply of a synchronization signal, and a setting of a time. The control of the camera 112 includes settings and reference of imaging parameters (settings of the number of pixels, a color depth, a frame rate, white balance, and the like), an obtainment of a state of the camera 112 (states of imaging, stopping, synchronization, an error, and the like), start and stop of imaging, focus adjustment, and the like. Note that, although the focus adjustment is performed through the camera 112 in this embodiment, when a detachable lens is attached to the camera 112, the camera adapter 120 may be connected to the lens so as to directly adjust the lens. Furthermore, the camera adapter 120 may perform the lens adjustment, such as zoom, through the camera 112. The supply of a synchronization signal is performed when an imaging timing (a control clock) is supplied to the camera 112 using a time when the time synchronization controller 06123 is synchronized with the time server 290. The time setting is performed by supplying the time when the time synchronization controller 06123 is synchronized with the time server 290 as a time code which conforms with a format of SMPTE12M, for example. By this, a time code assigned to image data supplied from the camera 112 is assigned. Note that a format of the time code is not limited to SMPTE12M, and other formats may be employed. Furthermore, the camera controller 06141 may not assign the time code to the camera 112 but may assign the time code to the image data supplied from the camera 112.

A microphone controller 06142 is connected to the microphone 111 and has a function of performing control of the microphone 111, start and stop of sound collection, obtainment of collected sound data, and the like. The control of the microphone 111 includes gain control, an obtainment of a state, and the like. As with the camera controller 06141, the microphone controller 06142 supplies a timing of sound sampling and a time code to the microphone 111. As clock information indicating the timing of sound sampling, time information supplied from the time server 290 is converted into a word clock of 48 KHz, for example, and supplied to the microphone 111.

A camera platform controller 06143 is connected to the camera platform 113 and has a function of controlling the camera platform 113. Examples of control of the camera platform 113 include pan/tilt control and a state obtainment.

A sensor controller 06144 is connected to the external sensor 114 and has a function of obtaining sensor information sensed by the external sensor 114. If a gyro sensor is used as the external sensor 114, for example, information indicating oscillation may be obtained. Using information on the oscillation obtained by the sensor controller 06144, the image processor 06130 may generate an image which is less affected by the oscillation of the camera 112 before the process performed by the foreground/background separation unit 06131. The oscillation information is used when image data obtained by an 8K camera is extracted in a size smaller than an original 8K size taking the oscillation information into consideration and positioning is performed with an image of the camera 112 installed adjacent to the target camera 112. Accordingly, even if structure oscillation of a building is transmitted to the cameras 112 in different frequencies, positioning is performed by this function of the camera adapter 120. As a result, image data which is less affected by the image process (electronically prevented) may be generated, and an effect of reducing a processing load of positioning performed for a number of cameras 112 in the image computing server 200 may be obtained. Note that the sensor of the sensor system 110 is not limited to the external sensor 114, and the same effect may be obtained even if the sensor is incorporated in the camera adapter 120.

Figure 3:
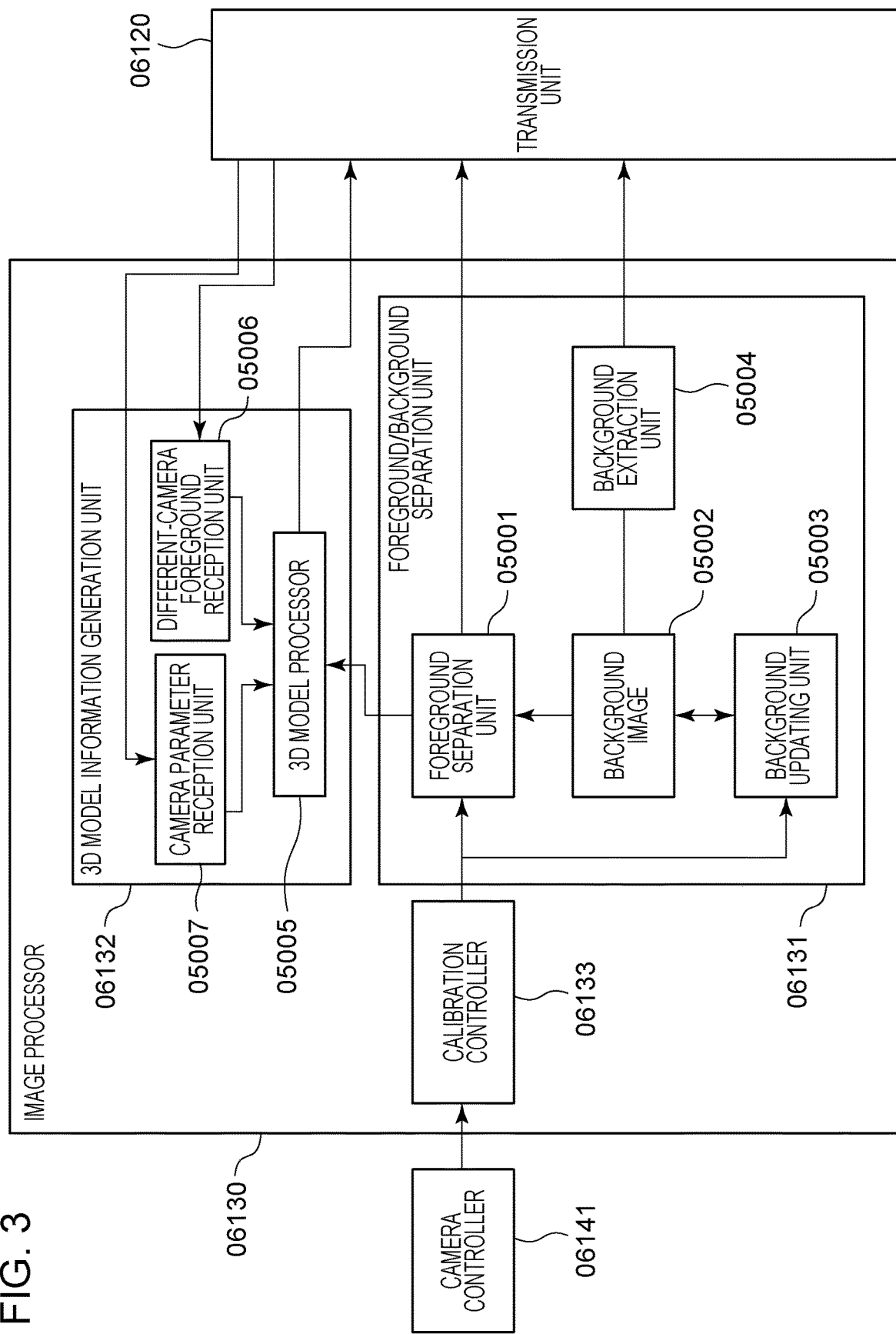
FIG. 3 is a block diagram illustrating a configuration of an image processor.

FIG. 3 is a functional block diagram illustrating the image processor 06130 included in the camera adapter 120. The calibration controller 06133 performs a color correction process on input images for suppressing color variation among the cameras 112 and a blur correction process (an electronic vibration control process) on the input images for stabilizing the images by reducing blurs of the images caused by vibration of the cameras 112.

A functional block of the foreground/background separation unit 06131 will now be described. A foreground separation unit 05001 performs a process of separating a foreground image by comparing image data obtained after positioning performed on an image captured by the camera 112 with a background image 05002.

A background updating unit 05003 generates a new background image using the background image 05002 and the image which has been subjected to the positioning and which is captured by the camera 112 and updates the background image 05002 by the new background image.

A background extraction unit 05004 performs control for extracting a portion of the background image 05002. Here, a function of the 3D model information generation unit 06132 will be described.

A 3D model processor 05005 successively generates image information associated with a 3D model in accordance with stereo camera principle, for example, using the foreground image separated by the foreground separation unit 05001 and the foreground image captured by one of the other cameras 112 supplied through the transmission unit 06120.

A different-camera foreground reception unit 05006 receives a foreground image obtained through the foreground/background separation performed by one of the other camera adapters 120.

A camera parameter reception unit 05007 receives internal parameters unique to each camera (including parameters of a focal length, an image center, and lens distortion) and external parameters indicating a position/orientation of each camera. These parameters are information obtained by a calibration process described below and transmitted and set to the camera adapter 120 by the control station 310. Subsequently, the 3D model processor 05005 generates 3D model information using the camera parameter reception unit 05007 and the different-camera foreground reception unit 05006.

Figure 4:
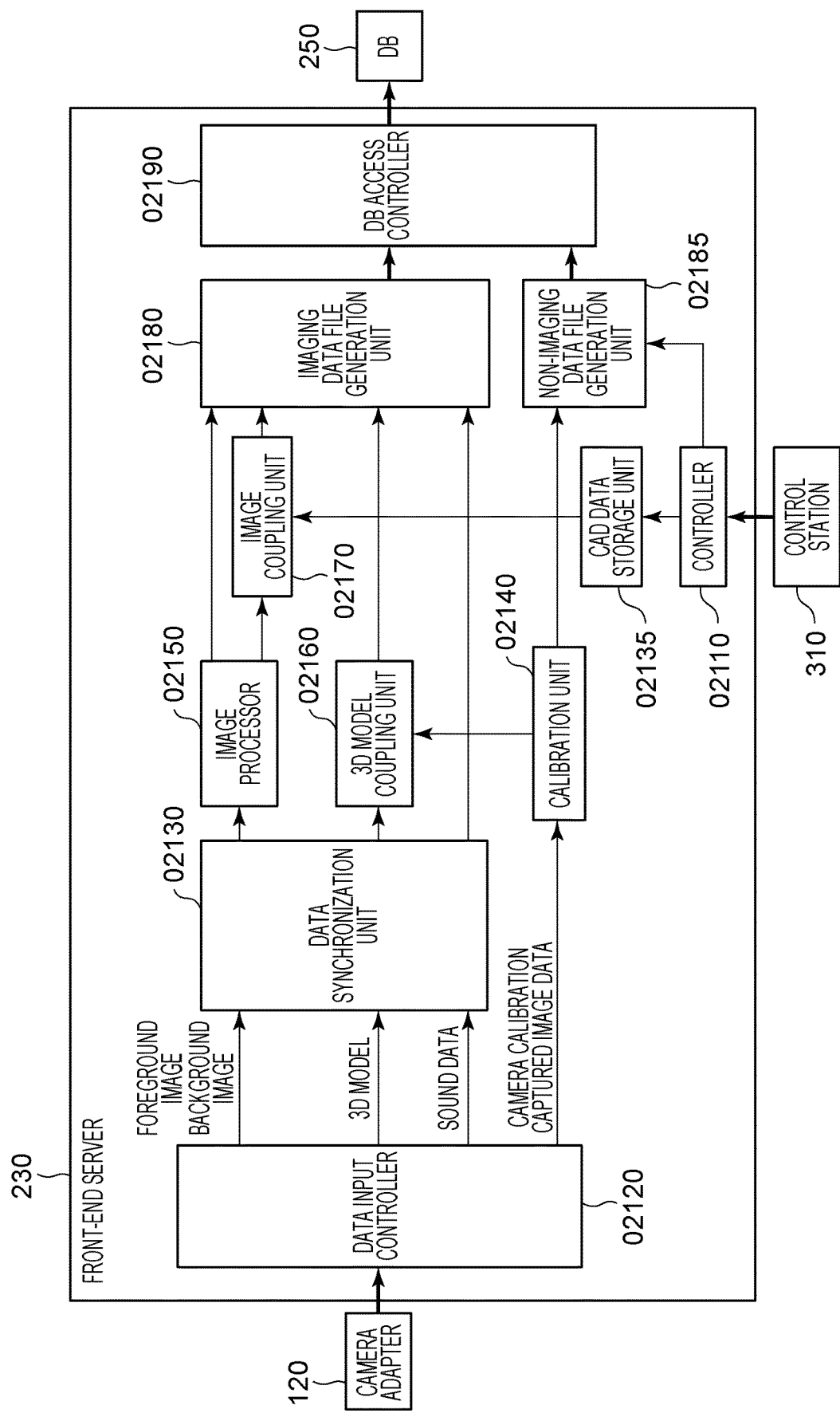
FIG. 4 is a block diagram illustrating a functional configuration of a front-end server.

FIG. 4 is a functional block diagram illustrating the front-end server 230. A controller 02110 is constituted by a CPU and a storage medium, such as a dynamic random access memory (DRAM), a hard disk drive (HDD) storing program data and various data, or an inverted AND (NAND) memory, and hardware, such as Ethernet. Then the controller 02110 controls various blocks included in the front-end server 230 and an entire system of the front-end server 230. Furthermore, the controller 02110 performs switching among operation modes including a calibration operation, a pre-imaging preparation operation, and an operation during imaging. Furthermore, the controller 02110 receives a control instruction from the control station 310 or the like through Ethernet and performs switching among modes and input and output of data. Furthermore, the controller 02110 obtains stadium CAD data (stadium shape data) from the control station 310 through the network and transmits the stadium CAD data to a CAD data storage unit 02135 and an imaging data file generation unit 02180. Note that the stadium CAD data (the stadium shape data) in this embodiment is 3D data indicating a shape of a stadium and a CAD method is not limited as long as the stadium CAD data indicates a mesh model or other 3D shapes.

A data input controller 02120 is connected to the camera adapter 120 via a network through a communication path, such as Ethernet and the switching hub 180. The data input controller 02120 obtains the foreground image, the background image, a 3D model of the subject, sound data, and camera calibration captured image data from the camera adapter 120 through the network. Here, the foreground image corresponds to image data based on a foreground region of a captured image for generation of a virtual viewpoint image, and the background image corresponds to image data based on a background region of the captured image. The camera adapter 120 specifies a foreground region and a background region in accordance with a result of a process of detecting a predetermined object performed on the image captured by the camera 112 and generates a foreground image and a background image. The predetermined object corresponds to a person, for example. The predetermined object may be a specific person (a player, a coach, and/or a referee). Examples of the predetermined object may further include an object having a predetermined image pattern, such as a ball or a goal. Alternatively, a moving object may be detected as the predetermined object.

The data input controller 02120 transmits the obtained foreground image and the obtained background image to a data synchronization unit 02130 and transmits the camera calibration captured image data to a calibration unit 02140. Furthermore, the data input controller 02120 has a function of performing compression and decompression, a data routing process, and the like on received data. Furthermore, although the controller 02110 and the data input controller 02120 individually have a communication function through a network, such as Ethernet, the controller 02110 and the data input controller 02120 may have a common communication function. In this case, an instruction of a control command and the stadium CAD data supplied from the control station 310 may be received by the data input controller 02120 and further transmitted to the controller 02110.

The data synchronization unit 02130 temporarily stores the data obtained from the camera adapter 120 in the DRAM and buffers the obtained data until all the foreground image, the background image, the sound data, and the 3D model data are obtained. Note that the foreground image, the background image, the sound data, and the 3D model data are collectively referred to as "imaging data" hereinafter. Metadata including routing information, time code information (time information), and a camera identifier is assigned to the imaging data, and the data synchronization unit 02130 checks an attribute of the data based on the metadata. By this, when the data synchronization unit 02130 determines that data at the same time point is obtained so as to determine that all the data is obtained. This is because, reception order of network packets of data transferred from the individual camera adapters 120 through the network is not ensured, and the data is required to be buffered until all the data required for file generation is obtained. When all the data is obtained, the data synchronization unit 02130 transmits the foreground image and the background image to an image processor 02150, the 3D model data to a 3D model coupling unit 02160, and the sound data to the imaging data file generation unit 02180. Note that the data to be obtained is required for file generation performed by the imaging data file generation unit 02180 described below. Furthermore, the background image and the foreground image may be captured in different frame rates. For example, in a case where a frame rate of the background image is 1 fps, one background image is captured per one second, and therefore, it may be determined that all the data has been obtained in a state in which a background image does not exist in a period of time in which a background image is not obtained. Furthermore, the data synchronization unit 02130 transmits information indicating that all the data has not been obtained to the database 250 when the data has not been obtained after a predetermined period of time. When the database 250 in a later stage stores the data, information indicating lack of data is stored together with a camera number and a frame number. Accordingly, a result of a determination as to whether a desired image is to be formed from images captured by the cameras 112 collected in the database 250 may be automatically transmitted before rendering in accordance with a viewpoint instruction issued from the virtual camera operation UI 330 to the back-end server 270. As a result, a load of a visual confirmation of an operator of the virtual camera operation UI 330 may be reduced.

The CAD data storage unit 02135 stores the 3D data indicating the shape of the stadium received from the controller 02110 in the storage medium, such as the DRAM, the HDD, or the NAND memory. Then the CAD data storage unit 02135 transmits the stored stadium shape data to an image coupling unit 02170 when receiving a request for the stadium shape data.

The calibration unit 02140 performs a camera calibration operation and transmits a camera parameter obtained by the calibration to a non-imaging data file generation unit 02185. Simultaneously, the calibration unit 02140 stores the camera parameters in a storage region thereof and supplies information on the camera parameters to the 3D model coupling unit 02160 described below.

The image processor 02150 performs adjustment of colors and luminance values of the cameras 112, a development process in a case where RAW image data is input, and correction of distortion of camera lenses on the foreground images and the background images. The foreground images and the background images which have been subjected to the image processing are transmitted to the imaging data file generation unit 02180 and the image coupling unit 02170, respectively.

The 3D model coupling unit 02160 couples the 3D model data obtained at the same time from the camera adapters 120 to one another using the camera parameters generated by the calibration unit 02140. Then the 3D model coupling unit 02160 generates 3D model data of a foreground image of the entire stadium using a so-called VisualHull method. The generated 3D model is transmitted to the imaging data file generation unit 02180.

The image coupling unit 02170 obtains the background images from the image processor 02150, obtains the 3D shape data of the stadium (the stadium shape data) from the CAD data storage unit 02135, and specifies positions of the background images corresponding to a coordinate of the obtained 3D shape data of the stadium. When positions corresponding to the coordinates of the 3D shape data of the stadium in the individual background images are specified, the background images are coupled with one another so that one background image is obtained. Note that the generation of the 3D shape data of the background images may be performed by the back-end server 270.

The imaging data file generation unit 02180 obtains the sound data from the data synchronization unit 02130, the foreground images from the image processor 02150, the 3D model data from the 3D model coupling unit 02160, and the background images coupled in the 3D shape from the image coupling unit 02170. Then the imaging data file generation unit 02180 outputs the obtained data to a DB access controller 02190. Here, the imaging data file generation unit 02180 associates the data with one another based on time information of the data before outputting the data. Note that some of the data may be associated with one another before outputting the data. For example, the imaging data file generation unit 02180 associates the foreground images and the background images with each other based on time information of the foreground images and time information of the background images before outputting the foreground images and the background image. Furthermore, for example, the imaging data file generation unit 02180 associates the foreground images, the background images, the 3D model data with one another based on the time information of the foreground images, the time information of the background images, and time information of the 3D model data before outputting the foreground images, the background images, and the 3D model data. Note that the imaging data file generation unit 02180 may generate a file of the associated data in a unit of data for each type of data before the outputting, or may generate a file of a plurality of types of data in a unit of data for a time point indicated by the time information. When the imaging data associated in this way is output from the front-end server 230 serving as an information processing apparatus which performs the association to the database 250, the back-end server 270 may generate a virtual viewpoint image using the foreground images and the background images having the same time information.

In a case where frame rates of the foreground images and the background images obtained by the data input controller 02120 are different from each other, it is difficult for the imaging data file generation unit 02180 to associate the foreground images and the background images obtained at the same time point with each other before the outputting. Therefore, the imaging data file generation unit 02180 associates a foreground image and a background image having time information having the relationship with time information of the foreground image based on a predetermined rule with each other before the outputting. Here, the background image having time information having the relationship with time information of the foreground image based on a predetermined rule means a background image having time information most similar to the time information of the foreground image among the background images obtained by the imaging data file generation unit 02180, for example. In this way, by associating the foreground image with the background image based on the predetermined rule, even if the frame rates of the foreground image and the background image are different from each other, a virtual viewpoint image may be generated using the foreground image and the background image which are captured at the similar time points. Note that a method for associating the foreground image and the background image is not limited to the method described above. For example, the background image having time information having the relationship with time information of the foreground image based on the predetermined rule may be a background image having time information closest to the time information of the foreground image among obtained background images having time information corresponding to time points before a time point of the foreground image. According to this method, the foreground images and the background images which are associated with each other may be output with less delay without waiting for an obtainment of a background images having a frame rate lower than those of the foreground images. The background image having the time information having the relationship with the time information of the foreground image based on the predetermined rule may be a background image having time information closest to the time information of the foreground image among obtained background images having time information corresponding to time points after the time point of the foreground image.

The non-imaging data file generation unit 02185 obtains the camera parameters from the calibration unit 02140 and the 3D shape data of the stadium from the controller 02110 and transmits the camera parameters and the 3D shape data to the DB access controller 02190 after converting the camera parameters and the 3D shape data into those in a file format. Note that the camera parameters and the stadium shape data to be input to the non-imaging data file generation unit 02185 are individually converted in accordance with the file format. Specifically, when receiving one of the data, the non-imaging data file generation unit 02185 independently transmits the data to the DB access controller 02190.

The DB access controller 02190 is connected to the database 250 so that high speed communication is performed by InfiniBand. Then the DB access controller 02190 transmits the files supplied from the imaging data file generation unit 02180 and the non-imaging data file generation unit 02185 to the database 250. In this embodiment, imaging data which is associated by the imaging data file generation unit 02180 based on time information is output through the DB access controller 02190 to the database 250 serving as a storage device connected to the front-end server 230 through the network. Note that a destination of the output of the associated imaging data is not limited to this. For example, the front-end server 230 may output the imaging data associated based on the time information to the back-end server 270 serving as an image generation device which generates a virtual viewpoint image and which is connected to the front-end server 230 through the network. Furthermore, the front-end server 230 may output the imaging data to both of the database 250 and the back-end server 270.

Although the front-end server 230 associates the foreground images and the background images with each other in this embodiment, the present invention is not limited to this and the database 250 may perform the association. For example, the database 250 obtains the foreground images and the background images having time information from the front-end server 230. Then the database 250 may associate the foreground images and the background images with each other based on the time information of the foreground images and the time information of the background images before outputting the foreground images and the background images to a storage unit included in the database 250.

Figure 5:
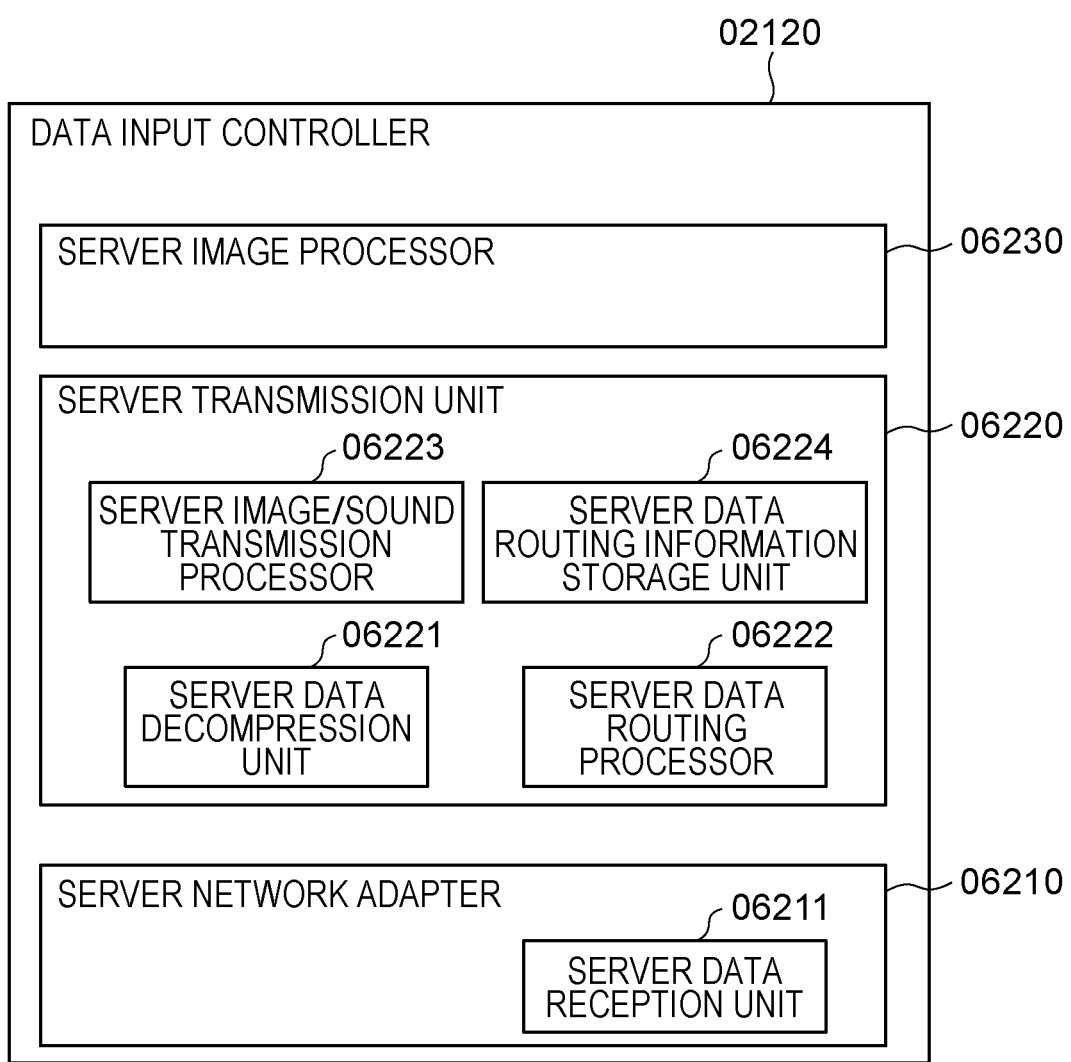
FIG. 5 is a block diagram illustrating a configuration of a data input controller included in the font-end server.

FIG. 5 is a functional block diagram illustrating the data input controller 02120 included in the front-end server 230.

The data input controller 02120 includes a server network adapter 06210, a server transmission unit 06220, and a server image processor 06230. The server network adapter 06210 includes a server data reception unit 06211 and has a function of receiving data transmitted from the camera adapter 120.

The server transmission unit 06220 has a function of processing data supplied from the server data reception unit 06211 and includes functional units described below. A server data decompression unit 06221 has a function of decompressing compressed data.

A server data routing processor 06222 determines a transfer destination of data in accordance with routing information, such as an address, stored in a server data routing information storage unit 06224 described below and transfers the data supplied from the server data reception unit 06211.

A server image/sound transmission processor 06223 receives a message from the camera adapter 120 through the server data reception unit 06211 and restores fragmented data into image data or sound data depending on a data type included in the message. Note that when the restored image data or the restored sound data has been compressed, the server data decompression unit 06221 performs the decompression process.

The server data routing information storage unit 06224 has a function of storing address information for determining a transmission destination of the data received by the server data reception unit 06211. A routing method will be described below.

The server image processor 06230 has a function of performing a process associated with the image data or the sound data supplied from the camera adapter 120. Content of the process includes a process of conversion into an appropriate format in which a camera number, an imaging time of an image frame, an image size, an image format, and attribute information of a coordinate of an image are assigned depending on data entity of the image data (a foreground image, a background image, and 3D model information).

Figure 6:
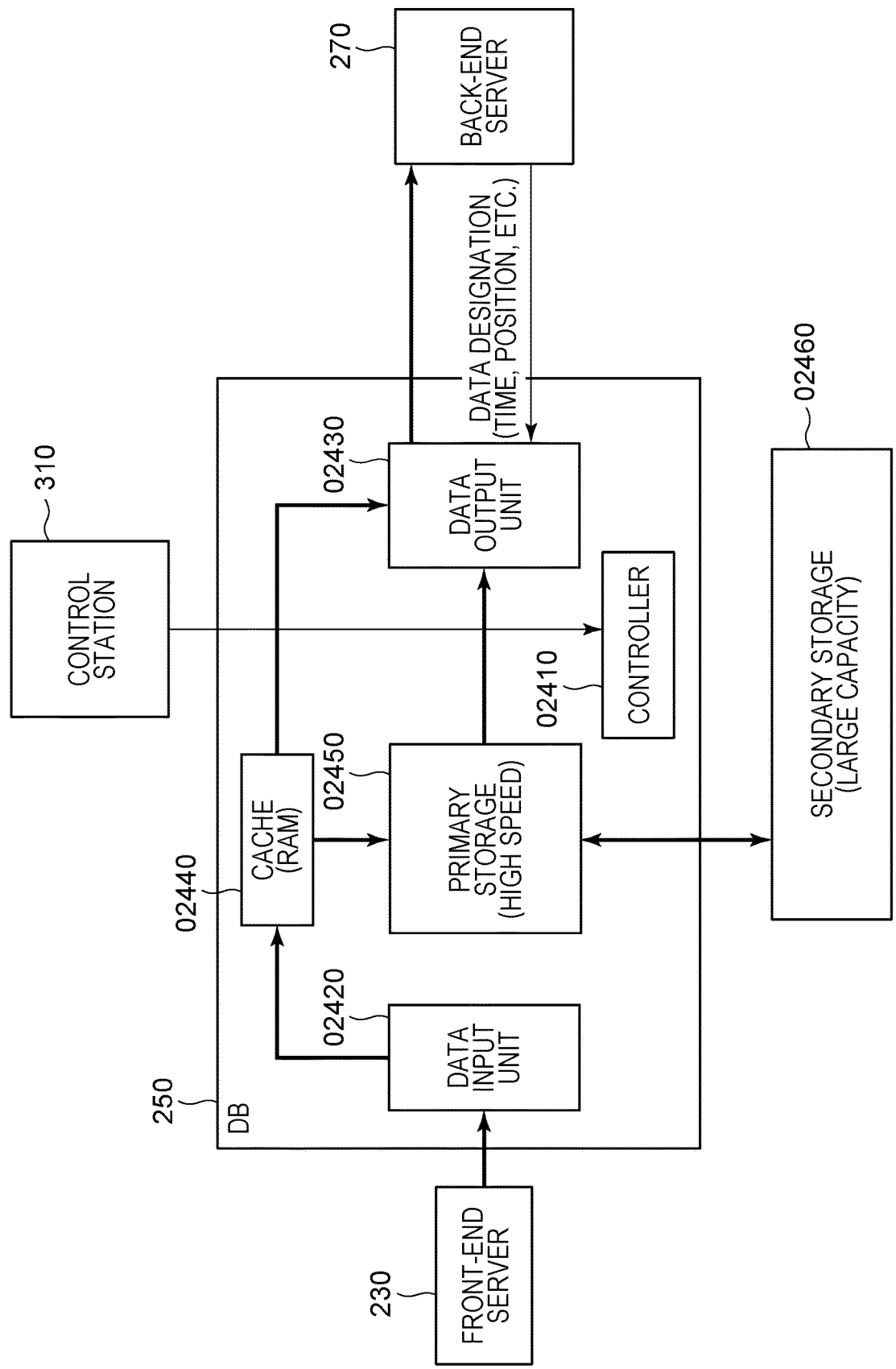
FIG. 6 is a block diagram illustrating a functional configuration of a database.

FIG. 6 is a functional block diagram illustrating the database 250. A controller 02410 is constituted by a CPU and a storage medium, such as a dynamic random access memory (DRAM), a hard disk drive (HDD) storing program data and various data, or an inverted AND (NAND) memory, and hardware, such as Ethernet. Then the controller 02410 controls various functional blocks of the database 250 and an entire system of the database 250.

A data input unit 02420 receives a file of imaging data or non-imaging data from the front-end server 230 by high-speed communication, such as InfiniBand. The received file is transmitted to a cache 02440. Furthermore, the data input unit 02420 reads metadata of the received imaging data and generates a database table using time record information, routing information, and information on a camera identifier recorded in the metadata so that the obtained data is to be accessed.

A data output unit 02430 determines one of a cache 02440, a primary storage 02450, and a secondary storage 02460 which stores the data requested by the back-end server 270. Then the data output unit 02430 reads the data from the storage destination and transmits the read data to the back-end server 270 through the high-speed communication, such as InfiniBand.

The cache 02440 includes a storage device, such as a DRAM, capable of realizing a high-speed input/output throughput and stores the imaging data and the non-imaging data supplied from the data input unit 02420 in the storage device. The stored data is held until a predetermined amount is reached, and every time a data amount exceeds the predetermined amount, the data is successively written to the primary storage 02450 in order from older data and new data is written in a portion where the data which has been written in the primary storage 02450 was written. The certain amount of data stored in the cache 02440 corresponds to imaging data for at least one frame. Accordingly, when the back-end server 270 performs an image rendering process, a throughput in the database 250 may be suppressed at minimum and new image frames may be consecutively rendered with a less delay. Here, to attain the object described above, a background image is required to be included in the cached data. Therefore, imaging data for a frame which does not include a background image is cached without updating a background image in the cache. A capacity of the DRAM capable of caching data is determined in accordance with a cache frame size set in the system in advance or an instruction issued by the control station 310. Note that the non-imaging data is immediately copied in the primary storage 02450 since frequency of input/output of the non-imaging data is low and high-speed throughput is not required before a game or the like. The cached data is read by the data output unit 02430.

The primary storage 02450 is constituted by connecting storage media, such as SSDs, in parallel and is capable of simultaneously performing writing of a large amount of data from the data input unit 02420 and reading of data by the data output unit 02430 so that a high-speed process is realized. The data stored in the cache 02440 is written to the primary storage 02450 in order from older data stored in the cache 02440.

The secondary storage 02460 is constituted by an HDD, a tape medium, or the like. A large capacity is more important than high-speed processing in the secondary storage 02460, and the secondary storage 02460 is required to be a medium suitable for longterm storage which is cheaper than the primary storage 02450. After imaging is completed, data stored in the primary storage 02450 is written to the secondary storage 02460 as backup of the data.

Figure 7:
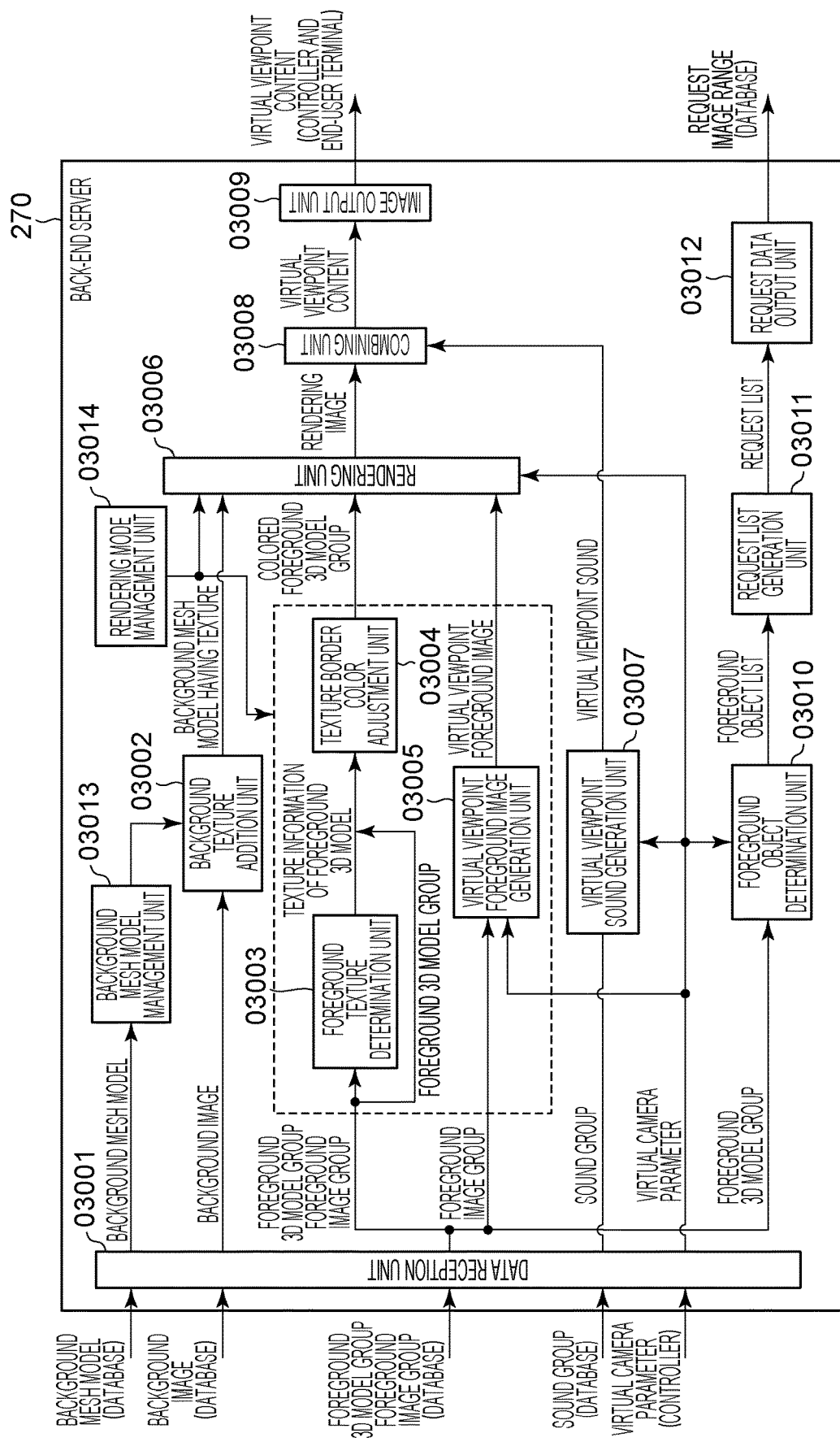
FIG. 7 is a block diagram illustrating a functional configuration of a back-end server.

FIG. 7 is a diagram illustrating a configuration of the back-end server 270 of this embodiment. The back-end server 270 includes a data reception unit 03001, a background texture addition unit 03002, a foreground texture determination unit 03003, a texture border color adjustment unit 03004, a virtual viewpoint foreground image generation unit 03005, and a rendering unit 03006. The back-end server 270 further includes a virtual viewpoint sound generation unit 03007, a combining unit 03008, an image output unit 03009, a foreground object determination unit 03010, a request list generation unit 03011, a request data output unit 03012, and a rendering mode management unit 03014.

The data reception unit 03001 receives data transmitted from the database 250 and the controller 300. Furthermore, the data reception unit 03001 receives the 3D data indicating the shape of the stadium (the stadium shape data), the foreground images, the background images, the 3D model of the foreground images (hereinafter referred to as a "foreground 3D model"), and sound from the database 250.

Furthermore, the data reception unit 03001 receives a virtual camera parameter output from the controller 300 serving as a designation device which designates a viewpoint (a virtual viewpoint) of generation of a virtual viewpoint image. The virtual camera parameter is data indicating a position of a virtual viewpoint and an orientation, and a matrix of external parameters and a matrix of internal parameters are used, for example.

Note that the data obtained by the data reception unit 03001 from the controller 300 is not limited to the virtual camera parameter. The information output from the controller 300 may include, for example, information indicating states of designation of a viewpoint, such as a method for designating a viewpoint, information for specifying an application operated by the controller 300, information for identifying the controller 300, and information for identifying a user using the controller 300. Furthermore, the data reception unit 03001 may obtain information similar to the information described above output from the controller 300 from the end-user terminal 190. Moreover, the data reception unit 03001 may obtain information on the plurality of cameras 112 from the external device, such as the database 250 or the controller 300. Examples of the information on the plurality of cameras 112 include information on states of imaging, such as information on the number of cameras 112 and information on operation states of the plurality of cameras 112. Examples of the operation state of the cameras 112 includes at least one of a normal state, a failure state, a waiting state, a boot preparation state, and a reboot state of the camera 112, for example. Here, the normal state indicates a state in which imaging is available, the failure state indicates a state in which imaging is restricted, the waiting state indicates a state in which imaging is stopped, the boot preparation state indicates a state in which a process for starting imaging is performed, and the reboot state indicates a state in which a predetermined initial setting is performed.

The background texture addition unit 03002 adds the background image as texture to a 3D space shape represented by a background mesh model (the stadium shape data) obtained from a background mesh model management unit 03013. By this, the background texture addition unit 03002 generates a background mesh model having texture. The mesh model indicates data which represents a 3D space shape by an aggregate of surfaces, such as a CAD data. The texture means an image to be added for representing texture of a surface of the object.

The foreground texture determination unit 03003 determines texture information of the foreground 3D model using the foreground image and the foreground 3D model group.

The texture border color adjustment unit 03004 adjusts color in a boundary of the texture in accordance with the texture information of the foreground 3D models and the 3D model group and generates a colored foreground 3D model group for each foregoing object.

The virtual viewpoint foreground image generation unit 03005 performs perspective transformation so that the foreground image group is viewed from a virtual viewpoint based on virtual camera parameters. The rendering unit 03006 renders the background images and the foreground images so as to generate a panoramic virtual viewpoint image based on a generation method used for generation of a virtual viewpoint image determined by the rendering mode management unit 03014. In this embodiment, two rendering modes including model-based rendering (MBR) and image-based rendering (IBR) are used as the method for generating a virtual viewpoint image.

When the MBR is employed, a virtual viewpoint image is generated using a 3D model generated based on a plurality of captured images obtained by imaging a subject from a plurality of directions. Specifically, the MBR is a technique of generating a view of a scene from a virtual viewpoint as an image using a 3D shape (a model) of the target scene obtained by a 3D shape restoration method, such as multi-view-stereo (MVS).

The IBR is a technique of generating a virtual viewpoint image which reproduces a view from the virtual viewpoint by deforming and combining the input image group obtained by capturing the target scene from a plurality of viewpoints. In this embodiment, a virtual viewpoint image is generated based on at least one captured image. The number of captured images is smaller than that of the captured images for generating a 3D model using the MBR.

When the rendering mode is the MBR, a panoramic model is generated by combining the background mesh model and the foreground 3D model group generated by the texture border color adjustment unit 03004 with each other. A virtual viewpoint image is generated from the panoramic model.

When the rendering mode is the IBR, a background image viewed from the virtual viewpoint is generated based on the background texture model, and the foreground image generated by the virtual viewpoint foreground image generation unit 03005 is combined with the background image so that a virtual viewpoint image is generated.

Note that the rendering unit 03006 may employ a rendering method other than the MBR and the IBR. Furthermore, a method for generating the virtual viewpoint image determined by the rendering mode management unit 03014 is not limited to the rendering method, and the rendering mode management unit 03014 may determine a method of a process other than the rendering for generating a virtual viewpoint image. The rendering mode management unit 03014 determines a rendering mode as a generation method used for the generation of a virtual viewpoint image and stores a result of the determination.

In this embodiment, the rendering mode management unit 03014 determines a rendering mode to be used from among a plurality of rendering modes. This determination is performed based on information obtained by the data reception unit 03001. For example, the rendering mode management unit 03014 determines that the IBR is the generation method to be used for the generation of a virtual viewpoint image when the number of cameras specified in accordance with the obtained information is equal to or smaller than a threshold value. On the other hand, when the number of cameras is larger than the threshold value, the rendering mode management unit 03014 determines that the generation method is the MBR. In this way, when the number of cameras is large, a virtual viewpoint image is generated using the MBR so that a large viewpoint designation available range is attained. On the other hand, when the number of cameras is small, the IBR may be used so that degradation of image quality of a virtual viewpoint image caused by degradation of accuracy of a 3D model generated using the MBR is avoided. Furthermore, the generation method may be determined in accordance with a length of an allowable processing delay time in a period from when imaging is performed to when an image is output. In a case where priority is given to a degree of freedom even though a delay time is long, the MBR is used whereas in a case where a reduction of a delay time is required, the IBR is used. Furthermore, when the data reception unit 03001 obtains information indicating that the controller 300 or the end-user terminal 190 is capable of specifying a height of a viewpoint, for example, the MBR is determined as the generation method used for the generation of a virtual viewpoint image. By this, a case in which a request for changing a height of a viewpoint issued by the user is not accepted since the generation method is the IBR may be avoided. In this way, since the method for generating a virtual viewpoint image is determined from among a plurality of generation methods depending on a situation, a virtual viewpoint image may be generated by a generation method appropriately determined. Furthermore, since a plurality of rendering modes may be switched from one to another depending on a request, the system may be flexibly configured and this embodiment may be applied to subjects other than a stadium.

Note that the rendering modes stored in the rendering mode management unit 03014 may be methods preset in the system. Alternatively, the user who operates the virtual camera operation UI 330 or the end-user terminal 190 may arbitrarily set a rendering mode.

A virtual viewpoint sound generation unit 03007 generates sound (a sound group) heard in the virtual viewpoint based on the virtual camera parameter. A combining unit 03008 generates virtual viewpoint content by combining an image group generated by the rendering unit 03006 and sound generated by the virtual viewpoint sound generation unit 03007 with each other.

An image output unit 03009 outputs the virtual viewpoint content to the controller 300 and the end-user terminal 190 through Ethernet. Note that a method for transmission to an outside is not limited to Ethernet and various signal transmission methods, such as SDI, Display Port, and HDMI (registered trademark) may be used. Note that the back-end server 270 may output a virtual viewpoint image which is generated by the rendering unit 03006 and which does not include sound.

A foreground object determination unit 03010 determines a foreground object group to be displayed using the virtual camera parameter and positional information of a foreground object indicating a position in a space of the foreground object which is included in the foreground 3D model and outputs a foreground object list. Specifically, the foreground object determination unit 03010 performs a process of mapping image information of the virtual viewpoint to the physical cameras 112. The virtual viewpoint has different mapping results depending on a rendering mode determined by the rendering mode management unit 03014. Therefore, a controller which determines a plurality of foreground objects is included in the foreground object determination unit 03010 and performs control in combination with the rendering mode.

A request list generation unit 03011 generates a request list for requesting the database 250 to transmit the foreground image group and the foreground 3D model group corresponding to the foreground object list in a specified time point, the background images, and the sound data. As for the foreground object, data selected taking the virtual viewpoint into consideration is requested to the database 250. However, as for the background image and the sound data, all data associated with a frame of interest is requested. A background mesh model request list is generated in a period of time from when the back-end server 270 is activated to when a background mesh model is obtained.

A request data output unit 03012 outputs a data request command to the database 250 based on the input request list. The background mesh model management unit 03013 stores a background mesh model supplied from the database 250.

Note that a case where the back-end server 270 performs both the determination of the method for generating a virtual viewpoint image and the generation of a virtual viewpoint image is mainly described in this embodiment. Specifically, the back-end server 270 outputs a virtual viewpoint image as data corresponding to a result of the determination of a generation method. However, the present invention is not limited to this and the front-end server 230 may determine a generation method to be used for the generation of a virtual viewpoint image based on the information on the plurality of cameras 112 and the information output from the device which specifies the viewpoint associated with the generation of a virtual viewpoint image. Then the front-end server 230 may output the image data based on imaging performed by the cameras 112 and information indicating the determined generation method to at least one of a storage device, such as the database 250, and an image generation device, such as the back-end server 270. In this case, the back-end server 270 generates a virtual viewpoint image based on the information indicating the generation method output by the front-end server 230 as data corresponding to a result of the determination of the generation method, for example. When the front-end server 230 determines the generation method, a processing load caused by a process performed by the database 250 or the back-end server 270 on data for the image generation employing a method other than the determined method may be reduced. However, in the case where the back-end server 270 determines a generation method as described in this embodiment, the database 250 may store data conforming with a plurality of generation methods, and therefore, a plurality of virtual viewpoint images corresponding to the plurality of generation methods may be generated.

Figure 8:
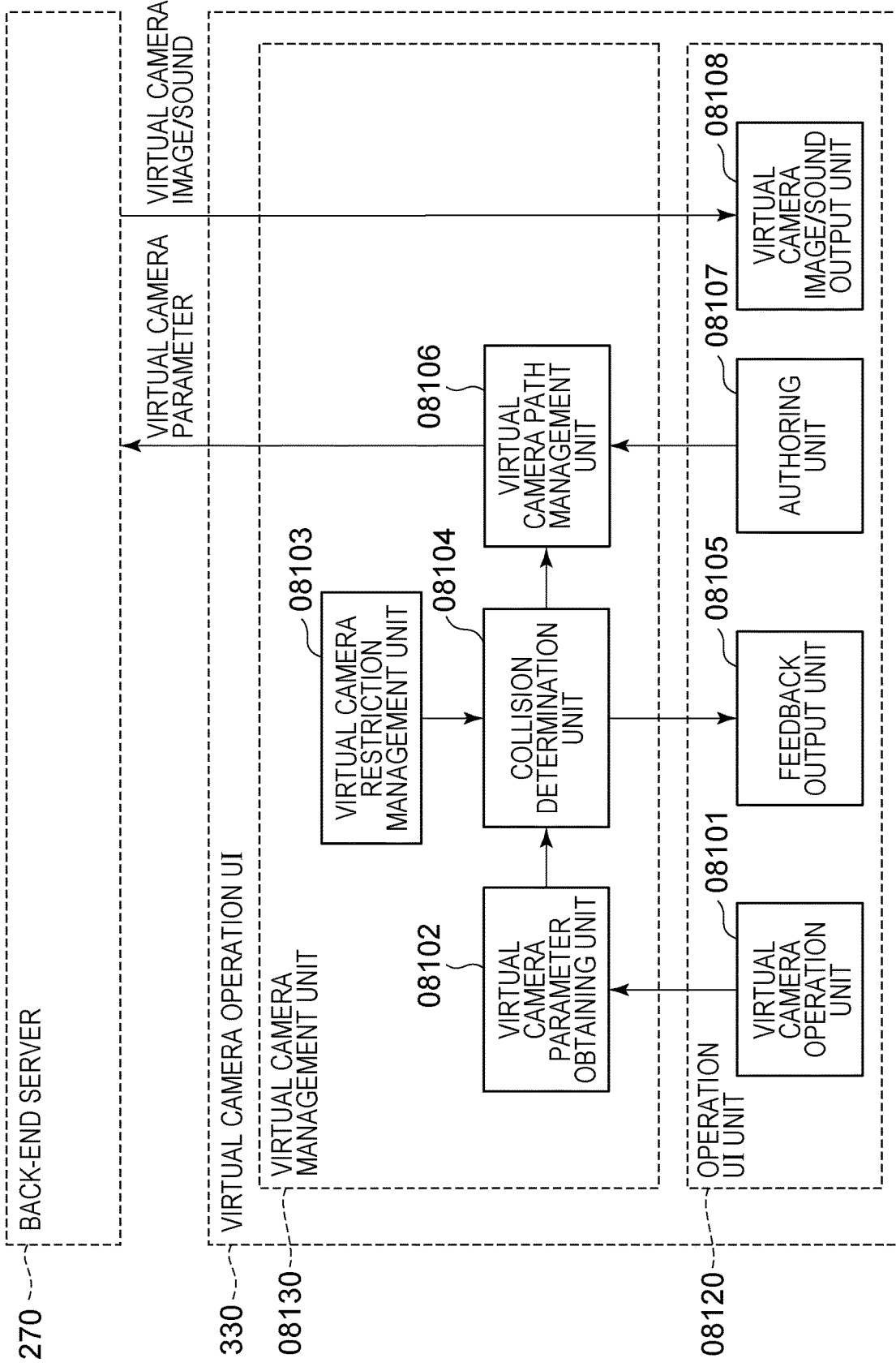
FIG. 8 is a block diagram illustrating a functional configuration of a virtual camera operation UI.
Figure 37A:
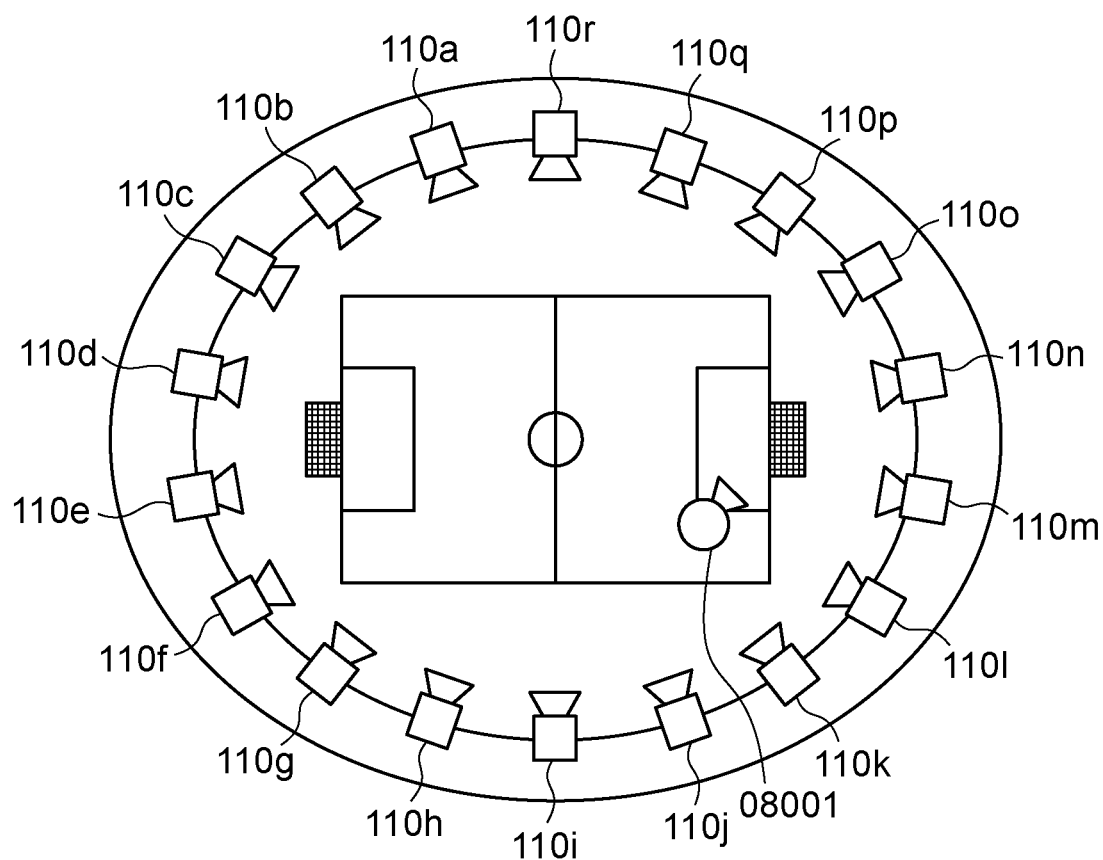
FIG. 37A is a diagram illustrating a virtual camera.

FIG. 8 is a block diagram illustrating a functional configuration of the virtual camera operation UI 330. A virtual camera 08001 will be described with reference to FIG. 37A. The virtual camera 08001 is capable of performing imaging in a viewpoint different from those of the installed cameras 112. Specifically, a virtual viewpoint image generated by the image processing system 100 corresponds to an image captured by the virtual camera 08001. In FIG. 37A, a plurality of sensor systems 110 installed in a circumference have respective cameras 112. For example, an image which is seen as if the image is captured by the virtual camera 08001 installed near a soccer goal may be generated by generating a virtual viewpoint image. A virtual viewpoint image which is an image captured by the virtual camera 08001 is generated by performing image processing on images captured by the plurality of installed cameras 112. When the operator (the user) operates a position of the virtual camera 08001, an image captured in an arbitrary viewpoint may be obtained.

The virtual camera operation UI 330 includes a virtual camera management unit 08130 and an operation UI unit 08120. The virtual camera management unit 08130 and the operation UI unit 08120 may be implemented in the same device or implemented in a device serving as a server and a device serving as a client, respectively. In the virtual camera operation UI 330 used in a broadcasting station, for example, the virtual camera management unit 08130 and the operation UI unit 08120 may be implemented in a workstation in a relay vehicle. Furthermore, the similar function may be realized by implementing the virtual camera management unit 08130 in a web server and the operation UI unit 08120 in the end-user terminal 190, for example.

A virtual camera operation unit 08101 performs processing when receiving an operation performed on the virtual camera 08001, that is, an instruction issued by the user for specifying a viewpoint for the generation of a virtual viewpoint image. Content of the operation of the operator includes a change (a shift) of a position, a change (rotation) of an orientation, and a change of a zoom magnification, for example. The operator uses input devices including a joystick, a jog dial, a touch panel, a keyboard, and a mouse to operate the virtual camera 08001. Correspondences between inputs of the input devices and operations of the virtual camera 08001 are determined in advance. For example, a "w" key of the keyboard corresponds to an operation of shifting the virtual camera 08001 forward by 1 in. Furthermore, the operator may operate the virtual camera 08001 after specifying a trajectory. For example, the operator specifies a trajectory of the virtual camera 08001 which moves on a circumference with a goalpost at the center by touching a touch pad such that a circle is rendered on the touch pad. The virtual camera 08001 moves around the goalpost along the specified trajectory. In this case, the orientation of the virtual camera 08001 may be automatically changed so that the virtual camera 08001 constantly faces the goalpost. The virtual camera operation unit 08101 may be used for generation of a live image and a replay image. When a replay image is to be generated, an operation of specifying a time in addition to a camera position and an orientation is performed. In the replay image, the virtual camera 08001 may be moved while a time is stopped, for example.

A virtual camera parameter obtaining unit 08102 obtains the virtual camera parameters indicating a position and an orientation of the virtual camera 08001. The virtual camera parameters may be derived by calculations or with reference to a lookup table or the like. As the virtual camera parameters, a matrix of external parameters and a matrix of internal parameters are used, for example. Here, the position and the orientation of the virtual camera 08001 are included in the external parameters and a zoom value is included in the internal parameters.

A virtual camera restriction management unit 08103 obtains and manages restriction information for specifying a restriction region in which designation of a viewpoint based on an instruction received by the virtual camera operation unit 08101 is restricted. The restriction information indicates restriction associated with the position, the orientation, the zoom value, and the like of the virtual camera 08001. Unlike the cameras 112, the virtual camera 08001 may perform imaging while arbitrarily moving a viewpoint. However, it is not necessarily the case that the virtual camera 08001 may constantly generate images from various viewpoints. For example, if the virtual camera 08001 faces a direction in which an object which is not captured by any of the cameras 112 exists, an image of the object may not be captured. Furthermore, if a zoom magnification of the virtual camera 08001 is increased, image quality is deteriorated due to restriction of resolution. Therefore, a zoom magnification in a range in which image quality of a certain standard is maintained may be set as the virtual camera restriction. The virtual camera restriction may be obtained beforehand in accordance with arrangement of the cameras 112. Furthermore, the transmission unit 06120 may reduce a transmission data amount in accordance with a load of the network. The reduction of the data amount dynamically changes parameters associated with captured images and changes a range in which images may be generated and a range in which image quality is maintained. The virtual camera restriction management unit 08103 may receive information indicating a method used for the reduction of an amount of data output from the transmission unit 06120 and dynamically update the virtual camera restriction in accordance with the information. By this, the transmission unit 06120 may attain the reduction of a data amount while image quality of the virtual viewpoint image is maintained in a certain standard.

Furthermore, the restriction of the virtual camera 08001 is not limited to the restriction described above. In this embodiment, the restriction region in which designation of a viewpoint is restricted (a region which does not satisfy the virtual camera restriction) is changed depending on at least operation states of the devices included in the image processing system 100 or parameters associated with image data for the generation of a virtual viewpoint image. For example, the restriction region is changed in accordance with a parameter which controls a data amount of image data transmitted in the image processing system 100 within a predetermined range based on restriction of the data amount. The parameter includes at least one of a frame rate of the image data, resolution, a quantization step, and an imaging range. When the resolution of the image data is reduced to reduce a transmission data amount, a range of a zoom magnification in which certain image quality may be maintained is changed. In such a case, when the virtual camera restriction management unit 08103 obtains the information for indicating the restriction region which is changed by a parameter, the virtual camera operation UI 330 may perform control such that the user specifies a viewpoint in a range in accordance with the change of the parameter. Note that content of the parameter is not limited to the content described above. Furthermore, although the image data in which the data amount is controlled is generated based on differences among a plurality of images captured by the cameras 112 in this embodiment, the present invention is not limited to this. The image data may be the captured image itself or may be the foreground image or the background image.

Furthermore, the restriction region changes in accordance with operation states of the devices included in the image processing system 100, for example. Here, the devices included in the image processing system 100 include at least one of the camera 112 and the camera adapter 120 which generates image data by performing image processing on an image captured by the camera 112. The operation states of the devices include at least one of the normal state, the failure state, the boot preparation state, and the reboot state of the devices, for example. For example, in a case where one of the cameras 112 is in the failure state or the reboot state, a viewpoint may not be specified in positions near the camera 112. In such a case, when the virtual camera restriction management unit 08103 obtains the information for indicating the restriction region which is changed depending on the operation states of the devices, the virtual camera operation UI 330 may perform control such that the user specifies a viewpoint in a range in accordance with the change of the operation states of the devices. Note that the devices and the operation states associated with the change of the restriction region are not limited to those described above.

A collision determination unit 08104 determines whether the virtual camera parameter obtained by the virtual camera parameter obtaining unit 08102 satisfies the virtual camera restriction. When the determination is negative, an operation input performed by the operator is cancelled and the virtual camera 08001 is controlled not to be moved from a position which satisfies the restriction or the virtual camera 08001 is returned to a position which satisfies the restriction.

A feedback output unit 08105 feeds back a result of the determination performed by the collision determination unit 08104 to the operator. For example, when the virtual camera restriction is not satisfied due to an operation performed by the operator, the collision determination unit 08104 transmits a notification to the operator. It is assumed that, although the operator performs an operation of moving the virtual camera 08001 upward, a destination of the movement does not satisfy the virtual camera restriction. In this case, the feedback output unit 08105 transmits a notification indicating that the virtual camera 08001 may not be further moved upward to the operator. The notification may be performed by sound, a message output, a color change in a screen, locking of the virtual camera operation unit 08101, or the like. Furthermore, the position of the virtual camera 08001 may be automatically returned to a position which satisfies the restriction, and by this, operation performed by the operator may be simplified. When the feedback is performed by image display, the feedback output unit 08105 displays an image based on display control in accordance with the restriction region in a display unit based on the restriction information obtained by the virtual camera restriction management unit 08103. For example, the feedback output unit 08105 displays an image indicating that a viewpoint corresponding to an instruction received by the virtual camera operation unit 08101 is within the restriction region in the display unit. By this, the operator may recognize that the specified viewpoint is included in the restriction region, and therefore, a desired virtual viewpoint image may not be generated. Accordingly, the operator may specify the viewpoint again in a position outside the restriction region (a position which satisfies the restriction). Specifically, in the generation of a virtual viewpoint image, a viewpoint may be specified within the range which changes depending on a situation. Note that content displayed in the display unit by the virtual camera operation UI 330 serving as a control device which performs display control in accordance with the restriction region is not limited to this. For example, an image indicating the restriction region, such as an image in which a portion corresponding to the restriction region in a region which is a target of designation of a viewpoint (such as an inside of the stadium) is filled with a predetermined color, may be displayed. Although the display unit is an external display connected to the virtual camera operation UI 330 in this embodiment, the present invention is not limited to this and the display unit may be incorporated in the virtual camera operation UI 330.

Figure 37B:
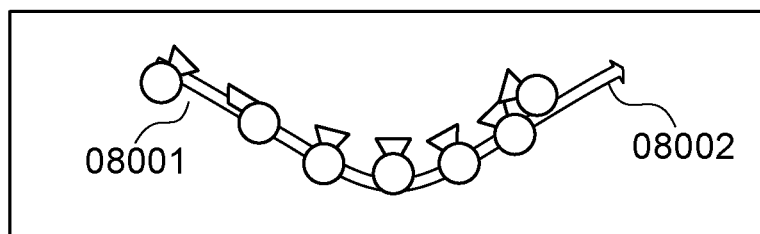
FIG. 37B is a diagram illustrating a virtual camera.

A virtual camera path management unit 08106 manages a path of the virtual camera 08001 (a virtual camera path 08002) corresponding to an operation performed by the operator. The virtual camera path 08002 is a line of information indicating positions and orientations of the virtual camera 08001 in individual frames. A description will be made with reference to FIG. 37B. For example, a virtual camera parameter is used as information indicating a position and an orientation of the virtual camera 08001. Information for one second in a setting of a frame rate of 60 frames per second corresponds to a line of 60 virtual camera parameters, for example. The virtual camera path management unit 08106 transmits the virtual camera parameters determined by the collision determination unit 08104 to the back-end server 270. The back-end server 270 generates a virtual viewpoint image and virtual viewpoint sound using the received virtual camera parameters. Furthermore, the virtual camera path management unit 08106 has a function of storing the virtual camera parameters after adding the virtual camera parameters to the virtual camera path 08002. When a virtual viewpoint image and virtual viewpoint sound for one hour are generated using the virtual camera operation UI 330, for example, virtual camera parameters for one hour are stored as the virtual camera path 08002. By storing the virtual camera path 08002, the virtual viewpoint image and the virtual viewpoint sound may be generated again by referring to image information stored in the secondary storage 02460 in the database 250 and the virtual camera path 08002 later. That is, other users may reuse the virtual camera path 08002 generated by the operator who performs a high-level virtual camera operation and the image information stored in the secondary storage 02460. Note that a plurality of selectable scenes corresponding to a plurality of virtual camera paths may be stored in the virtual camera management unit 08130. When the plurality of virtual camera paths are stored in the virtual camera management unit 08130, metadata including scripts of scenes corresponding to the virtual camera paths, elapsed times of a game, prescribed times before and after the scenes, and player information may also be input and stored. The virtual camera operation UI 330 notifies the back-end server 270 of these virtual camera paths as virtual camera parameters.

The end-user terminal 190 may select a virtual camera path from a name of a scene, a player, or an elapsed time of a game by requesting selection information for selecting the virtual camera path to the back-end server 270. The back-end server 270 notifies the end-user terminal 190 of candidates of a selectable virtual camera path. The end user selects a desired virtual camera path from among the candidates by operating the end-user terminal 190. The end-user terminal 190 requests generation of an image corresponding to the selected virtual camera path to the back-end server 270 so as to interactively obtain an image delivery service.

An authoring unit 08107 has a function of performing editing when the operator generates a replay image. The authoring unit 08107 extracts a portion of the virtual camera path 08002 stored in the virtual camera path management unit 08106 as an initial value of the virtual camera path 08002 for a replay image in response to a user operation. As described above, the virtual camera path management unit 08106 stores the metadata including a scene name, a player, an elapsed time, and a prescribed time before and after the scene which are associated with the virtual camera path 08002. For example, the virtual camera path 08002 having a scene name "goal scene" and a prescribed time before and after the scene of 10 seconds in total is extracted. Furthermore, the authoring unit 08107 sets a reproduction speed in an edited camera path. For example, slow reproduction is set to the virtual camera path 08002 during a ball flies to a goal. Note that, when the image is replaced by another image from another viewpoint, that is, when the virtual camera path 08002 is changed, the user operates the virtual camera 08001 again using the virtual camera operation unit 08101.

A virtual camera image/sound output unit 08108 outputs a virtual camera image and sound supplied from the back-end server 270. The operator operates the virtual camera 08001 while checking the output image and the output sound. Note that the virtual camera image/sound output unit 08108 causes the display unit to display an image based on display control based on the restriction region depending on content of feedback performed by the feedback output unit 08105. When a position of a viewpoint specified by the operator is included in the restriction region, for example, the virtual camera image/sound output unit 08108 may display a virtual viewpoint image with a certain position which is near the specified position and which is outside the restriction region as a viewpoint. By this, a burden of the operator for specifying a viewpoint again outside the restriction region is reduced.

Figure 9:
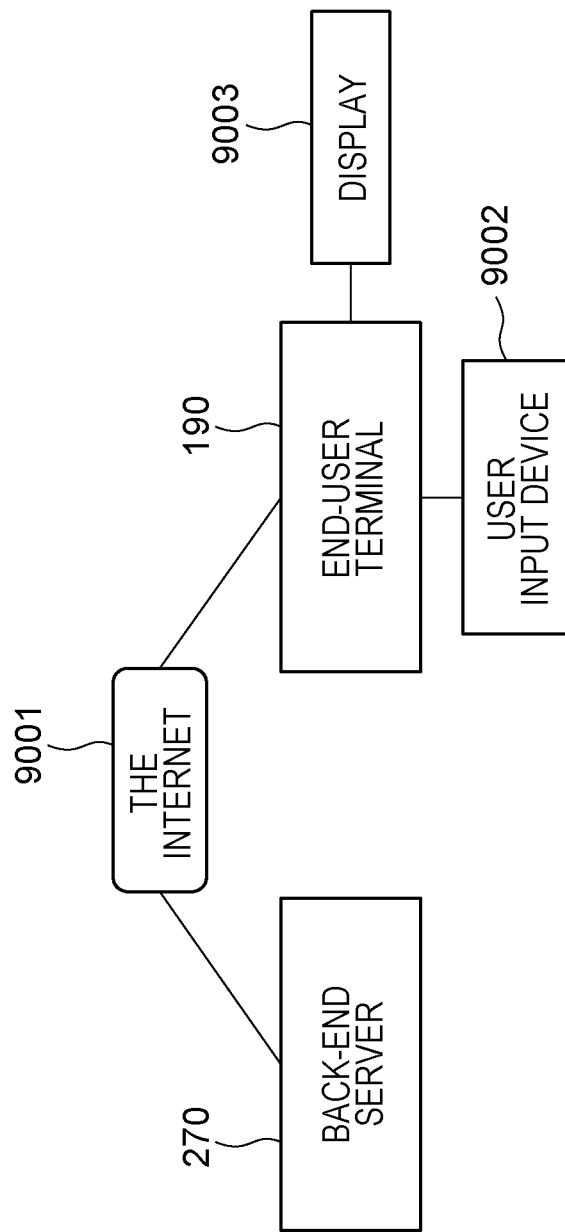
FIG. 9 is a diagram illustrating a connection configuration of an end-user terminal.

Next, the end-user terminal 190 used by the viewer (the user) will be described. FIG. 9 is a diagram illustrating a configuration of the end-user terminal 190.

The end-user terminal 190 operating a service application is a personal computer (PC), for example. Note that the end-user terminal 190 is not limited to a PC and may be a smartphone, a tablet terminal, or a high-definition large display.

The end-user terminal 190 is connected to the back-end server 270 which delivers an image through the Internet 9001. For example, the end-user terminal 190 (PC) is connected to the Internet 9001 through a local area network (LAN) cable or a wireless LAN.

Furthermore, a display 9003 which displays a virtual viewpoint image, such as a sports broadcasting image, viewed by the viewer and a user input device 9002 which accepts an operation of changing a viewpoint and the like performed by the viewer are connected to the end-user terminal 190. The display 9003 is a liquid crystal display, for example, and is connected to the PC through a display port cable. The user input device 9002 is a mouse or a keyboard and is connected to the PC through a universal serial bus (USB) cable.

Figure 10:
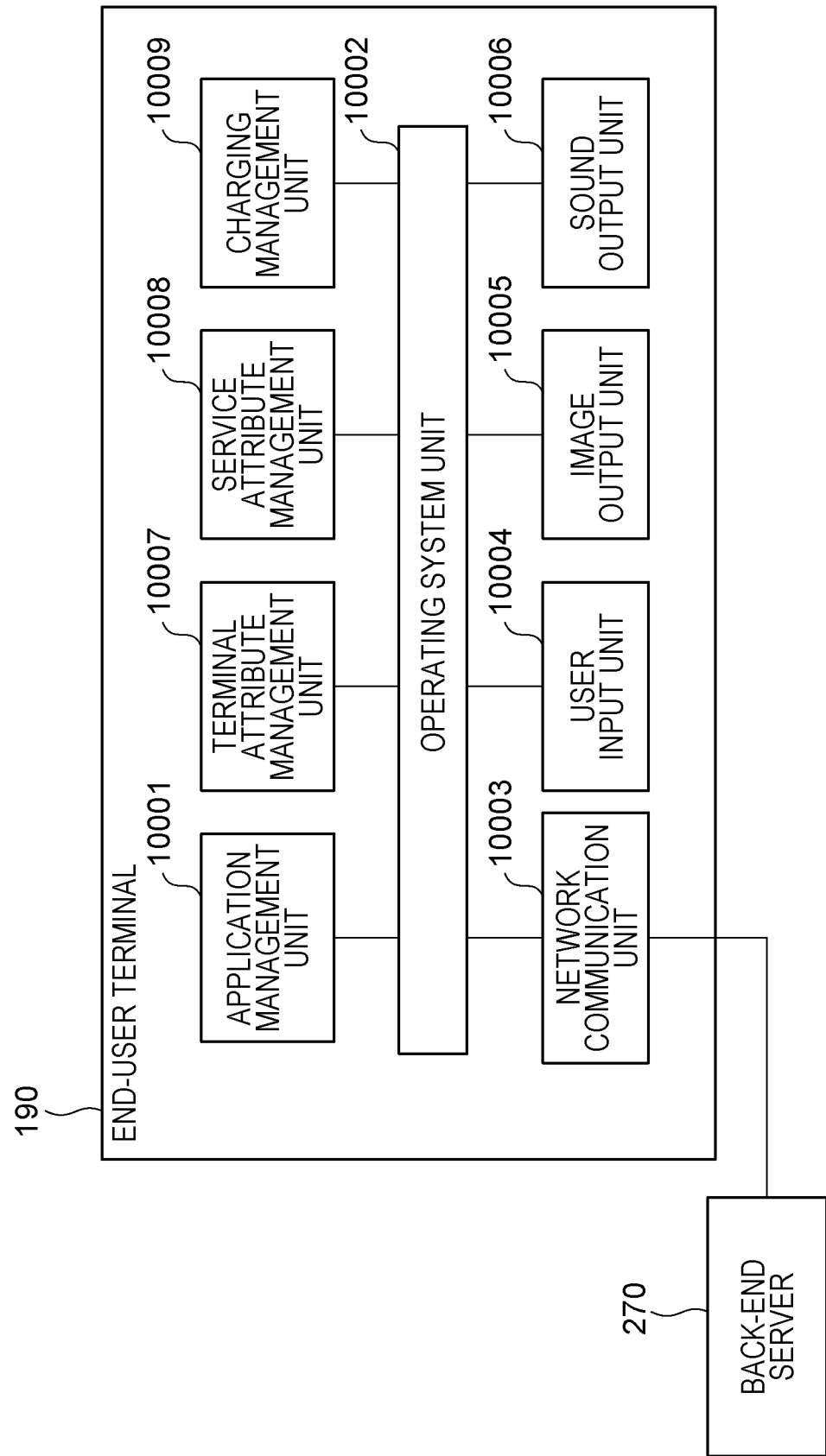
FIG. 10 is a block diagram illustrating a functional configuration of the end-user terminal.

An internal function of the end-user terminal 190 will now be described. FIG. 10 is a functional block diagram of the end-user terminal 190.

An application management unit 10001 converts user input information input by an operating system unit 10002 into a backend server command of the back-end server 270 to be output to the operating system unit 10002. Furthermore, the application management unit 10001 outputs an image rendering instruction for rendering an image input by the operating system unit 10002 in a predetermined display region to the operating system unit 10002.

The operating system unit 10002 is an operating system (OS), for example, and outputs user input information supplied from a user input unit 10004 described below to the application management unit 10001. Furthermore, the operating system unit 10002 outputs an image and sound supplied from a network communication unit 10003 described below to the application management unit 10001 and the back-end server command supplied from the application management unit 10001 to the network communication unit 10003. Furthermore, the operating system unit 10002 outputs the image rendering command supplied from the application management unit 10001 to an image output unit 10005.

The network communication unit 10003 converts the backend server command supplied from the operating system unit 10002 into a LAN communication signal which may be transmitted through the LAN cable and supplies the LAN communication signal to the back-end server 270. Thereafter, the network communication unit 10003 supplies image data and sound data supplied from the back-end server 270 to the operating system unit 10002 so that the data may be processed.

The user input unit 10004 obtains user input information based on a keyboard input (a physical keyboard or a soft keyboard) or a button input and user input information input through the USB cable from the user input device to be output to the operating system unit 10002.

The image output unit 10005 converts an image based on an image display instruction supplied from the operating system unit 10002 into an image signal to be output to an external display or an integrated display.

A sound output unit 10006 outputs sound data based on a sound output instruction issued by the operating system unit 10002 to an external speaker or an integrated speaker. A terminal attribute management unit 10007 manages resolution of the end-user terminal 190, an image coding codec type, and a terminal type (such as a smartphone, a large-size display, or the like).

A service attribute management unit 10008 manages information on a service type provided for the end-user terminal 190. The service attribute management unit 10008 manages, for example, a type of an application installed in the end-user terminal 190 and a usable image delivery service.

A charging management unit 10009 performs management of a settlement status registered by the user in the image delivery service and the number of receivable image delivery scenes corresponding to a charging amount and the like.

Next, a workflow of this embodiment will be described. A workflow in a case where a plurality of cameras 112 and a plurality of microphones 111 are installed in a facility, such as a stadium or a concert hall and imaging is performed will be described.

Figure 11:
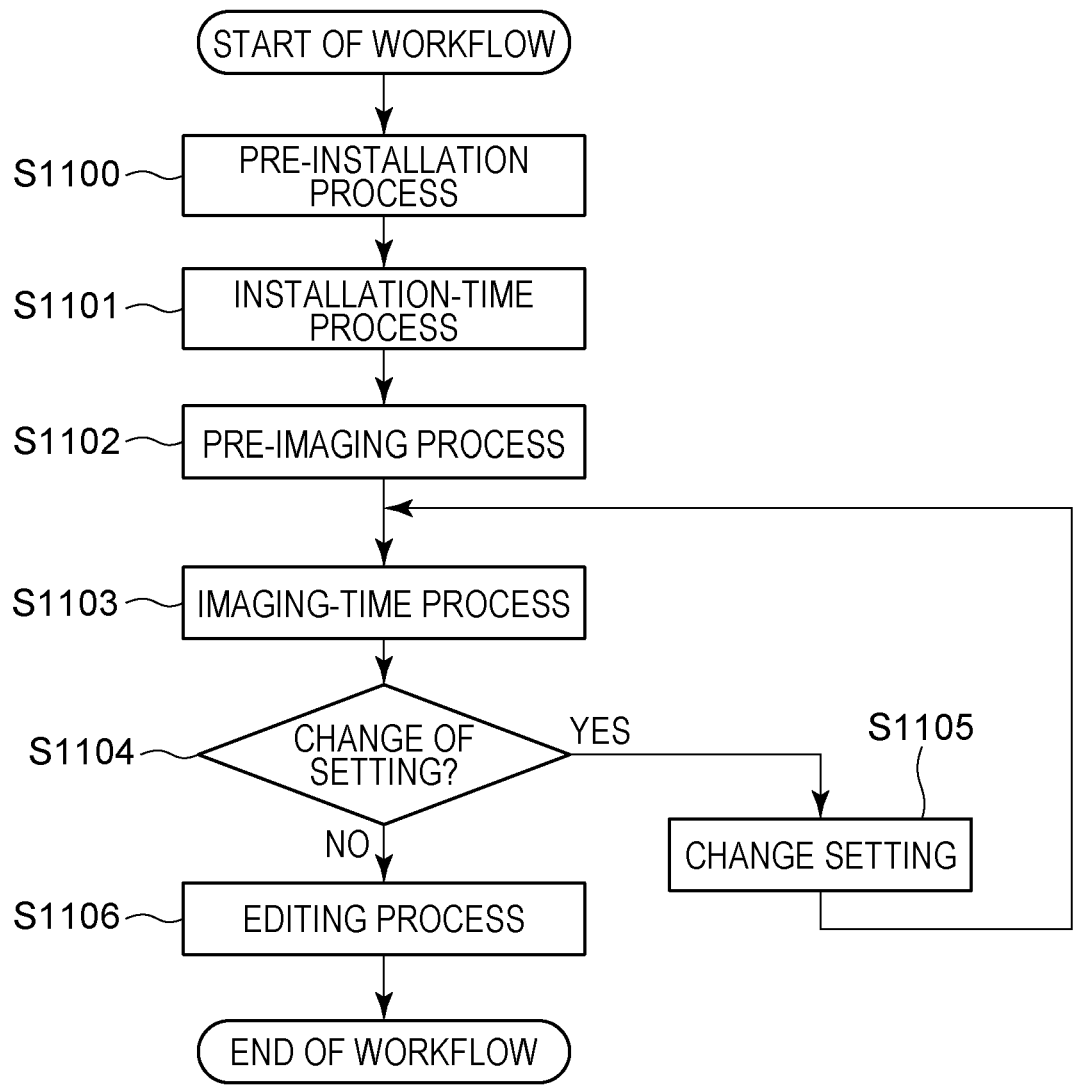
FIG. 11 is a flowchart of an entire workflow.

FIG. 11 is a flowchart of the entire workflow. A process of the workflow described below is realized under control of the controller 300 unless otherwise described. Specifically, control of the workflow is realized when the controller 300 controls the other devices (such as the back-end server 270 and the database 250) included in the image processing system 100.

Before start of the process in FIG. 11, the operator (the user) who installs and operates the image processing system 100 collects information required before the installation (prior information) and performs planning. Furthermore, it is assumed that the operator installs equipment in a target facility before start of the process in FIG. 11.

In step S1100, the control station 310 of the controller 300 accepts a setting input by the user based on the prior information. The process in step S1100 will be described in detail below with reference to FIG. 12. Next, in step S101, the devices included in the image processing system 100 perform processes for checking an operation of the system in accordance with a command issued by the controller 300 in accordance with a user operation. The process in step S1101 will be described in detail below with reference to FIG. 13.

Figure 14:
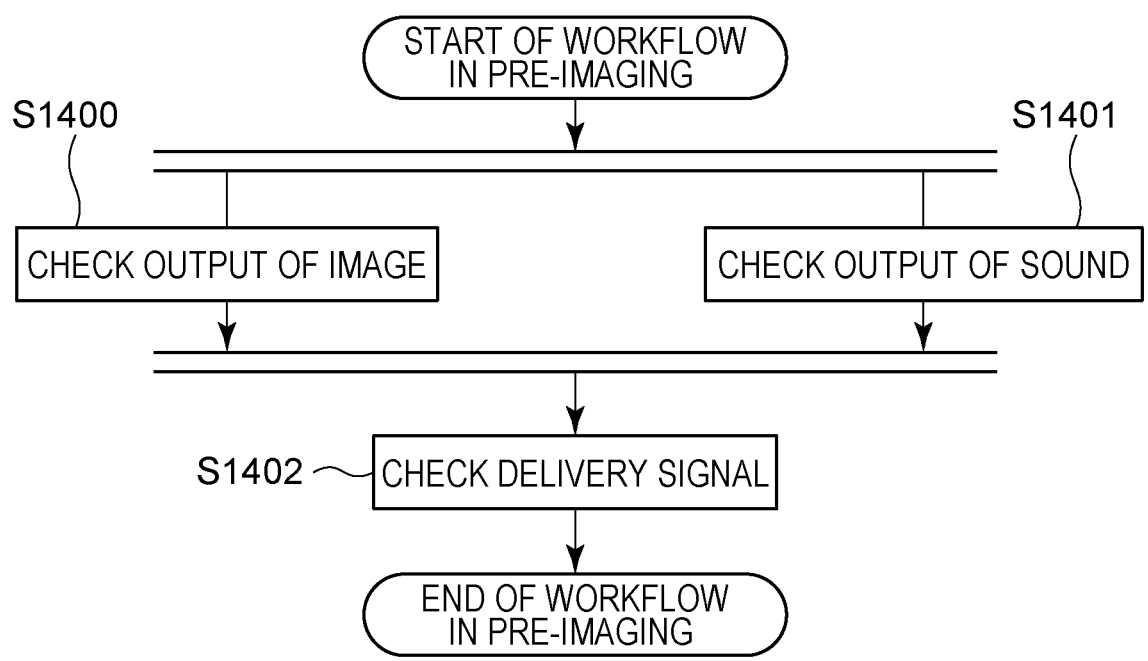
FIG. 14 is a flowchart of a workflow before imaging.

In step S1102, the virtual camera operation UI 330 outputs an image and sound before start of imaging for a game or the like. By this, the user may check the sound collected by the microphones 111 and the images captured by the cameras 112 before the game or the like. A process in step S1102 will be described in detail below with reference to FIG. 14.

In step S1103, the control station 310 of the controller 300 causes the microphones 111 to collect sound and the cameras 112 to capture images. Although the imaging in this step includes sound collection using the microphones 111, the present invention is not limited to this and only images may be captured. The process in step S1103 will be described in detail below with reference to FIGS. 15 and 16. When the setting performed in step S1101 is to be changed or when the imaging is to be terminated, the process proceeds to step S1104. In step S104, when the setting performed in step S1101 is to be changed and the imaging is to be continued, the process proceeds to step S1105 whereas when the imaging is to be terminated, the process proceeds to step S1106. The determination in step S1104 is typically performed in accordance with a user input to the controller 300. However, the present invention is not limited to this example. In step S1105, the controller 300 changes the setting performed in step S1101. The changed content is typically determined by the user input obtained in step S1104. When the imaging is to be stopped in the change of the setting in this step, the imaging is temporarily stopped and started after the setting is changed. Furthermore, when the imaging is not required to be stopped, the change of the setting is performed in parallel to the imaging.

In step S1106, the controller 300 performs editing on the images captured by the plurality of cameras 112 and sound collected by the plurality of microphones 111. The editing is typically performed based on a user operation input through the virtual camera operation UI 330.

Note that the processes in step S1106 and step S1103 may be performed in parallel. For example, when a sports game or a concert is delivered in real time (for example, images of a game are delivered during the game), the imaging in step S1103 and the editing in step S1106 are simultaneously performed. Furthermore, when a highlight image of a sports game is to be delivered after the game, the editing is performed after the imaging is terminated in step S1104.

Figure 12:
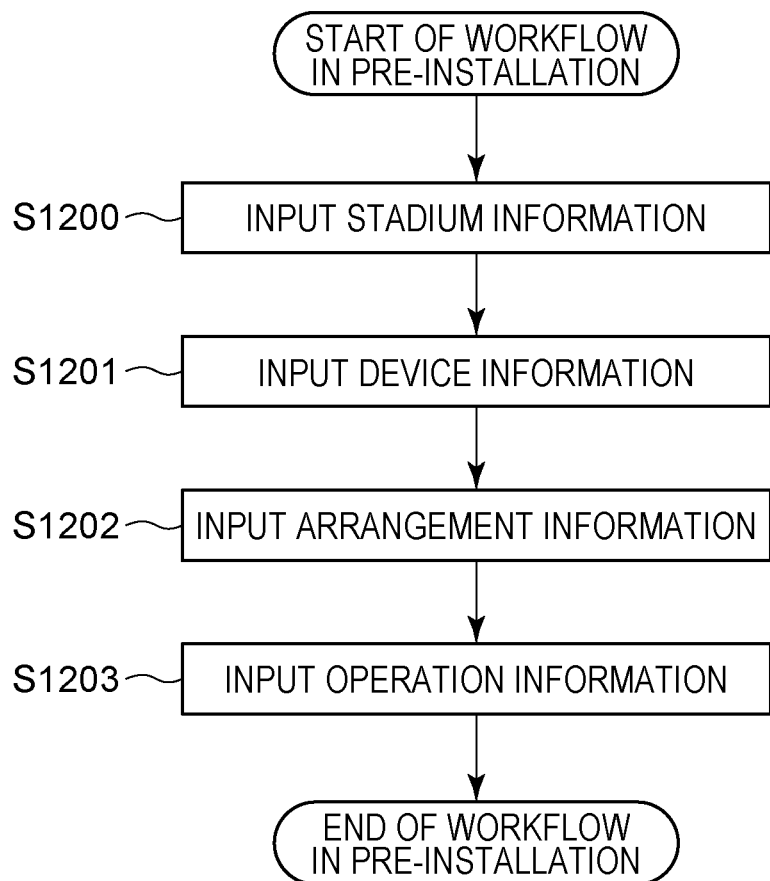
FIG. 12 is a flowchart of a workflow before installation of machinery.
Figure 13:
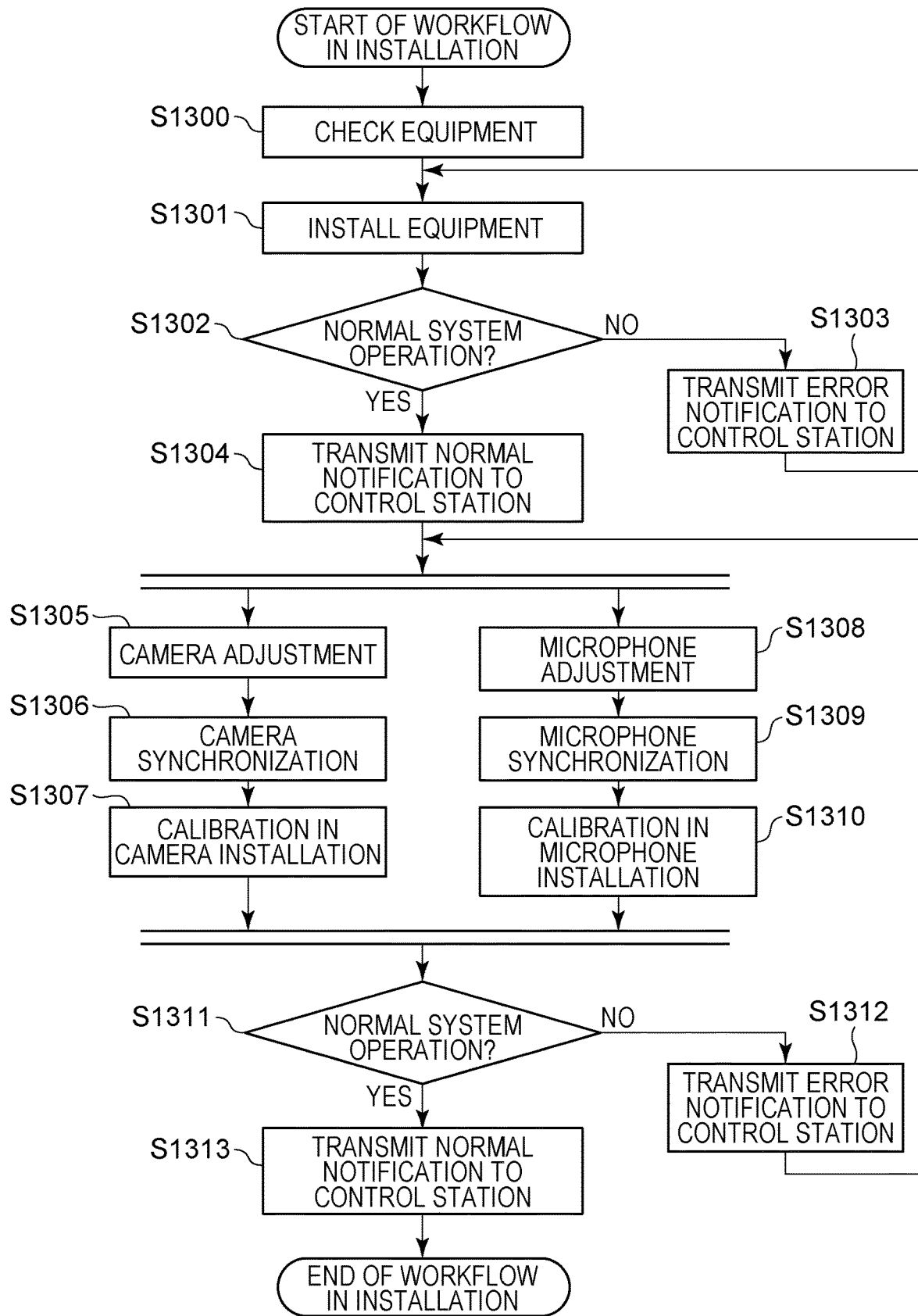
FIG. 13 is a flowchart of a workflow at a time of the installation of the machinery.

Next, the process in step S1100 (installation preprocessing) will be described in detail with reference to FIG. 12. First, in step S1200, the control station 310 accepts a user input associated with information on a facility to be captured (stadium information).

The stadium information in this step indicates a shape of the stadium, sound, brightness, a power source, a transmission environment, and 3D model data of the stadium. Specifically, the stadium information includes the stadium shape data described above. Note that a case where a facility to be captured is a stadium is described in this embodiment. In this case, it is assumed that images of a sports game held in the stadium are generated. Note that some sports games are held indoors, and therefore, the facility of an imaging target is not limited to a stadium. Furthermore, a virtual viewpoint image of a concert in a concert hall may be generated and images in an outdoor concert in a stadium may be generated, and therefore, an event of an imaging target is not limited to a game.

In step S1201, the control station 310 accepts a user input associated with device information. The device information in this step indicates information on imaging equipment such as the cameras, the camera platforms, the lenses and the microphones, information on information devices, such as the LAN, the PC, the server, and the cables, and information on the relay vehicle. However, all the information is not necessarily input.

In step S1202, the control station 310 accepts an input of arrangement information of the cameras, the camera platforms, and the microphones in the imaging equipment in which the device information is input in step S1201. The arrangement information may be input using the 3D model data of the stadium described above.

In step S1203, the control station 310 accepts a user input associated with operation information of the image processing system 100. The operation information in this step indicates an imaging target, an imaging time, a camera work, and a gazing point. For example, when an imaging target is an opening ceremony in which the number of foreground images, such as players, in a captured image is overwhelmingly larger than those in games, an image generation method may be changed to a method suitable for the situation. Furthermore, depending on a game type, such as track and field, a soccer game using a field, or the like, a change of a gazing point which is captured by a plurality of cameras and a change of a restriction condition of the camera work may be performed. A setting information table configured by a combination of the operation information is managed, changed, and instructed by the control station 310. This control will be described below. After the process from step S1200 to step S1203 is performed as described above, the workflow before the system installation is completed. Next, the process in step S1101 (processing at installation) will be described in detail with reference to FIG. 13. In step S1300, the control station 310 accepts a user input associated with shortage and overage of installed equipment. The user checks the shortage and overage by comparing the device information input in step S1201 with the equipment to be installed so as to determine whether shortage or overage of installed equipment occurs. In step S1301, the control station 310 executes a process of checking installation of equipment corresponding to the shortage in step S1300. That is, the user may install the equipment corresponding to the shortage between the process in step S1300 and the process in step S1301, and the control station 310 confirms that the equipment corresponding to the shortage has been installed by the user.

Next, in step S1302, the control station 310 activates the equipment installed in step S1301 and performs system operation check before adjustment so as to determine whether the installed equipment normally operates. Note that, in the process in step S1302, the user may perform the system operation check before the user inputs a result of the check in the control station 310.

If the shortage and overage of equipment or an error occurs in the operation, an error notification is transmitted to the control station 310 (S1303). The control station 310 is brought into a lock state, that is, does not proceed to a next step until the error is cancelled. When the error state is cancelled, a normal notification is transmitted to the control station 310 (S1304) and the process proceeds to the next step. By this, the error may be detected in an initial stage. After the check, the process proceeds to step S1305 where a process associated with the camera 112 is performed whereas the process proceeds to step S1308 where a process associated with the microphone 111 is performed.

First, the cameras 112 will be described. In step S1305, the control station 310 adjusts the installed cameras 112. The adjustment of the cameras 112 in this step indicates adjustment of angles of view and adjustment of color and is performed on all the installed cameras 112. The adjustment in step S1305 may be performed in accordance with a user operation or may be realized by an automatic adjustment function.

Furthermore, in the adjustment of angles of view, adjustments of zooming, panning, tilting, and focusing are performed in parallel, and results of the adjustments are stored in the control station 310. In the adjustment of color, adjustments of IRIS, ISO/gain, white balance, sharpness, and a shutter speed are simultaneously performed, and results of the adjustments are stored in the control station 310.

In step S1306, the control station 310 performs adjustment such that all the installed cameras 112 are synchronized with one another. The adjustment of the synchronization in step S1306 may be performed in accordance with a user operation or may be realized by the automatic adjustment function. In step S1307, the control station 310 performs calibration at a time of camera installation. Specifically, the control station 310 performs adjustment such that coordinates of all the installed cameras 112 match a world coordinate. The calibration will be described in detail below with reference to FIG. 17. Note that control commands of the cameras 112 and a communication acknowledgement of a network path associated with synchronization with a time server are also performed. Then a waiting state is entered in the system operation normal check process after the adjustment (S1311).

Next, a process associated with the microphones 111 will be described. In step S1308, the control station 310 adjusts the installed microphones 111. The adjustment of the microphones 111 in this step indicates gain adjustment and is performed on all the installed microphones 111. The adjustment of the microphones 111 in step S1308 may be performed in accordance with a user operation or may be realized by the automatic adjustment function.

In step S1309, the control station 310 performs control such that all the installed microphones 111 are synchronized with one another. Specifically, the control station 310 checks a synchronization clock. The adjustment of the synchronization in step S1309 may be performed in accordance with a user operation or may be realized by the automatic adjustment function.

In step S1310, the control station 310 adjusts positions of microphones 111 which are installed in a field among the installed microphones 111. The adjustment of the positions of the microphones 111 in step S1310 may be performed in accordance with a user operation or may be realized by the automatic adjustment function. Note that control commands of the microphones 111 and a communication acknowledgement of a network path associated with synchronization with a time server are also performed.

In step S1311, the control station 310 performs system operation check after the adjustment so as to determine whether the cameras 112a to 112z and the microphones 111a to 111z have been appropriately adjusted. The process in step S1311 may be executed in response to a user instruction. When it is determined that a system operation after the adjustment has been normally performed on the cameras 112 and the microphones 111, a notification indicating a normal operation is transmitted to the control station 310 in step S1313. On the other hand, when an error occurs, an error notification is transmitted to the control station 310 along with types and individual numbers of the cameras 112 and the microphones 111 (S1312). The control station 310 issues an instruction for readjustment in accordance with a type and an individual number of a device in which an error occurs.

Next, the process in step S1102 (imaging preprocessing) described above will be described with reference to FIG. 14. In step S1400, the virtual camera operation UI 330 displays an image which has been subjected to a process performed by the back-end server 270. The operator (the user) of the controller 300 may check a result of processing performed by the back-end server 270 by checking a screen of the virtual camera operation UI 330.

In parallel to the process in step S1400, a process in step S1401 is performed. In step S1401, the virtual camera operation UI 330 outputs sound processed by the back-end server 270. The operator (the user) of the controller 300 may check a result of processing performed by the back-end server 270 by checking the output of the sound of the virtual camera operation UI 330.

In step S1402, the image and the sound processed by the back-end server 270 are combined with each other and the virtual camera operation UI 330 outputs a result of conversion of the combined image and sound into a delivery signal. The operator (the user) of the controller 300 may check the image and the sound which have been processed by the back-end server 270 by checking the output of the delivery signal of the virtual camera operation UI 330.

Figure 15:
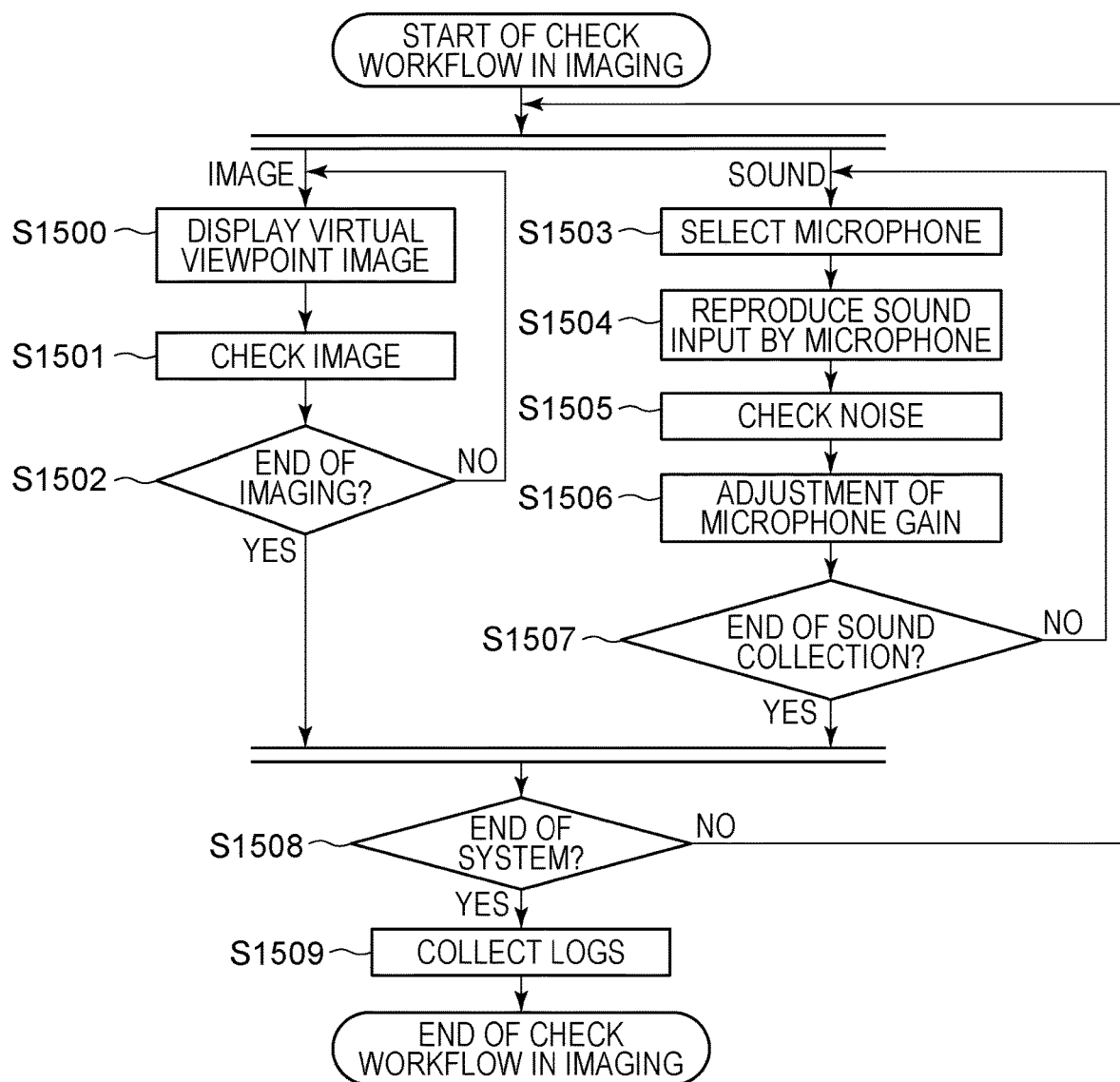
FIG. 15 is a flowchart of a workflow of checking at a time of imaging performed by a control station.
Figure 16:
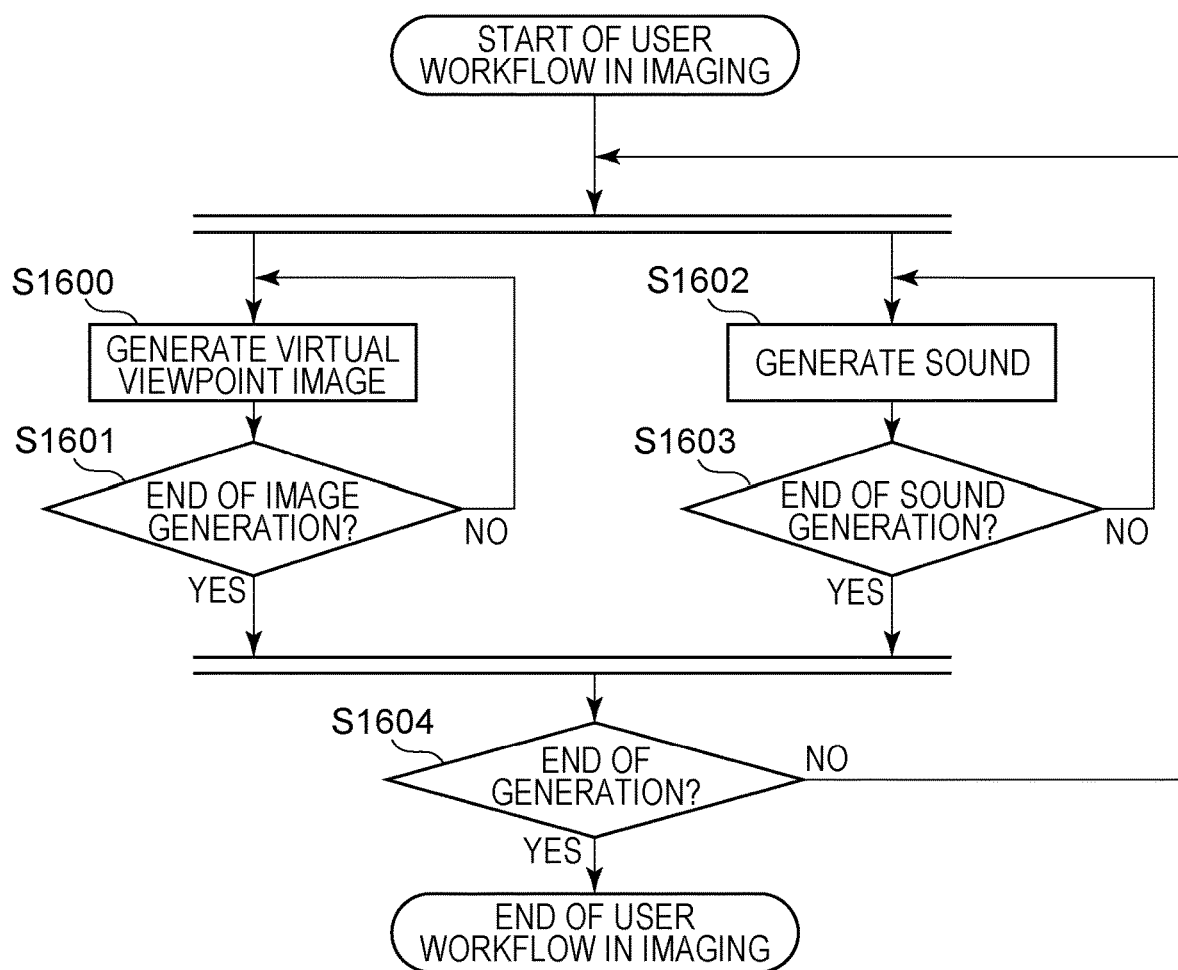
FIG. 16 is a flowchart of a user workflow at a time of imaging performed by the virtual camera operation UI.

Next, the process in step S1103 (the process in imaging) described above will be described in detail with reference to FIGS. 15 and 16.

In step S1103, the control station 310 performs the system control and the checking operation, and the virtual camera operation UI 330 performs the operation of generating an image and sound. The system control and the checking operation are illustrated with reference to FIG. 15, and the operation of generating an image and sound is illustrated with reference to FIG. 16. First, a description will be made with reference to FIG. 15. In the system control and the checking operation performed by the control station 310, the control of an image and sound and the checking operation are independently performed at the same time.

First, an operation associated with an image will be described. In step S1500, the virtual camera operation UI 330 displays a virtual viewpoint image generated by the back-end server 270. In step S1501, the virtual camera operation UI 330 accepts an input associated with a result of the checking performed by the user of the image displayed in step S1500. When it is determined that the imaging is to be terminated in step S1502, the process proceeds to step S1508, and otherwise, the process returns to step S1500. Specifically, during the imaging, the process in step S1500 and step S1501 is repeatedly performed. Note that the determination as to whether the imaging is to be terminated or continued may be made by the control station 310 in accordance with a user input, for example.

Next, an operation associated with sound will be described. In step S1503, the virtual camera operation UI 330 accepts a user operation associated with a result of a selection of the microphones 111. Note that, when the microphones 111 are selected one by one in predetermined order, a user operation is not necessarily performed. In step S1504, the virtual camera operation UI 330 reproduces sound of the microphone 111 selected in step S1503. In step S1505, the virtual camera operation UI 330 determines whether noise is included in sound reproduced in step S1504. The determination as to whether noise is included may be made by the operator (the user) of the controller 300, may be automatically made by a sound analysis process, or may be made by both of the methods. When the user determines presence or absence of noise, the virtual camera operation UI 330 accepts an input associated with a result of the noise determination performed by the user in step S1505. When the noise is detected in step S1505, the virtual camera operation UI 330 adjusts a microphone gain in step S1506. The adjustment of the microphone gain in step S1506 may be performed in accordance with a user operation or may be realized by the automatic adjustment function. Note that, when the adjustment of the microphone gain is to be performed in accordance with a user operation, the virtual camera operation UI 330 accepts a user input associated with the adjustment of the microphone gain and adjusts the microphone gain in accordance with the user input in step S1506. Furthermore, the selected microphones 111 may be stopped depending on a noise state. When it is determined that the sound collection is to be terminated in step S1507, the process proceeds to step S1508, and otherwise, the process returns to step S1503. That is, during the sound collection, the process from step S1503 to step S1506 is repeatedly performed. Note that the determination as to whether the sound collection is to be terminated or continued may be made by the control station 310 in accordance with a user input, for example.

When it is determined that the system is to be terminated in step S1508, the process proceeds to step S1509, and otherwise, the process returns to step S1500 and step S1503. The determination in step S1508 may be executed in accordance with a user operation. In step S1509, logs obtained by the image processing system 100 are collected by the control station 310. Next, an operation of generating an image and sound will be described with reference to FIG. 16. In the operation of generating an image and sound performed by the virtual camera operation UI 330 described above, an image and sound are individually generated in parallel.

First, an operation associated with an image will be described. In step S1600, the virtual camera operation UI 330 issues an instruction for generating a virtual viewpoint image to the back-end server 270. In step S1600, the back-end server 270 generates a virtual viewpoint image in accordance with the instruction issued by the virtual camera operation UI 330. When it is determined that the image generation is to be terminated in step S1601, the process proceeds to step S1604, and otherwise, the process returns to step S1600. The determination in step S1601 may be executed in accordance with a user operation.

Next, an operation associated with sound will be described. In step S1602, the virtual camera operation UI 330 issues an instruction for generating virtual viewpoint sound to the back-end server 270. In step S1602, the back-end server 270 generates virtual viewpoint sound in accordance with the instruction issued by the virtual camera operation UI 330. When it is determined that the sound generation is to be terminated in step S1603, the process proceeds to step S1604, and otherwise, the process returns to step S1602. Note that the determination in step S1603 may be linked with the determination in step S1601.

Next, a workflow at a time of installation and a workflow before imaging will be described. The image processing system 100 may control switching between a state in which calibration is performed at a time of installation and a state in which normal imaging is performed by changing an operation mode. Note that calibration of a certain camera may be required during imaging, and in this case, two types of operation, that is, imaging and calibration, are performed.

Figure 17:
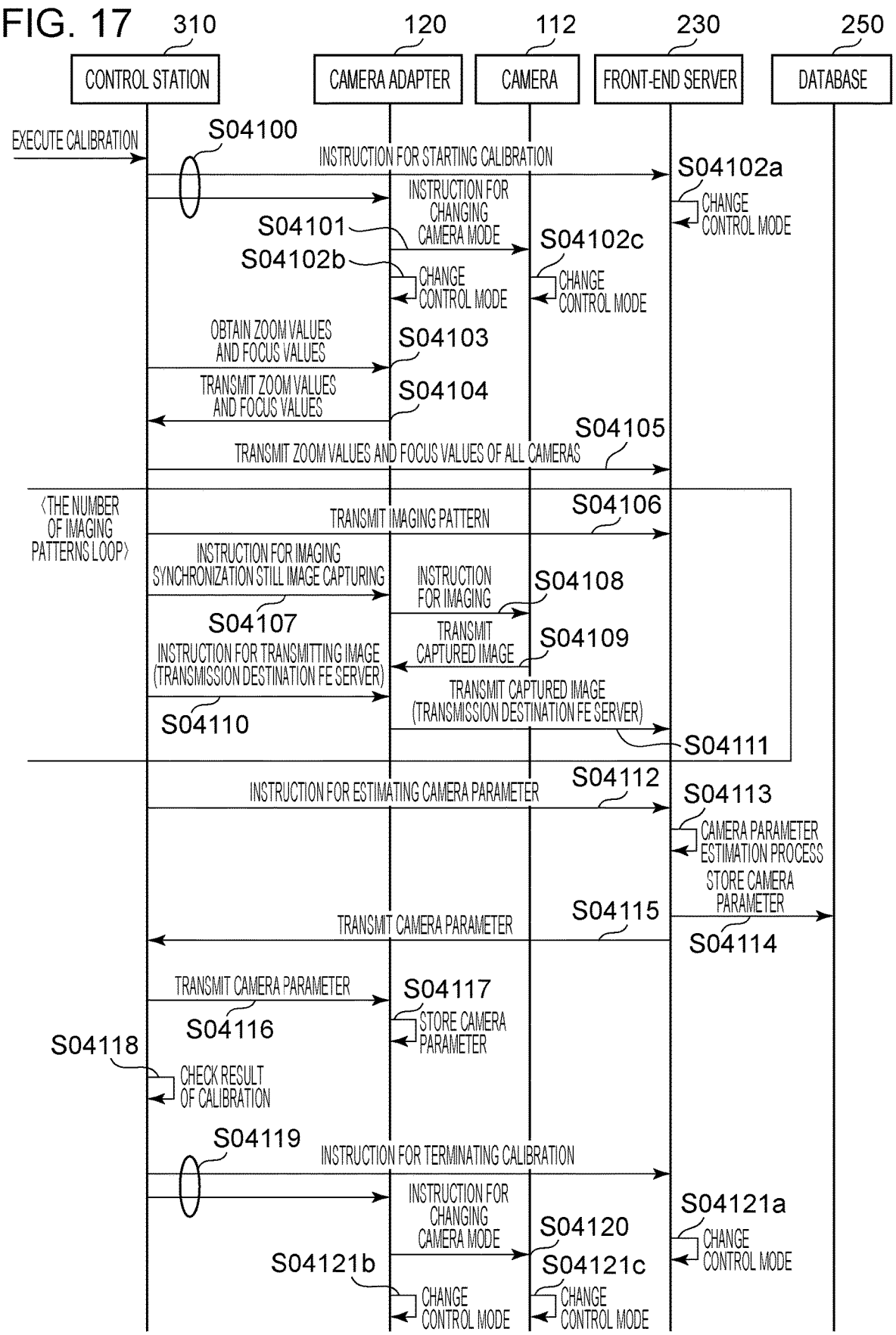
FIG. 17 is a sequence diagram illustrating an entire process of calibration at a time of installation.

The calibration process at a time of installation will be described with reference to a flowchart of FIG. 17. In FIG. 17, although descriptions of a notification of completion of reception of data and a notification of completion of processing in response to instructions transmitted and received between devices are omitted, some sort of response is returned in response to the instructions.

When installation of the cameras 112 is completed, the user instructs the control station 310 to execute calibration at a time of installation. Then the control station 310 instructs the front-end server 230 and the camera adapter 120 to start calibration (S04100).

When receiving an instruction for starting calibration, the front-end server 230 determines that image data received after the instruction is data for calibration and changes a control mode so that the calibration unit 02140 becomes available for processing (S04102a). Furthermore, when receiving an instruction for starting calibration, the camera adapter 120 enters a control mode for coping with a uncompressed frame image without performing image processing, such as foreground/background separation (S04102b). Furthermore, the camera adapter 120 instructs the camera 112 to change a camera mode (S04101). When receiving the instruction, the cameras 112 set a frame rate of 1 fps, for example. Alternatively, a mode in which the cameras 112 transmits a still image instead of a moving image may be set (S04102c). Furthermore, a mode in which a frame rate is controlled by the camera adapter 120 and a calibration image is transmitted may be set.

The control station 310 instructs the camera adapter 120 to obtain a zoom value and a focus value of the camera 112 (S04103), and the camera adapter 120 transmits the zoom value and the focus value of the camera 112 to the control station 310 (S04104).

Note that, although only one camera adapter 120 and one camera 112 are illustrated in FIG. 17, all the camera adapters 120 and all the cameras 112 included in the image processing system 100 are individually controlled. Therefore, the process in step S04103 and step S04104 is executed a number of times corresponding to the number of cameras 112, and when the process in step S04103 and step S04104 performed on all the cameras 112 is completed, the control station 310 has received the zoom values and the focus values of all the cameras 112.

The control station 310 transmits the zoom values and the focus values of all the cameras 112 received in step S04104 to the front-end server 230 (S04105). Subsequently, the control station 310 notifies the front-end server 230 of an imaging pattern for imaging for the calibration at a time of installation (S04106).

Here, an attribute of a pattern name (a pattern 1-10, for example) for identifying one of images captured a plurality of times in different timings while a marker or the like serving as an image feature point is moved in a ground is added to the imaging pattern. Specifically, the front-end server 230 determines that image data for calibration received after step S04106 is a captured image of the imaging pattern received in step S04106. Thereafter, the control station 310 instructs the camera adapters 120 to perform synchronization still image capturing (S04107), and the camera adapters 120 instruct the cameras 112 to perform still image capturing while all the cameras 112 are synchronized with one another (S04108). Thereafter, the cameras 112 transmit the captured images to the camera adapters 120 (S04109).

Note that a plurality of groups of gazing points exit, the calibration image capturing from step S04106 to step S04111 may be performed for each gazing point group.

Thereafter, the control station 310 instructs the camera adapters 120 to transmit images which are instructed to be captured in step S04107 to the front-end server 230 (S04110). Furthermore, the camera adapters 120 transmit the images received in step S04109 to the front-end server 230 specified as a transmission destination (S04111).

In step S04111, the image for calibration is transmitted in step S04111 without being subjected to image processing, such as the foreground/background separation, and without compression of the captured image. Therefore, when all the cameras 112 capture images in high resolution or when the number of cameras 112 is large, all uncompressed images may not be simultaneously transmitted due to restriction of a transmission band. Consequently, a period of time required for the calibration may become long in the workflow. In this case, an instruction for transmitting an uncompressed image corresponding to the pattern attribute of the calibration is issued in turn to each of the camera adapters 120 in the image transmission instruction in step S04110. Furthermore, in this case, a larger number of feature points corresponding to the pattern attribute of the marker are required to be captured, and therefore, image capturing for calibration using a plurality of markers is performed. In this case, the image capturing and the transmission of uncompressed images may be performed in an asynchronous manner in terms of load distribution. Furthermore, the uncompressed images obtained in the image capturing for calibration are successively accumulated in the camera adapter 120 for individual pattern attributes, and in parallel to this, transmission of the uncompressed images is performed in response to an image transmission instruction issued in step S04110. By this, effect of reduction of a processing time of the workflow and reduction of human error may be attained.

When the process in step S04111 is completed in all the cameras 112, the front-end server 230 is in a state in which images captured by all the cameras 112 have been received.

When a plurality of imaging patterns exist as described above, the process from step S04106 to step S04111 is repeatedly performed for a number of patterns.

Subsequently, when all the imaging for calibration is completed, the control station 310 instructs the front-end server 230 to perform a camera parameter estimation process (S04112).

When receiving the instruction for performing the camera parameter estimation process, the front-end server 230 performs the camera parameter estimation process using the zoom values and the focus values of all the cameras 112 received in step S04105 and the captured images of all the cameras 112 received in step S4111 (S04113). The camera parameter estimation process performed in step S04113 will be described below in detail. When a plurality of gazing points exist, the camera parameter estimation process is performed for each gazing point group in step S04113.

Then the front-end server 230 transmits camera parameters of all the cameras 112 obtained as results of the camera parameter estimation process performed in step S04113 to the database 250 which store the camera parameters (S04114).

Furthermore, the front-end server 230 similarly transmits the camera parameters of all the cameras 112 to the control station 310 (S04115). The control station 310 transmits the camera parameters corresponding to the cameras 112 to the camera adapters 120 (S04116), and the camera adapters 120 store the received camera parameters of the corresponding cameras 112 (S04117).

Thereafter, the control station 310 checks a calibration result (S04118). As a checking method, numerical values of the obtained camera parameters may be checked, a calculation process in the camera parameter estimation process performed in step S04114 may be checked, or an image generated through image generation using the camera parameters may be checked. Then the control station 310 instructs the front-end server 230 to terminate the calibration (S04119).

When receiving the instruction for terminating the calibration, unlike the calibration start process executed in step S04101, the front-end server 230 changes a control mode so that image data received after the instruction is determined not to be data for calibration (S04120). According to the process described above, in the installation calibration process, the camera parameters of all the cameras are obtained and the obtained camera parameters are stored in the camera adapter 120 and the database 250.

Furthermore, the installation calibration process is performed after the installation of the camera 112 and before the imaging. If the camera 112 is not moved, the process is not required to be performed again. However, if the camera 112 is moved (for example, when a gazing point is to be changed before and after a game), the same process is performed again.

Furthermore, when the camera 112 is moved by a predetermined threshold value or more due to an accident, such as collision of a ball during imaging, the camera 112 in an imaging state may be brought into a calibration start state and the installation calibration described above may be performed. In this case, the system maintains a normal imaging state and information indicating that only the camera 112 transmits an image for calibration is transmitted to the front-end server 230. In this way, the entire system is not required to be brought into a calibration mode, and imaging may be continuously performed. Furthermore, in the transmission in the daisy chain in this system, if an uncompressed image for calibration is transmitted to a transmission band of image data in normal imaging, a transmission band restriction may be exceeded. In this case, a transmission priority of the uncompressed image is lowered or the uncompressed image is divided before transmission. Furthermore, when connection among the camera adapters 120 is 10 GbE or the like, a full duplex characteristic is used to transmit the uncompressed image in a direction opposite to image data transmission in normal imaging so that a band may be ensured.

Furthermore, if one of a plurality of gazing points is to be changed, only the camera 112 corresponding to a group of the gazing point may perform the installation calibration process described above again. In this case, the camera 112 of the target gazing point group may not perform the normal imaging or the generation of a virtual viewpoint image. Therefore, a notification indicating that the calibration processing is being performed is transmitted to the control station 310, and the control station 310 requests the virtual camera operation UI 330 to perform processing, such as restriction of a viewpoint operation. The front-end server 230 performs the camera parameter estimation process while the camera parameter estimation process does not affect the process of generating a virtual viewpoint image.

Figure 18:
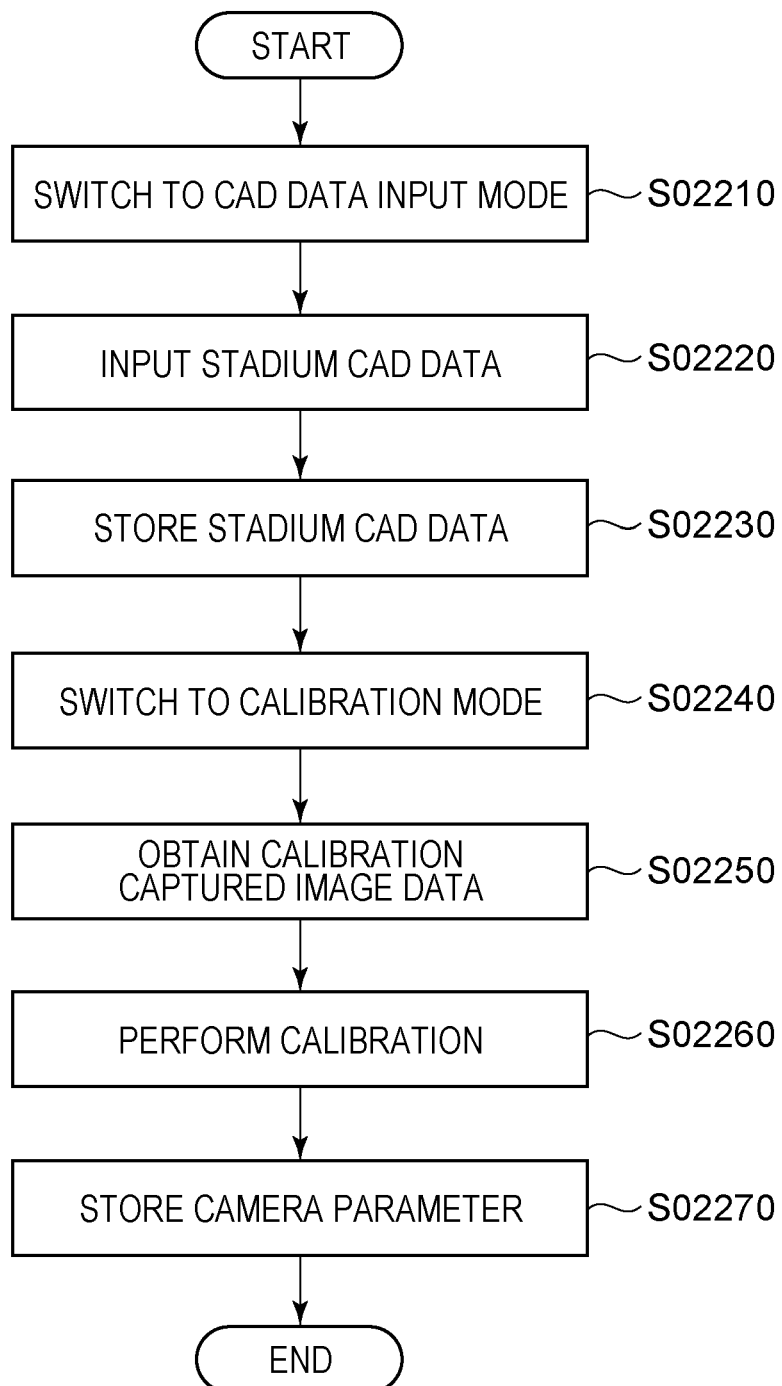
FIG. 18 is a flowchart of an operation of the front-end server before the imaging.

Operations of the front-end server 230 in step S1200 in the pre-installation workflow and in step S1305 in the installation workflow will be described with reference to a flowchart of FIG. 18.

In step S1200 in the pre-installation workflow, the controller 02110 of the front-end server 230 receives an instruction for switching to an input mode of CAD data from the control station 310 and performs the switching to the CAD data input mode (S02210).

The data input controller 02120 receives stadium CAD data (stadium shape data) from the control station 310 (S02220). The data input controller 02120 transmits the received data to the non-imaging data file generation unit 02185 and the CAD data storage unit 02135. The CAD data storage unit 02135 stores the stadium shape data supplied from the data input controller 02120 in a storage medium (S02230).

In step S1305 in the installation workflow, the controller 02110 receives an instruction for switching to a calibration mode from the control station 310 and performs the switching to the calibration mode (S02240).

The data input controller 02120 receives a calibration captured image from the camera adapter 120 and transmits the calibration captured image to the calibration unit 02140 (S02250).

The calibration unit 02140 performs calibration so as to obtain camera parameters (S02260). The calibration unit 02140 stores the obtained camera parameters into a storage region, and transmits the camera parameters to the database 250 through the non-imaging data file generation unit 02185 and the DB access controller 02190 (S02270).

Figure 19:
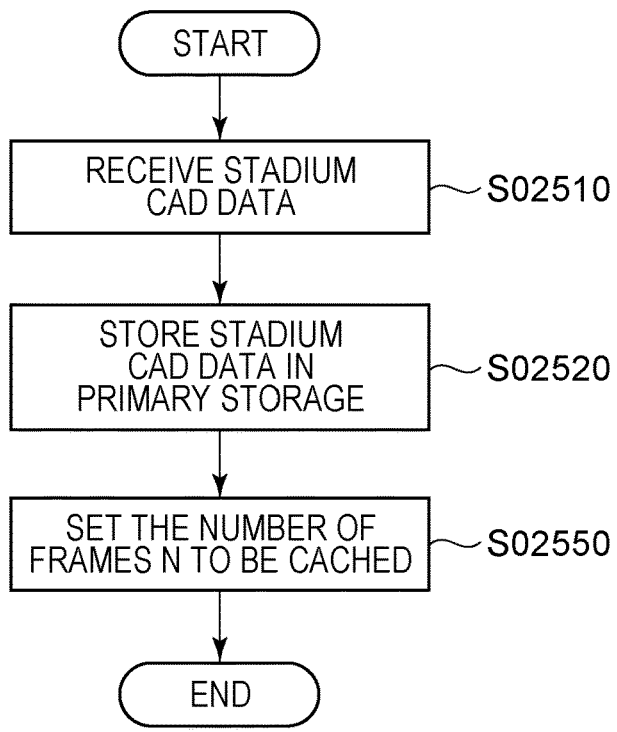
FIG. 19 is a flowchart of an operation of the database before the imaging.

An operation of the database 250 in step S1200 in the pre-installation workflow will be described with reference to a flowchart of FIG. 19. The database 250 executes processes in FIGS. 19 and 20 described below in response to instructions issued by the controller 300.

In step S1200 in the pre-installation workflow, the data input unit 02420 receives the stadium CAD data (the stadium shape data) from the front-end server 230 and stores the data in the cache 02440 (S02510). The cache 02440 moves the stored stadium CAD data into the primary storage 02450 so as to store the data (S02520).

Figure 20:
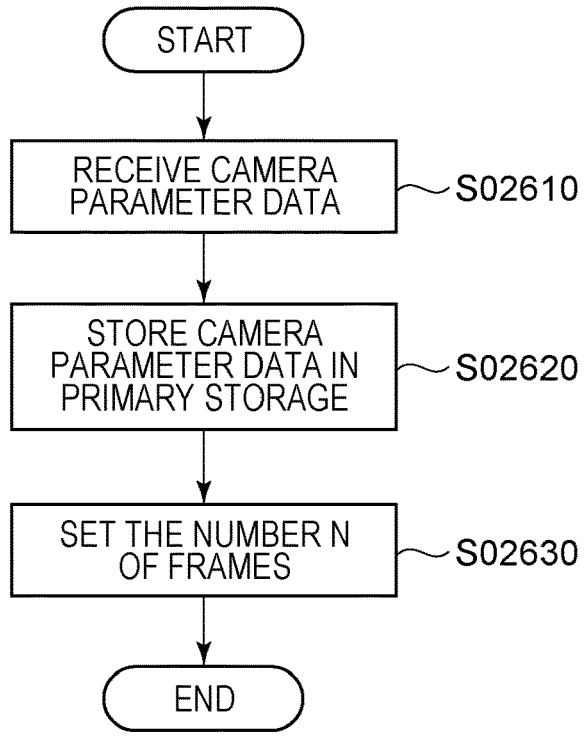
FIG. 20 is a flowchart of an operation of the database during the imaging.

An operation of the database 250 in step S1305 in the installation workflow will be described with reference to a flowchart of FIG. 20.

In step S1305 in the installation workflow, the data input unit 02420 receives the camera parameters from the front-end server 230 and stores the camera parameters in the cache 02440 (S02610).

The cache 02440 moves the stored camera parameters into the primary storage 02450 so as to store the camera parameters (S02620). The controller 02410 sets the number of frames N in accordance with an instruction issued by the control station 310 and capacity of the cache 02440 (S02630).

Figure 21:
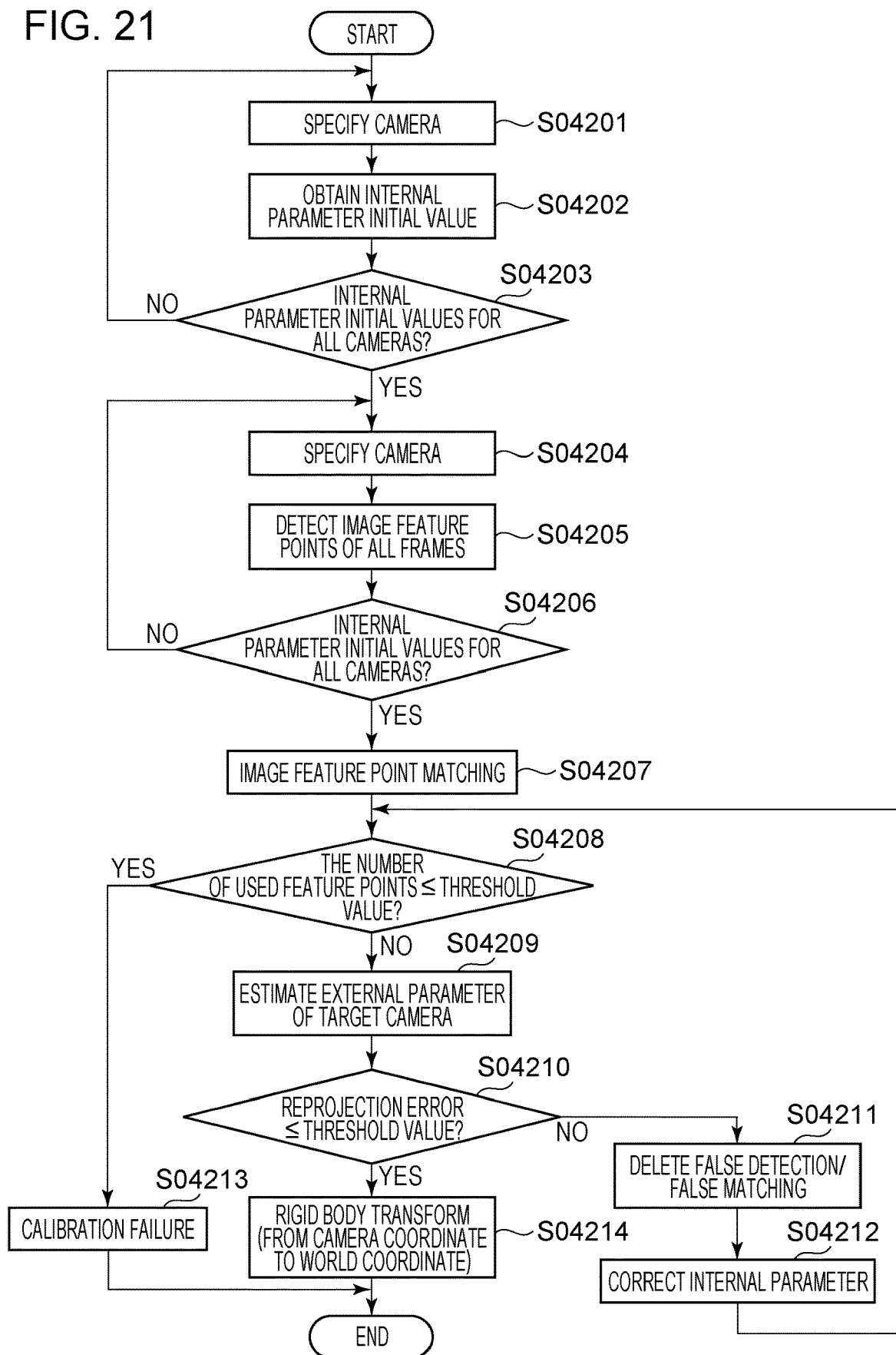
FIG. 21 is a flowchart of a calibration process at a time of installation.

Subsequently, the camera parameter estimation process performed by the calibration unit 02140 of the front-end server 230 will be described with reference to a flowchart of FIG. 21. Note that the calibration unit 02140 executes the camera parameter estimation process in accordance with an instruction issued by the control station 310. An internal parameter map, stadium data, zoom values and focus values of all the cameras 112, and captured images for calibration of all the cameras 112 have been stored in the calibration unit 02140 before this sequence is started.

First, the calibration unit 02140 specifies one of the cameras 112 (S04201), and thereafter, specifies a corresponding one of the zoom values and a corresponding one of the focus values so as to obtain an internal parameter initial value from the specified zoom value and the specified focus value using the internal parameter map (S04202). The process in step S04201 and step S04202 is repeatedly performed until internal parameter initial values of all the cameras 112 are obtained in step S4202 (S04203).

Subsequently, the calibration unit 02140 specifies another one of the cameras 112 again, and thereafter, specifies a corresponding one of the captured images for calibration (S04204) so as to detect a feature point in the image (an image feature point) (S04205). Examples of the image feature point include a marker provided for calibration, a pitch line drawn in the ground of the stadium in advance, and an edge portion of an object placed in advance (such as a soccer goal or bench for reserve players).

The process in step S04204 and step S04205 is repeatedly performed until image feature values of all the cameras 112 are detected in step S4205 (S04206).

Subsequently, the calibration unit 02140 performs matching among the image feature points of the captured images for calibration of the cameras 112 detected in step S04205 (S04207). Thereafter, the calibration unit 02140 determines whether the number of feature points used in the matching is equal to or smaller than a threshold value (S04208). The threshold value of the number of feature values used in step S04208 may be set in advance or may be automatically obtained depending on an imaging condition, such as the number of cameras 112 or a field of view. Specifically, a minimum required value for estimation of external parameters is used.

When the number of used feature points is not equal to or smaller than the threshold value in step S04208, the calibration unit 02140 performs an external parameter estimation process on the cameras 112 (S04209). As a result of the external parameter estimation process in step S04209, it is determined whether a re-projection error is equal to or smaller than a threshold value (S04210). The threshold value of the re-projection error used in step S04210 may be set in advance or may be automatically obtained in accordance with an imaging condition, such as the number of cameras 112, as long as a value corresponding to accuracy of a virtual viewpoint image to be generated is used.

When the re-projection error is not equal to or smaller than the threshold value in the determination in step S04210, the calibration unit 02140 determines that an error is large and performs a process of deleting false detection of an image feature point in step S04205 and a process of deleting false matching of an image feature point in step S04207 (S04211).

As a method for determining false detection and false matching in step S04211, the calibration unit 02140 may automatically delete a feature point having a large re-projection error or the user may manually delete such a feature point while viewing the re-projection error and the image.

The calibration unit 02140 performs internal parameter correction on the internal parameter initial value obtained in step S04202 (S04212). Then the process from step S04208 to step S04212 is repeatedly performed until the re-projection error becomes equal to or smaller than the threshold value in step S04210 within a range in which the number of used feature points is not equal to or smaller than the threshold value in step S04208.

When the number of used feature points is equal to or smaller than the threshold value in the determination in step S04208, the calibration unit 02140 determines that the calibration fails (S04213). When the calibration fails, the imaging for calibration is performed again. A result of the determination as to whether the calibration has successfully performed or failed is transmitted to the control station 310, and countermeasures including the calibration process performed after the failure are integrally managed by the control station 310.

When the re-projection error is equal to or smaller than the threshold value in the determination in step S04210, the calibration unit 02140 performs rigid body transform from a camera coordinate system to a world coordinate system in the external parameter coordinate estimated in step S04209 using the stadium data (S04214).

As the stadium data, coordinate values for performing the rigid body transform, such as originals of X, Y, and Z axes (a center point of a center circle on a pitch, for example) or coordinate values of a plurality of feature points in the stadium (intersection points of pitch lines, for example), are defined.

Note that, in a case where the stadium data does not exist or data accuracy is low, for example, a world coordinate for the rigid body transform may be manually input or data indicating the world coordinate may be independently assigned to the calibration unit 02140.

The world coordinate in the captured image for calibration is obtained by performing the process in step S04214, and therefore, coordinates of feature points included in the stadium recorded in the stadium data in advance may be updated so that accuracy is improved.

According to the process described above, in the camera parameter estimation process, the camera parameters of all the cameras 112 may be obtained and the obtained camera parameters may be stored in the camera adapter 120 and the database 250.

Note that in the system which generates a virtual viewpoint image using captured image of a plurality of cameras 112, when the cameras 112 are installed, the calibration process for estimating positions and orientations of the cameras 112 at a time of installation of the cameras 112 (installation calibration) is required.

In the installation calibration, a process of obtaining camera parameters of the individual cameras 112 is performed. The camera parameters include internal parameters unique to each camera (including parameters of a focal length, an image center, and lens distortion) and external parameters (a rotation matrix, a position vector, and the like) indicating a position/orientation of each camera. When the installation calibration process is completed, the camera parameters of the individual cameras 112 have been obtained.

Among the camera parameters, the internal parameters are changed in accordance with the zoom values and the focus values when the cameras 112 and the lenses are determined. Therefore, in this system, imaging required for obtaining the internal parameters is performed using the cameras 112 and the lenses before the cameras 112 are installed in the stadium so that the internal parameters are obtained. Then, it is set that the internal parameters may be automatically obtained when the zoom values and the focus values are determined when the cameras 112 are installed in the stadium. This is represented that the internal parameters are mapped in this embodiment, and a result of the mapping is referred to as an "internal parameter map".

As a format of the internal parameter map, a format of a plurality of recorded internal parameters corresponding to the zoom values and the focus values may be recorded or a format of an arithmetic equation which may calculate internal parameter values may be employed. Specifically, any internal parameter map may be employed as long as the internal parameters are uniquely obtained in accordance with the zoom values and the focus values.

The parameter values obtained by the internal parameter map are used as initial values of the internal parameters. The internal parameters obtained as results of the camera parameter estimation process are values corrected in the camera parameter estimation process using images captured for calibration after the cameras 112 are installed in the stadium.

Furthermore, in this embodiment, the same type of cameras 112 and the same type of lenses are installed, and the same internal parameters may be used as long as the zoom values are the same and the focus values are the same.

Note that the present invention is not limited to this, and in a case where the internal parameters have individual differences even though the zoom values are the same and the focus values are the same, such as a case where a plurality of types of cameras 112 and a plurality of types of lenses are used, different internal parameter maps may be included in the different types and the different cameras 112.

Next, the imaging by the camera 112, the sound collection by the microphone 111, and a process of accumulating data obtained by the imaging or the sound correction in the database 250 through the camera adapter 120 and the front-end server 230 will be described.

Figure 22A:
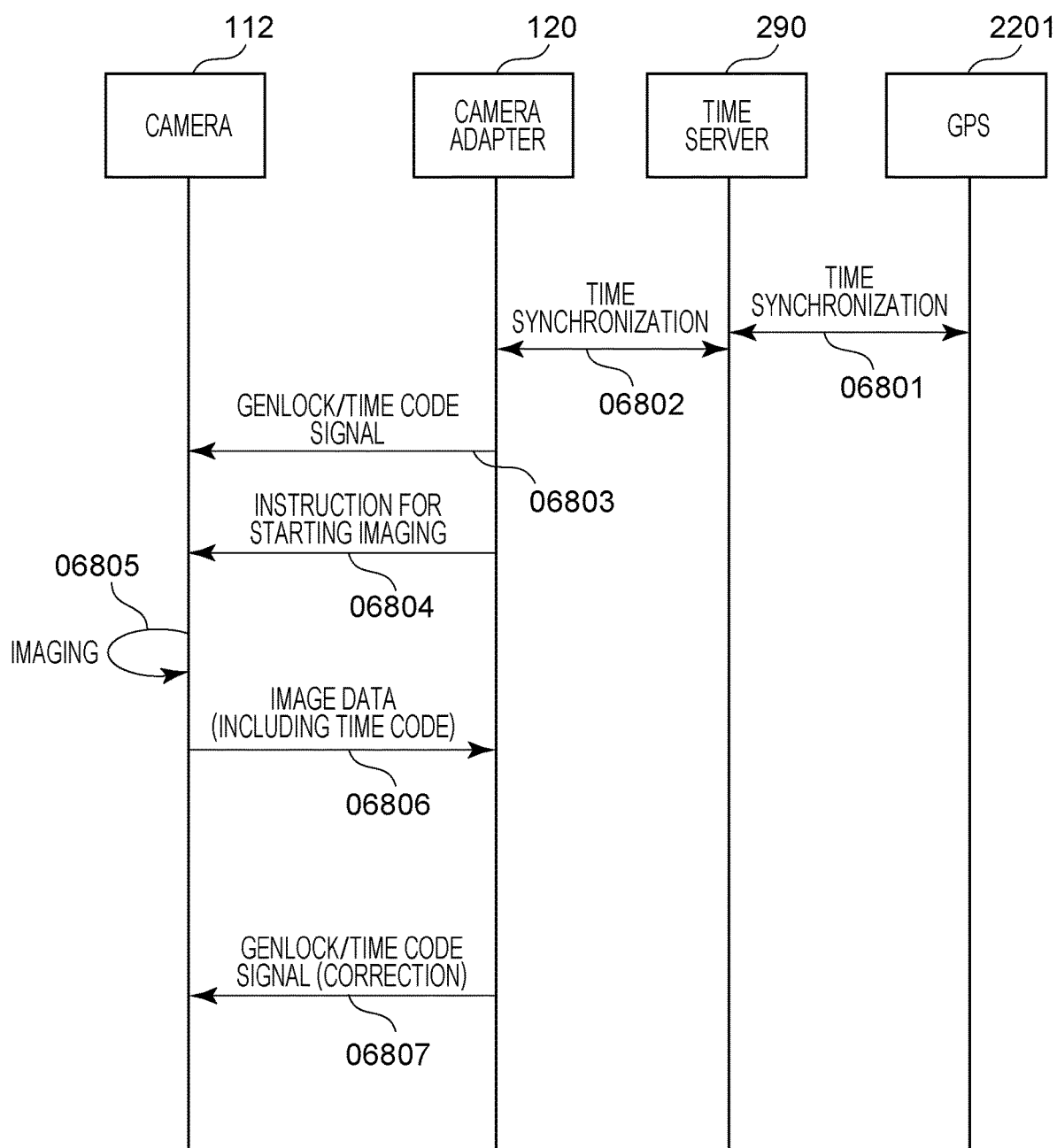
FIG. 22A is a sequence diagram illustrating an imaging start process.
Figure 22B:
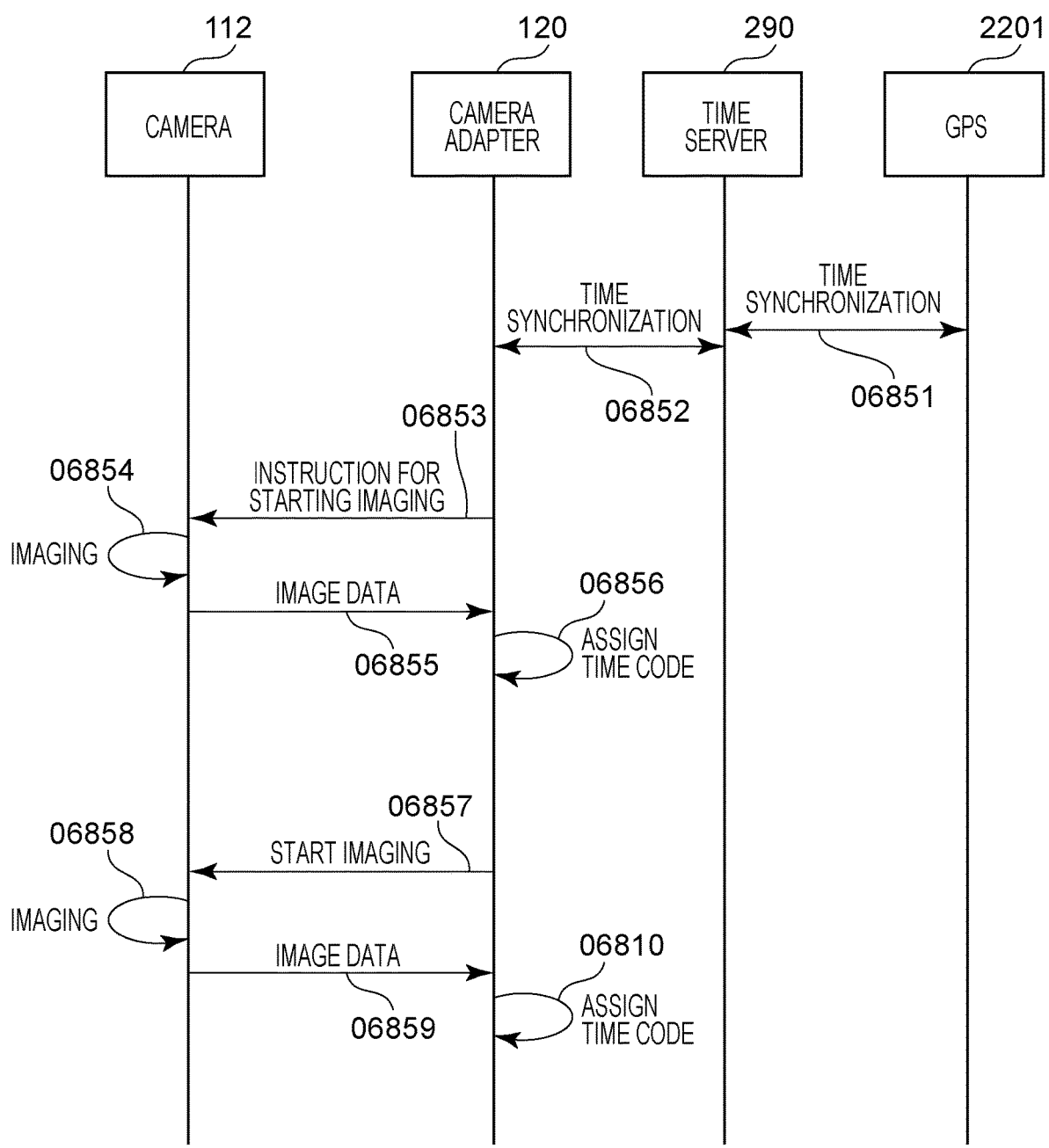
FIG. 22B is a sequence diagram illustrating an imaging start process.

Sequences of an imaging start process of the cameras 112 will be described with reference to FIGS. 22A and 22B. Although different processing sequences are illustrated in FIGS. 22A and 22B, the same result may be obtained in both of the sequences. The camera adapter 120 determines whether a process illustrated in FIG. 22A or a process illustrated in FIG. 22B is to be performed in accordance with a specification of the camera 112.

First, the process in FIG. 22A will be described. The time server 290 performs time synchronization with a GPS 2201, for example, and sets a time point managed by the time server 290 (06801). Note that, instead of the method using the GPS 2201, the time point may be set by another method, such as a network time protocol (NTP).

Next, the camera adapter 120 communicates with the time server 290 using a precision time protocol (PTP), corrects a time point managed by the camera adapter 120, and performs time synchronization with the time server 290 (06802).

The camera adapter 120 starts supplying a synchronization imaging signal, such as a Genlock signal, a three-valued synchronization signal, or the like and a time code signal to the camera 112 (06803). Note that the supplied information is not limited to a time code, and other information may be supplied as long as the other information is an identifier for identifying an imaging frame.

Next, the camera adapter 120 issues an instruction for starting imaging to the camera 112 (06804). When receiving the instruction for starting imaging, the camera 112 performs imaging in synchronization with the Genlock signal (06805).

Next, the camera 112 transmits the captured image including the time code signal to the camera adapter 120 (06806). Imaging is performed in synchronization with the Genlock signal until the camera 112 stops the imaging.

The camera adapter 120 performs a PTP time point correction process with the time server 290 during the imaging so as to correct a timing when the Genlock signal is generated (06807). When an amount of required correction is large, correction in accordance with a preset change amount may be performed.

By this, the plurality of cameras 112 connected to the plurality of camera adapters 120 in the system may be realized.

Next, the process in FIG. 22B will be described. As with the case of FIG. 22A, the time synchronization process is performed between the time server 290 and the GPS 2201 and between the camera adapter 120 and the time server 290 (06851 and 06852). Subsequently, the camera adapter 120 issues an instruction for starting imaging (06853). The instruction for starting imaging includes information indicating a period of time in which the imaging is performed and information for specifying the number of frames. The camera 112 performs imaging in accordance with the instruction for starting imaging (06854).

Next, the camera 112 transmits data on a captured image to the camera adapter 120 (06855). The camera adapter 120 which has received the image data assigns a time code to metadata of the image data (06856).

The camera adapter 120 performs a PTP time point correction process with the time server 290 during the imaging so as to correct a timing of the imaging of the camera 112. When an amount of required correction is large, correction in accordance with a preset change amount may be performed. For example, the instruction for starting imaging is repeatedly issued at a short timing, such as every one frame.

Note that although the sequence of the imaging start process is described with reference to FIGS. 22A and 22B, the microphone 111 also performs a process similar to the synchronization imaging performed by the camera 112 so as to perform synchronization sound collection. Meanwhile, as resolution of a camera image is improved, it is possible that a data transmission amount exceeds a limit of the network transmission band when the cameras 112 transmit image frames. A method for reducing the possibility will be described in an embodiment below.

Figure 23:
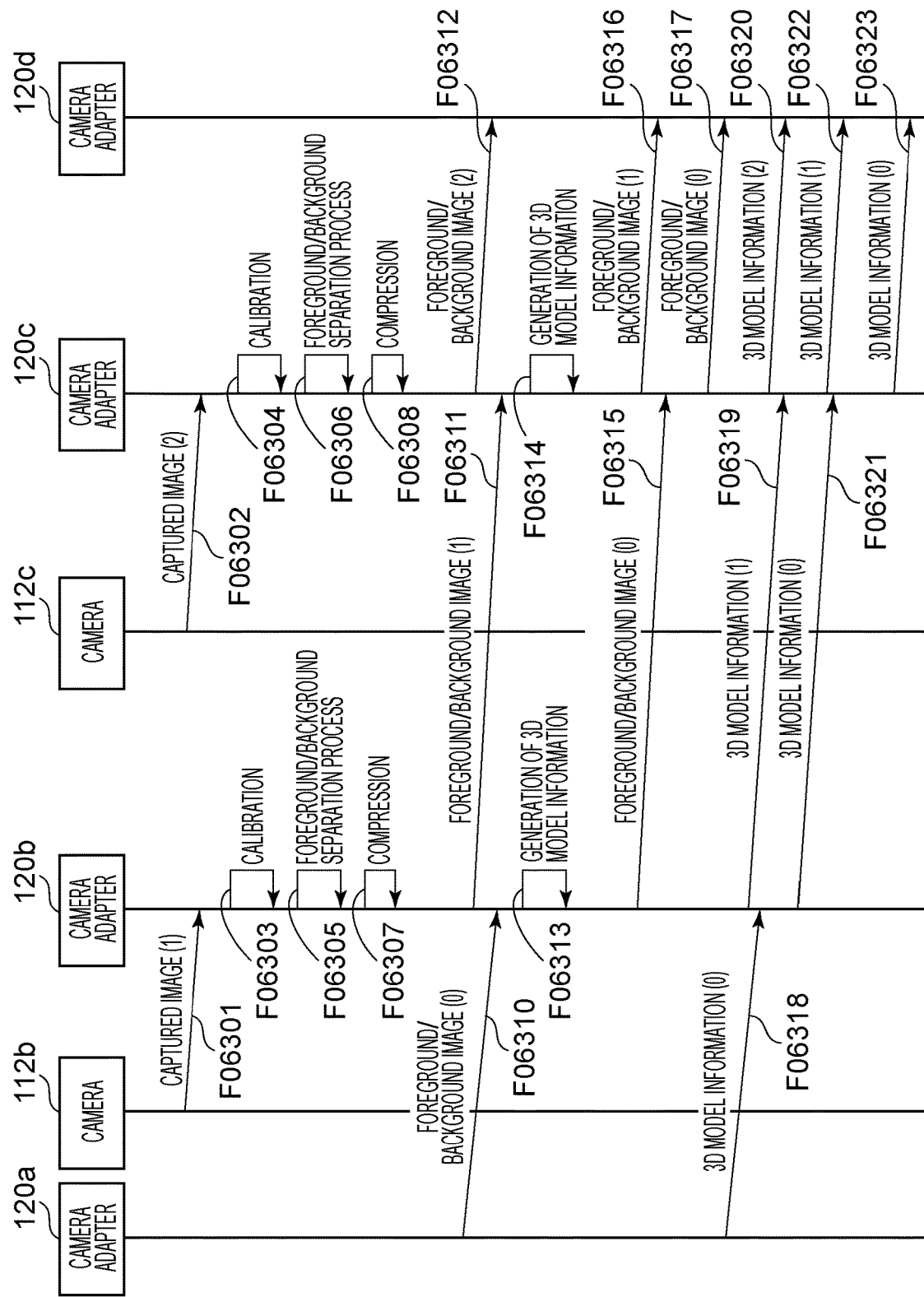
FIG. 23 is a sequence diagram illustrating a process of generating 3D model information.

First, a sequence of a process of generating 3D model information by coordinating the plurality of camera adapters 120 (120a, 120b, 120c, and 120d) with one another will be described with reference to FIG. 23. Note that processing order is not limited to that illustrated in FIG. 23.

The image processing system 100 of this embodiment includes 26 cameras 112 and 26 camera adapters 120. However, only the two cameras 112b and 112c and the four camera adapters 120a to 120d are focused on in this embodiment. The camera 112b is connected to the camera adapter 120b, and the camera 112c is connected to the camera adapter 120c. Note that the camera 112 connected to the camera adapter 120a, the camera 112 connected to the camera adapter 120d, and the microphones 111, the camera platforms 113, and the external sensors 114 which are connected to the respective camera adapters 120 are omitted. Furthermore, it is assumed that the camera adapters 120a to 120d have completed the time point synchronization with the time server 290 and are in the imaging state. The cameras 112b and 112c transmit captured images (1) and (2) to the camera adapters 120b and 120c, respectively (F06301 and F06302). The camera adapters 120b and 120c cause the respective calibration controllers 06133 to perform the calibration process on the received captured images (1) and (2), respectively (F06303 and F06304). In the calibration process, color correction, blur correction, and the like are performed, for example. Although the calibration process is performed in this embodiment, the calibration process is not necessarily performed.

Next, the foreground/background separation unit 06131 performs the foreground/background separation process on the captured images (1) and (2) which have been subjected to the calibration process (F06305 and F06306).

Subsequently, the data compression/decompression unit 06121 compresses foreground images and background images which are separated from each other (F06307 and F06308). Note that a compression rate may be changed in accordance with importance degrees of the foreground images and the background images which are separated from each other. The compression may not be performed according to circumstances. A certain one of the camera adapters 120 compresses at least a background image between a foreground image and the background image so that a compression rate of the foreground image becomes lower than that of the background image and outputs at least the compressed background image to a next one of the camera adapters 120. In a case where both of the foreground image and the background image are compressed, the foreground image including an important imaging target is subjected to lossless compression and the background image which does not include the imaging target is subjected to compression with loss. Accordingly, a data amount transmitted to the next camera adapter 120c or the next camera adapter 120d may be efficiently reduced. In a case where an image of a field of a stadium where a game of soccer, rugby, baseball, or the like is held is captured, for example, a background image occupies most of the image and a region of a foreground image including players is small. Therefore, an amount of transmission data may be considerably reduced.

Furthermore, the camera adapter 120b or the camera adapter 120c may change a frame rate of an image to be output to the next camera adapter 120c or the next camera adapter 120d in accordance with an importance degree. For example, the foreground image including the important imaging target may be output with a high frame rate so that an output frame rate of the background image is lower than that of the foreground image and the background image which does not include the imaging target may be output with a low frame rate. Accordingly, an amount of data transmitted to the next camera adapter 120c or the next camera adapter 120d may be reduced. For example, a compression rate or a transmission frame rate may be changed for each camera adapter 120 in accordance with an installation place of the camera 112, an imaging place, and/or performance of the camera 112. Furthermore, a 3D structure of seats or the like of the stadium may be checked in advance using drawings, and therefore, the camera adapter 120 may transmit an image obtained by removing a portion of the seats from the background image. By this, at a time of rendering described below, image rendering is performed while players in a game are focused on by using the stadium 3D structure generated in advance so that efficiency that an amount of data to be transmitted and stored in the entire system is reduced may be attained.

Subsequently, the camera adapters 120 transmit the compressed foreground images and the compressed background images to the adjacent camera adapters 120 (F06310, F06311, and F06312). Note that, although the foreground image and the background image are simultaneously transferred in this embodiment, the foreground image and the background image may be individually transferred.

Subsequently, the camera adapter 120b generates 3D model information using the foreground image supplied from the camera adapter 120a and the foreground image separated by the foreground/background separation process F06305 (F06313). Similarly, the camera adapter 120c generates 3D model information (F06314).

Thereafter, the camera adapter 120b transfers the foreground image and the background image supplied from the camera adapter 120a to the camera adapter 120c (F06315). Similarly, the camera adapter 120c also transfers the foreground image and the background image to the camera adapter 120d. Note that, although the foreground image and the background image are simultaneously transferred in this embodiment, the foreground image and the background image may be individually transferred.

Furthermore, the camera adapter 120c transfers the foreground image and the background image generated by the camera adapter 120a and supplied from the camera adapter 120b to the camera adapter 120d (F06317).

Subsequently, the camera adapters 120a to 120c transfer the generated 3D model information to the next camera adapters 120b to 120d, respectively (F06318, F06319, and F06320).

Furthermore, the camera adapters 120b and 120c successively transfer the received 3D model information to the next camera adapters 120c to 120d, respectively (F06321 and F06322).

Furthermore, the camera adapter 120c transfers the 3D model information generated by the camera adapter 120a and supplied from the camera adapter 120b to the camera adapter 120d (F06323).

Finally, the foreground images, the background images and the 3D model information generated by the camera adapters 120a to 120d are successively transferred through the camera adapters 120 connected through the network to the front-end server 230.

Note that the calibration process, the foreground/background separation process, the compression process, and the 3D model information generation process to be performed by the camera adapter 120a and the camera adapter 120d are omitted in this sequence diagram. However, the camera adapters 120a and 120d perform operations the same as those of the camera adapters 120b and 120c in practice so as to generate foreground images, background images, and 3D model information. Furthermore, although the data transfer sequence performed among the four camera adapters 120 is described, the same process is performed even when the number of camera adapters 120 is increased.

As described above, the camera adapters 120 other than the last camera adapter 120 in predetermined order in the plurality of camera adapters 120 extract predetermined regions from images captured by the corresponding cameras 112. Then the camera adapters 120 output image data based on results of the extraction to the next camera adapters 120 in the predetermined order described above. On the other hand, the last camera adapter 120 in the predetermined order outputs the image data based on the results of the extraction to the image computing server 200. Specifically, the plurality of camera adapters 120 are connected to one another by the daisy chain, and the image data based on the results of the extraction of the predetermined regions from the captured images performed by the camera adapters 120 is input to the image computing server 200 by the predetermined camera adapters 120. By employing such a data transmission method, a change of a processing load in the image computing server 200 and a change of a transmission load of the network which occur in a case where the number of sensor systems 110 included in the image processing system 100 is changed may be suppressed. Furthermore, the image data output from the camera adapter 120 may be data generated using the image data based on the extraction result and image data based on the extraction result of the predetermined region performed by the preceding camera adapter 120 in the predetermined order. For example, since image data based on differences between the results of extraction performed by the camera adapters 120 and the results of the extractions performed by the preceding camera adapters 120 is output, an amount of transmission data in the system may be reduced. The last camera adapter 120 in the order described above obtains extraction image data based on the image data of the predetermined regions extracted by the other camera adapters 120 from images captured by the other cameras 112 from the other camera adapters 120. Then the last camera adapter 120 outputs a result of the extraction of the predetermined region extracted by the camera adapter 120 itself with and image data corresponding to the extraction image data obtained from the other camera adapters 120 to the image computing server 200 which generates a virtual viewpoint image.

Furthermore, the camera adapter 120 separates the foreground portion and the background portion in the image captured by the camera 112 from each other and changes compression rates and transmission frame rates in accordance with priority degrees of the foreground portion and the background portion. Accordingly, a transmission amount may be reduced when compared with a case where all the data corresponding to images captured by the cameras 112 is transmitted to the front-end server 230. Furthermore, 3D model information required for 3D model generation is successively generated by the camera adapters 120. Accordingly, a processing load of a server may be reduced when compared with a case where all the data is collected by the front-end server 230 and the process of generating all the 3D model information is performed in the front-end server 230, and accordingly, the 3D model generation may be performed in real time.

Figure 24:
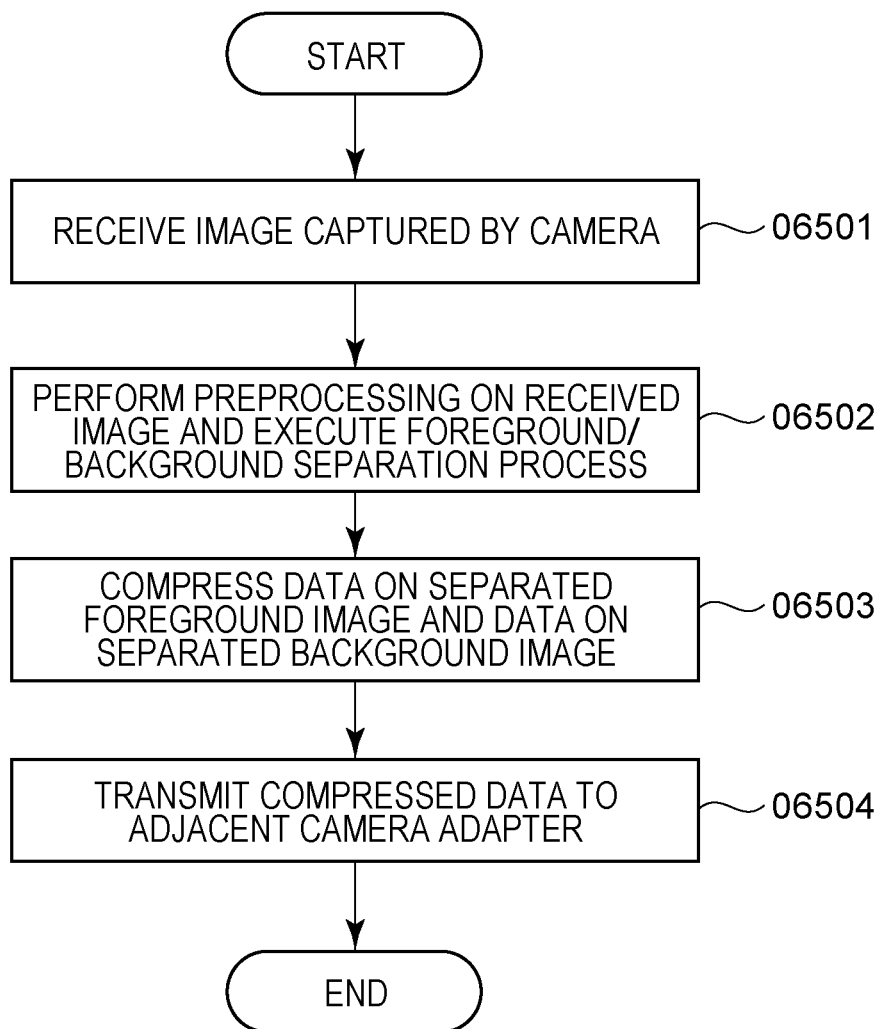
FIG. 24 is a flowchart of the process of generating 3D model information.

Next, a flow of a process of generating a foreground image and a background image and transferring the foreground image and the background image to the next camera adapter 120 in the process of successively generating 3D model information performed by the camera adapters 120 will be described with reference to FIG. 24.

The camera adapter 120 obtains a captured image from the camera 112 connected to the camera adapter 120 (06501). Subsequently, a process of separating a foreground image and a background image in the obtained captured image is performed (06502). Note that the foreground image in this embodiment is determined based on a result of detection of a predetermined object included in an image captured by the camera 112. The predetermined object corresponds to a person, for example. The object may be a specific person (a player, a coach, and/or a referee) or may be a ball or a goal which has a predetermined image pattern. Alternatively, a moving object may be detected as the object.

Thereafter, the compression process is performed on the foreground image and the background image which are separated. The foreground image is subjected to the loss less compression, and the foreground image maintains high image quality. The background image is subjected to compression with loss, and a data transmission amount is deleted (06503).

Subsequently, the camera adapter 120 transfers the compressed foreground image and the compressed background image to the next camera adapter 120 (06504). The background image may be transferred while a transfer frame is extracted instead of transfer performed every frame. In a case where a frame rate of a captured image is 60 fps, for example, although the foreground image is transferred every frame, only one frame is transmitted among 60 frames of the background image in one second. By this, a unique effect of reduction of a data transmission amount is attained.

Furthermore, the camera adapter 120 may assign metadata before transmitting the foreground image and the background image to the next camera adapter 120. For example, identifiers of the camera adapter 120 and the camera 112, a position (an xy coordinate) of the foreground image in a frame, a data size, a frame number and an imaging time point are assigned as the metadata. Alternatively, information on a gazing point group for identifying a target point and data type information for specifying the foreground image and the background image may be assigned. Note that content of the assigned data is not limited to these, and other data may be assigned.

When the camera adapter 120 transmits data through the daisy chain, only the image captured by the camera 112 having high correspondence with the camera 112 connected to the camera adapter 120 is selectively processed. By this, a load of the transmission process of the camera adapter 120 may be reduced. Furthermore, since the system is configured such that the data transmission among the camera adapters 120 is not stopped even if one of the camera adapters 120 fails in the daisy chain transmission, robustness may be ensured.

Figure 25:
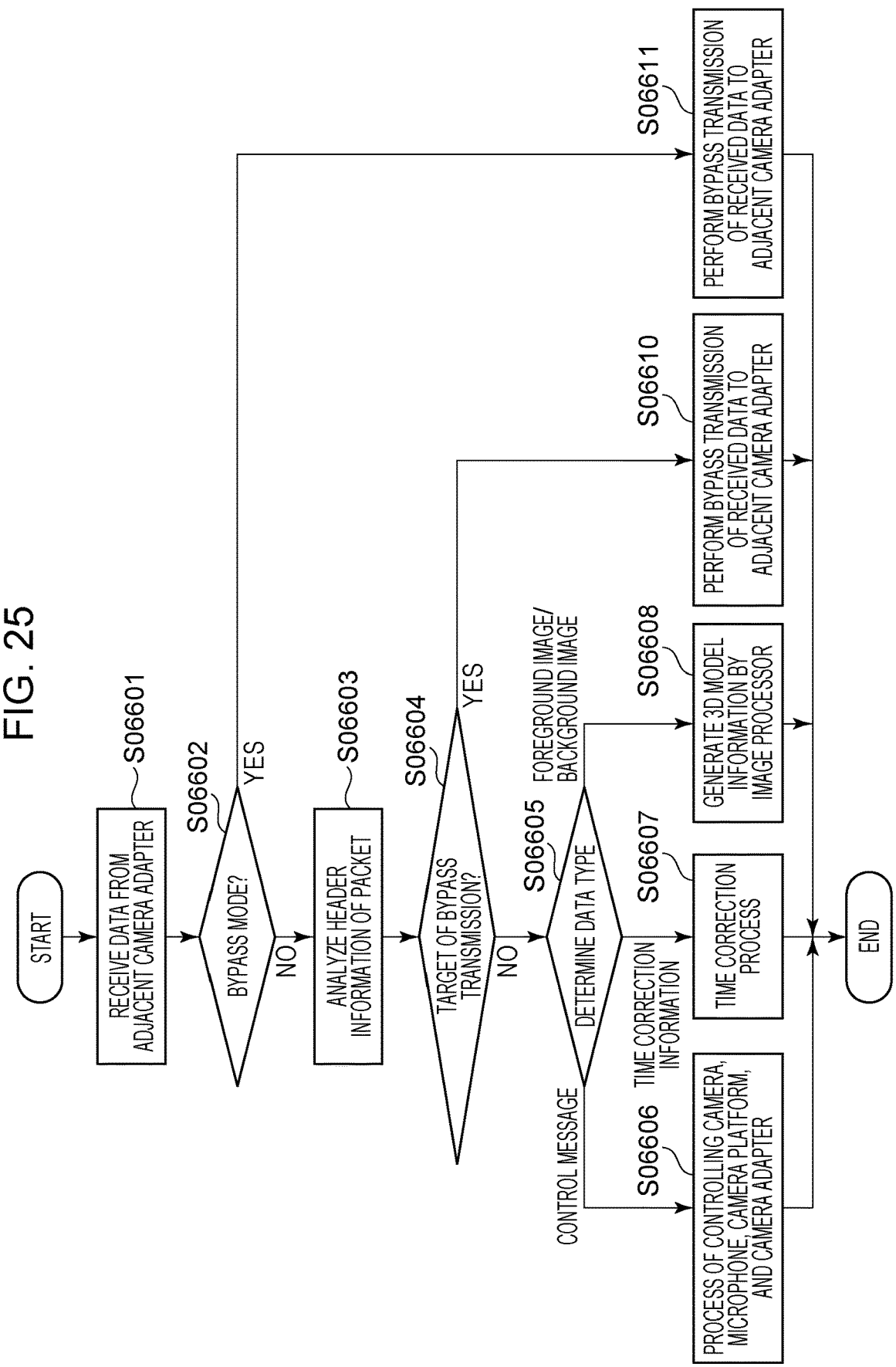
FIG. 25 is a flowchart of the process of generating 3D model information.

Next, a flow of a process performed when data is supplied from an adjacent camera adapter 120 in the flow of the 3D model information generation process performed by a certain camera adapter 120 will be described with reference to FIG. 25.

First, the certain camera adapter 120 receives data from the adjacent camera adapter 120 (S06601). The camera adapter 120 determines whether a transfer mode of itself is a bypass control mode (S06602). The bypass control will be described below with reference to FIG. 28.

When the determination is affirmative, the camera adapter 120 transfers data to the next camera adapter 120 (S06611). On the other hand, when the determination is negative, the camera adapter 120 analyzes a packet of the received data (06603).

When determining that the packet is a target of bypass transmission control as a result of the analysis (Yes in step S06604), the camera adapter 120 transfers the data to the next camera adapter 120 (S06610). The packet of the target of the bypass transmission control is image data which is not used for the generation of 3D model information, a control message described below, or a message associated with time correction, for example. The bypass transmission control will be described below with reference to FIG. 27.

When determining that the packet is not the target of the bypass transmission control, the camera adapter 120 determines a data type (S06605) and performs a process corresponding to the data type.

When the data type is a control message packet to be transmitted to the camera adapter 120 itself from the control station 310, the camera adapter 120 analyzes the control message and performs a process based on a result of the analysis (S06606). The same process is performed even in the case where a transmission source of the control message is not the control station 310 but another node. Furthermore, the same is true of a case where the packet is to be transmitted to not only the camera adapter 120 itself but also a gazing point group including the camera adapter 120. Examples of the process performed by the camera adapter 120 includes control of the microphone 111, the camera 112, and the camera platform 113 connected to the camera adapter 120 and control of the camera adapter 120 itself. The camera adapter 120 returns a result of the control to the transmission source or a designated node in accordance with content of the control message. Furthermore, when the packet is a control message to be transmitted to the group, the control message is transferred to the next camera adapter 120.

Subsequently, the camera adapter 120 performs a time correction process when the data type is associated with the time correction (S06607). For example, the camera adapter 120 performs the time correction of the camera adapter 120 based on the PTP process with the time server 290. Then a word clock supplied to the microphone 111 and the camera 112 is corrected based on the corrected time. If a timing of the word clock is changed at once when a correction amount of the time is large, sound and image quality is affected by the change, and therefore, a process of gradually correcting a time in accordance with a preset change amount may be performed. Furthermore, the camera adapter 120 transfers the generated 3D model information and the foreground image used for the generation of the 3D model information to the next camera adapter 120 so that the generated 3D model information and the foreground image are further transferred to the front-end server 230.

The camera adapter 120 performs the process of generating 3D model information when the data type is a foreground image or a background image (S06608).

Figure 26:
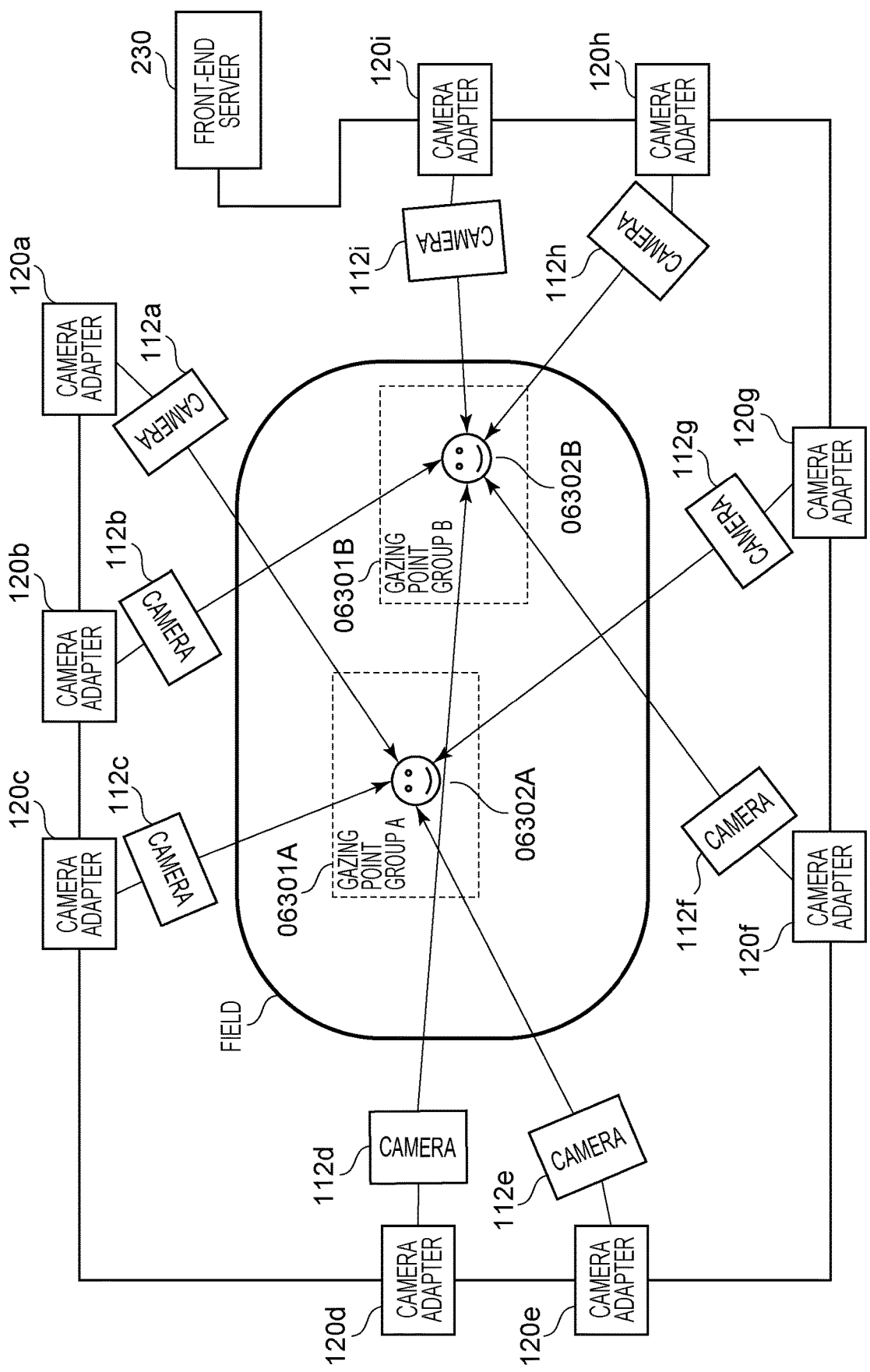
FIG. 26 is a diagram illustrating gazing point groups.

Next, control in accordance with a gazing point group will be described. FIG. 26 is a diagram illustrating a gazing point group. The cameras 112 are installed such that optical axes thereof face one of specific gazing points 06302. The cameras 112 corresponding to the same gazing group 06301 are installed such that the cameras 112 face the same gazing point 06302.

FIG. 26 is a diagram illustrating a case where two gazing points 06302 including a gazing point A (06302A) and a gazing point B (06302B) are set and nine cameras (112a to 112i) are installed. The four cameras (112a, 112c, 112e, and 112g) face the same gazing point A (06302A) and belong to a gazing point group A (06301A). Furthermore, the remaining five cameras (112b, 112d, 112f, 112h, and 112i) face the same gazing point B (06302B) and belong to a gazing point group B (06301B).

Here, a pair of cameras 112 which belong to the same gazing point group 06301 and which are closest to each other (which have the smallest numbers of connection hops) is represented as the cameras 112 which are logically adjacent to each other. For example, the camera 112a and the camera 112b are physically adjacent to each other but the camera 112a and the camera 112b belong to the different gazing point groups 06301, and therefore, the camera 112a and the camera 112b are not logically adjacent to each other. The camera 112c is logically adjacent to the camera 112a. On the other hand, the camera 112h and the camera 112i are not only physically adjacent to each other but also logically adjacent to each other.

The camera adapters 120 perform different processes depending on a result of a determination as to whether a physical-adjacent camera 112 is also a logical-adjacent camera 112. A concrete process will be described hereinafter.

Figure 27:
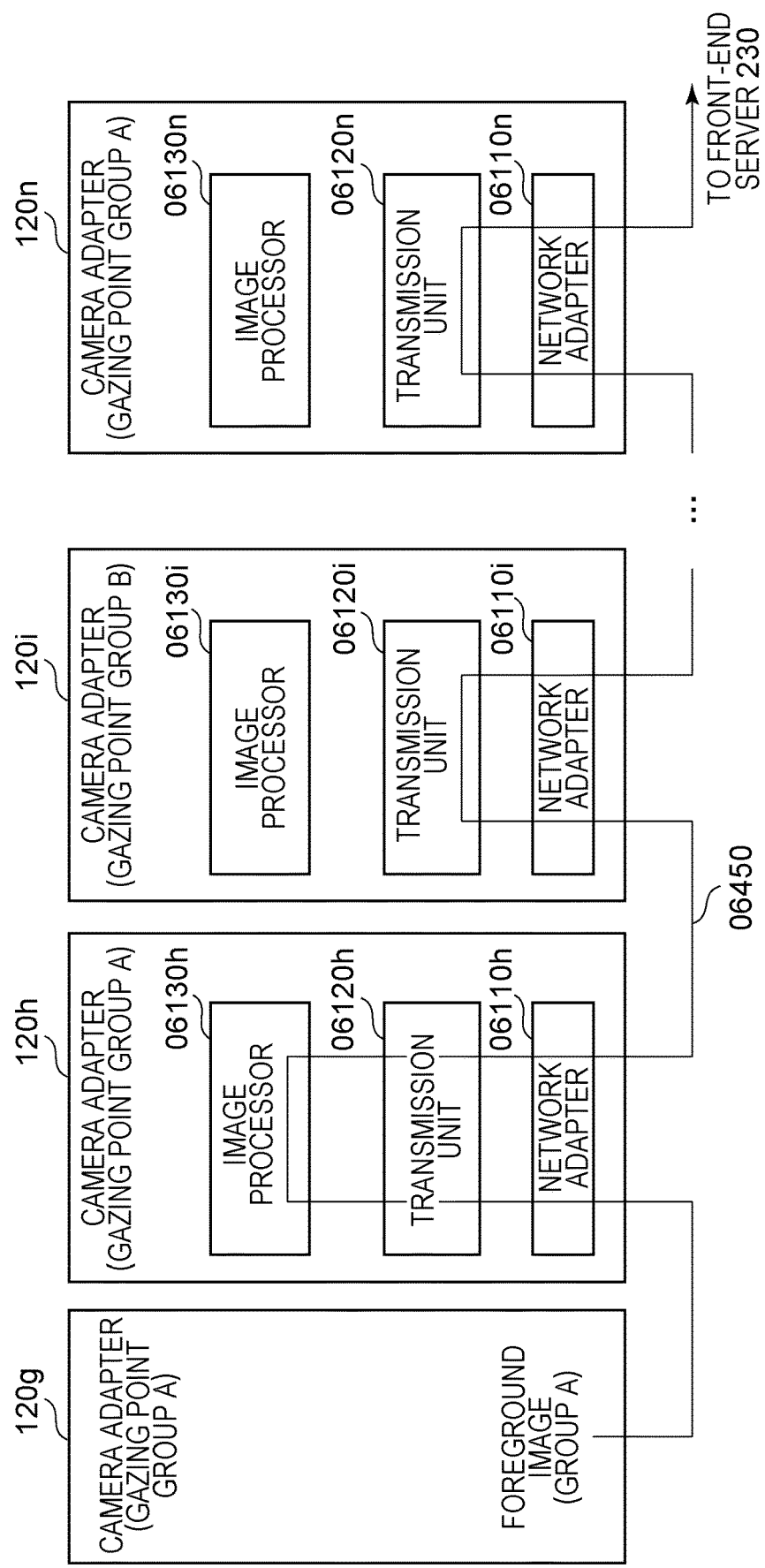
FIG. 27 is a diagram illustrating bypass transmission control.

The bypass transmission control will be described with reference to FIG. 27. The bypass transmission control is a function of bypassing transmission data depending on a gazing point group including each of the camera adapters 120. Descriptions of functional units which constitute the external device controller 06140, the image processor 06130, the transmission unit 06120, and the network adapter 06110 are omitted.

In the image processing system 100, a setting of the number of camera adapters 120 and a setting of correspondences between the gazing point groups and the camera adapters 120 may be changed. It is assumed that, in FIG. 27, the camera adapters 120g, 120h, and 120n belong to the gazing point group A, and the camera adapter 120i belongs to the gazing point group B.

A route 06450 indicates a transmission route of a foreground image generated by the camera adapter 120g, and the foreground image is finally transmitted to the front-end server 230. In FIG. 27, the background image, the 3D model information, the control message, and the foreground images generated by the camera adapters 120h, 120i, and 120n are omitted.

The camera adapter 120h receives the foreground image generated by the camera adapter 120g through a network adapter 06110h, and a transmission unit 06120h determines a routing destination. When determining that the camera adapter 120g which has generated the received foreground image belongs to the same gazing point group (the group A in this embodiment), the transmission unit 06120h transfers the received foreground image to the image processor 06130h. When the image processor 06130h generates 3D model information based on the foreground image generated and transmitted by the camera adapter 120g, the foreground image of the camera adapter 120g is transferred to the next camera adapter 120i.

Subsequently, the camera adapter 120i receives the foreground image generated by the camera adapter 120g from the camera adapter 120h. When determining that the gazing point group to which the camera adapter 120g belongs is different from a gazing point group to which the camera adapter 120i belongs, the transmission unit 06120i of the camera adapter 120i does not transfer the foreground image to the image processor 06130i but transfers the foreground image to the next camera adapter 120.

Thereafter, the camera adapter 120n receives the foreground image generated by the camera adapter 120g through a network adapter 06110n and a transmission unit 06120n determines a routing destination. The transmission unit 06120n determines that the camera adapter 120n belongs to the gazing point group to which the camera adapter 120g belongs. However, when the image processor 06130n determines that the foreground image of the camera adapter 120g is not required for generation of 3D model information, the foreground image is transferred to the next camera adapter 120 as it is through the network of the daisy chain.

In this way, the transmission unit 06120 of the camera adapter 120 determines whether received data is required for generation of 3D model information which is the image processing performed by the image processor 06130. When it is determined that the received data is not required for the image processing, that is, when it is determined that the received data has low correlation with the camera adapter 120 of itself, the data is not transferred to the image processor 06130 but is transferred to the next camera adapter 120. Specifically, in the data transmission through the daisy chain 170, data required for the individual camera adapters 120 is selected and a process of successively generating 3D model information is performed. Accordingly, a processing load and a processing time associated with the data transfer in a period of time from when the data is received by the camera adapter 120 to when the data is transferred may be reduced.

Figure 28:
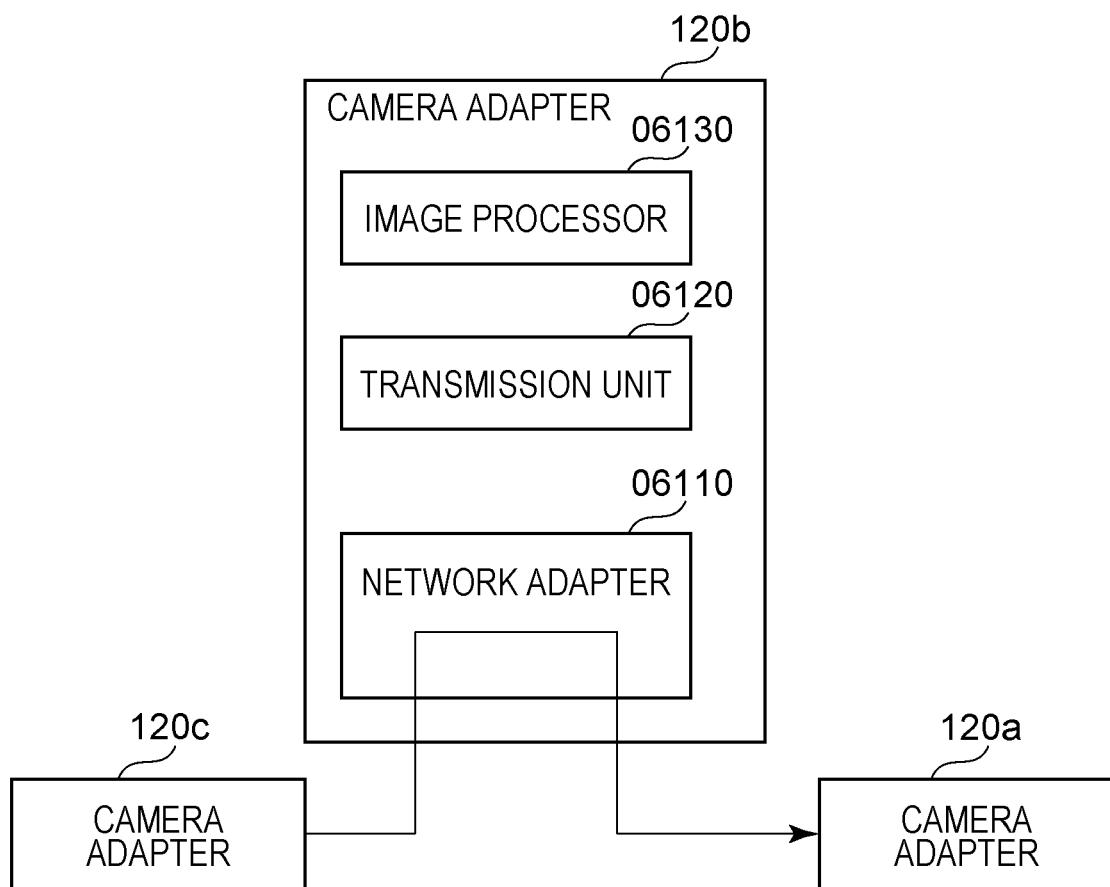
FIG. 28 is a diagram illustrating bypass control.

Next, the bypass control performed by the camera adapter 120b will be described in detail with reference to FIG. 28. Descriptions of functional units which constitute the external device controller 06140, the image processor 06130, the transmission unit 06120, and the network adapter 06110 are omitted.

The bypass control is a function in which the camera adapter 120b transfers data supplied from the camera adapter 120c to the next camera adapter 120a without the routing control to be performed by the data routing processor 06122 of the transmission unit 06120.

For example, the camera adapter 120b activates the bypass control for the network adapter 06110 when the camera 112b is in an imaging stop state, a calibration state, or an error processing state. The bypass control is activated also when the transmission unit 06120 or the image processor 06130 fails. Furthermore, the network adapter 06110 may detect a state of the transmission unit 06120 and may be actively shifted to a bypass control mode. Note that a sub CPU which detects the error state or the stop state of the transmission unit 06120 or the image processor 06130 may be included in the camera adapter 120b, and a process of causing the network adapter 06110 to enter the bypass control mode when the sub CPU performs the error detection may be added. By this, fault states of the functional blocks and the bypass control may be independently controlled.

Furthermore, the camera adapter 120 may be shifted from the bypass control mode to a normal communication state when the camera 112 is shifted from the calibration state to the imaging state or when the transmission unit 06120 or the like restores from the operation failure.

With this bypass control function, the camera adapter 120 may perform the data transfer at high speed and may transfer data to the next camera adapter 120a even when a determination associated with the data routing may not be made due to occurrence of unexpected failure.

In this system, the foreground image, the background image, and the 3D model information are transmitted through the plurality of camera adapters 120 connected by the daisy chain and supplied to the front-end server 230. Here, when an event in which the number of foreground regions in a captured image considerably increases, such as an opening ceremony in which all players are all together, is imaged, an amount of data of the foreground images to be transmitted increases when compared with a case where a normal game is imaged. Therefore, a method for controlling an amount of data to be transmitted by the daisy chain so that a transmission band is not exceeded will be described below.

Figure 29:
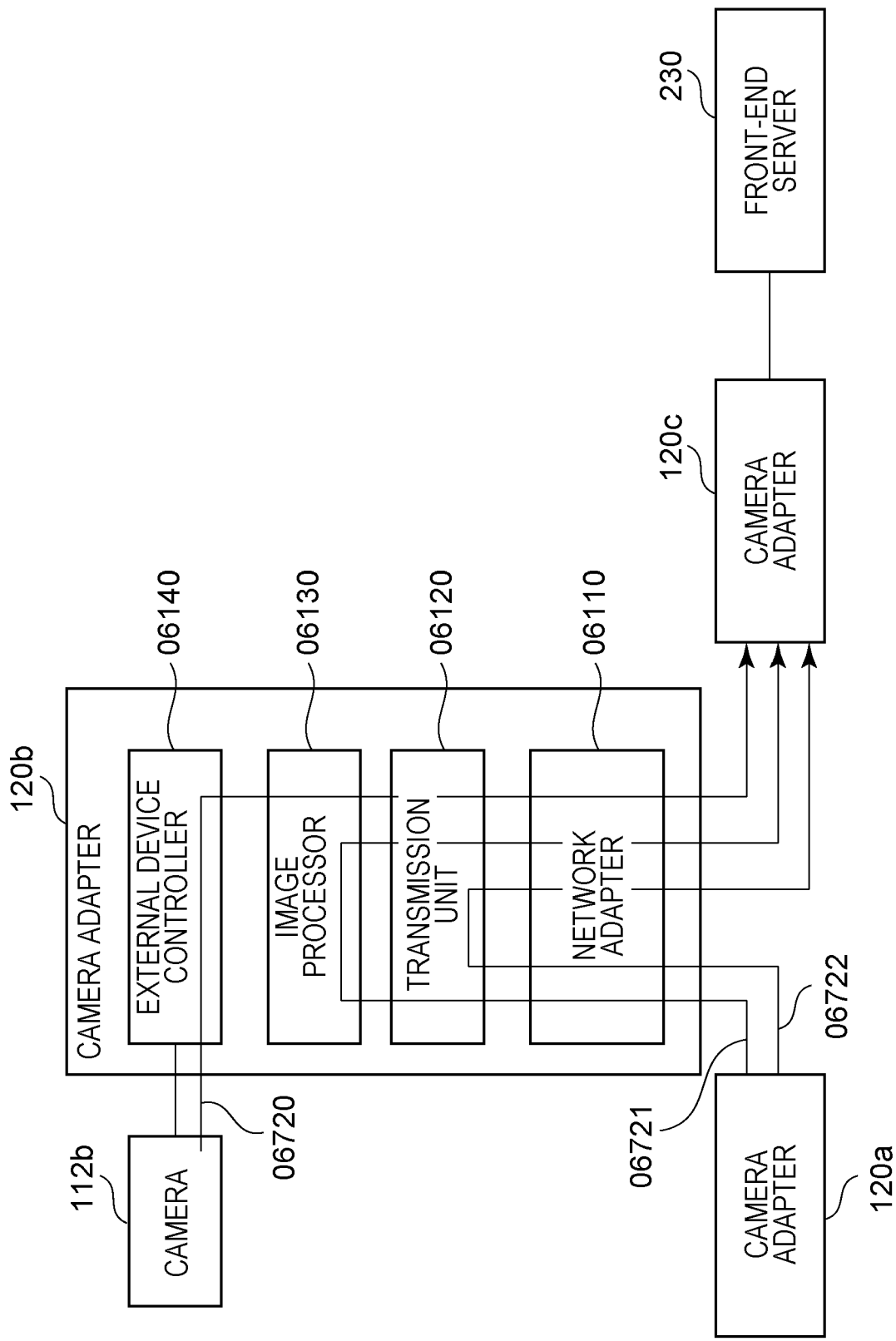
FIG. 29 is a diagram illustrating a data transmission flow.
Figure 30:
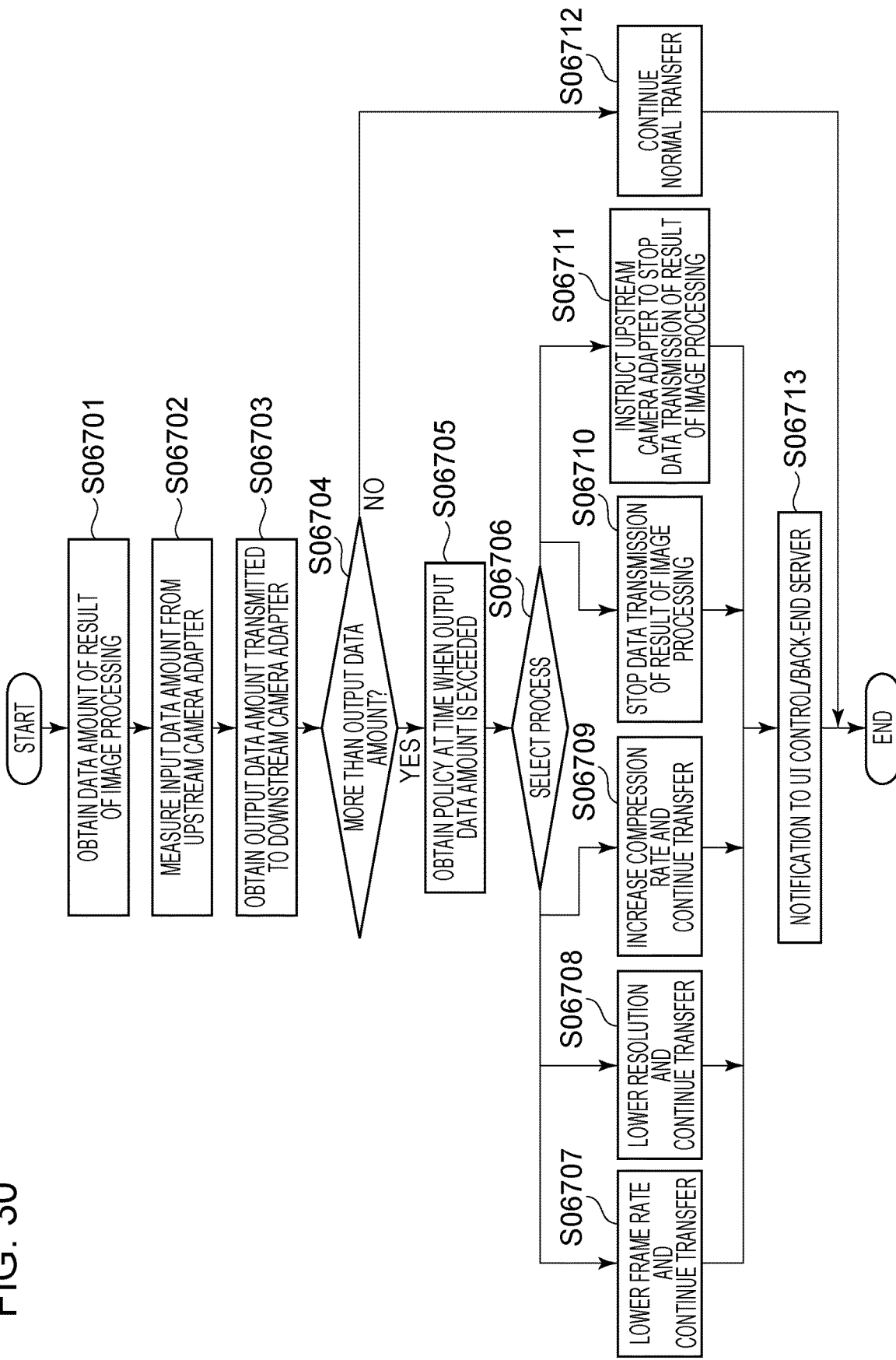
FIG. 30 is a flowchart of a transmission data reduction process.

A flow of a process of outputting data from the transmission unit 06120 in the camera adapter 120 will be described with reference to FIGS. 29 and 30. FIG. 29 is a diagram illustrating a flow of data among the camera adapters 120a to 120c. The camera adapter 120a is connected to the camera adapter 120b, and the camera adapter 120b is connected to the camera adapter 120c. Furthermore, the camera 112b is connected to the camera adapter 120b, and the camera adapter 120c is connected to the front-end server 230. A flow of data output processing performed by the transmission unit 06120 of the camera adapter 120b will now be described.

Imaging data 06720 is supplied from the camera 112b to the transmission unit 06120 of the camera adapter 120b, and input data 06721 and input data 06722 which have been subjected to image processing are supplied from the camera adapter 120a to the transmission unit 06120 of the camera adapter 120b. Furthermore, the transmission unit 06120 performs various processes, such as output to the image processor 06130, compression, a setting of a frame rate, and packetizing, on the input data, and outputs the data to the network adapter 06110.

Next, a flow of the output process performed by the transmission unit 06120 will be described with reference to FIG. 30. The transmission unit 06120 executes a step of obtaining an amount of data which is a result of the image processing on the input data 06721 and the imaging data 06720 supplied from the image processor 06130 (06701).

Subsequently, the transmission unit 06120 executes a step of obtaining an amount of the input data 06722 supplied from the camera adapter 120a (06702). Thereafter, the transmission unit 06120 executes a step of obtaining an amount of data to be output to the camera adapter 120c in accordance with a type of input data (S06703).

Thereafter, the transmission unit 06120 compares the output data amount and a predetermined transmission band restriction amount so as to determine whether transmission may be performed. Specifically, the transmission unit 06120 determines whether the amount of data to be output to the network adapter 06110 exceeds a threshold value of an output data amount specified in advance (506704). Note that the threshold value may be provided for each data type (such as a foreground image, a background image, full-view frame data, and 3D model information). Furthermore, the amount of data to be output is obtained based on a result of compression of data performed by the transmission unit 06120 when the data is compressed by the transmission unit 06120. Note that the threshold value of the output data amount is preferably set taking overheads of header information used for packetizing and an error correction information into consideration.

When determining that the output data amount does not exceed the threshold value, the transmission unit 06120 performs normal transfer to output the input data to the network adapter 06110 (S06712). On the other hand, when determining that the output data amount exceeds the threshold value (Yes in step S6704), the transmission unit 06120 obtains a policy for excess of an output data amount when the data input to the transmission unit 06120 is image data (S06705). Then the transmission unit 06120 selects at least one of a plurality of processes (S06707 to S06711) described below in accordance with the obtained policy (S06706) and executes the selected process. Note that the transmission unit 06120 may perform normal transfer on data associated with the time correction and data associated with the control message which are other than the image data. Furthermore, a message may be dropped in accordance with a type or a priority degree of the message. Overflow of the data transfer may be suppressed by reducing an amount of output data.

As a process executed by the transmission unit 06120, the transmission unit 06120 lowers a frame rate of image data before outputting the image data to the network adapter 06110 (S06707). The transmission is performed while some frames are omitted so that the data amount is reduced. However, when an object moving fast is followed, image quality may be deteriorated when compared with output at high frame rate, and therefore, a determination as to whether this method is to be employed is made depending on a target imaging scene.

As another process, the transmission unit 06120 outputs image data to the network adapter 06110 after lowing resolution of the image data (S06708). This process affects image quality of an output image, and therefore, a policy is set depending on a type of an end-user terminal. For example, a policy associated with appropriate resolution conversion is set such that, when the image data is to be output to a smartphone, the resolution is considerably lowered so that a data amount is reduced whereas when the image data is to be output to a high-resolution display or the like, the resolution is slightly lowered.

As another process, the transmission unit 06120 outputs image data to the network adapter 06110 after increasing a compression rate of the image data (S06709). Here, an amount of input image data is reduced in accordance with a restoration performance request, such as loss-less compression, lossy compression, or the like, that is, an image quality request.

As still another process, the transmission unit 06120 stops output of the imaging data 06720 from the image processor 06130 (S06710). Here, output of image data subjected to the image processing is stopped so that a data amount is reduced. When a sufficient number of cameras 112 are provided, it is necessarily the case that all the cameras 112 included in the same gazing point group are required for generation of a virtual viewpoint image. For example, this control is employed in a case where it may be determined in advance that a blind angle does not occur even if the number of cameras 112 is reduced when the entire field of the stadium is captured, for example. Specifically, the transmission band may be ensured by selecting cameras which do not perform transmission of image data provided that failure of an image does not occur in later steps.

As a further process, the transmission unit 06120 stops output of the input data 06721 from the image processor 06130 or stops only output of images from some of the camera adapters 120 (S06711). In addition, if 3D model information may be generated using an image supplied from the other camera adapter 120, output of a foreground image or a background image from the other camera adapter 120 may be stopped and only the 3D model information is subjected to output control so that a data amount is reduced.

Information on a method used to reduce an amount of output data is transmitted to the back-end server 270, the virtual camera operation UI 330, and the control station 310 through the front-end server 230 (S06713). In this embodiment, the flow is branched so that a process of controlling a frame rate, the process of controlling resolution, the process of controlling a compression rate, or the process of controlling data stop is performed. However, the present invention is not limited to this. By combining a plurality of the control operations, the reduction of a data amount is more effectively performed. Furthermore, a notification of this control process is performed in step S06713. By this notification, if sufficient resolution is not obtained in terms of image quality as a result of increase of the compression rate, for example, in the virtual camera operation UI 330, a zoom operation may be restricted. Furthermore, also after the transmission band restriction amount excess process, excess of an amount of output data is checked where appropriate, and if a data amount becomes stable, a policy of a transmission process may be returned to an original setting value.

In this way, by performing the transmission control process corresponding to the state so as to address excess of the transmission band of the daisy chain, transmission which satisfies the transmission band restriction may be effectively realized.

Figure 31:
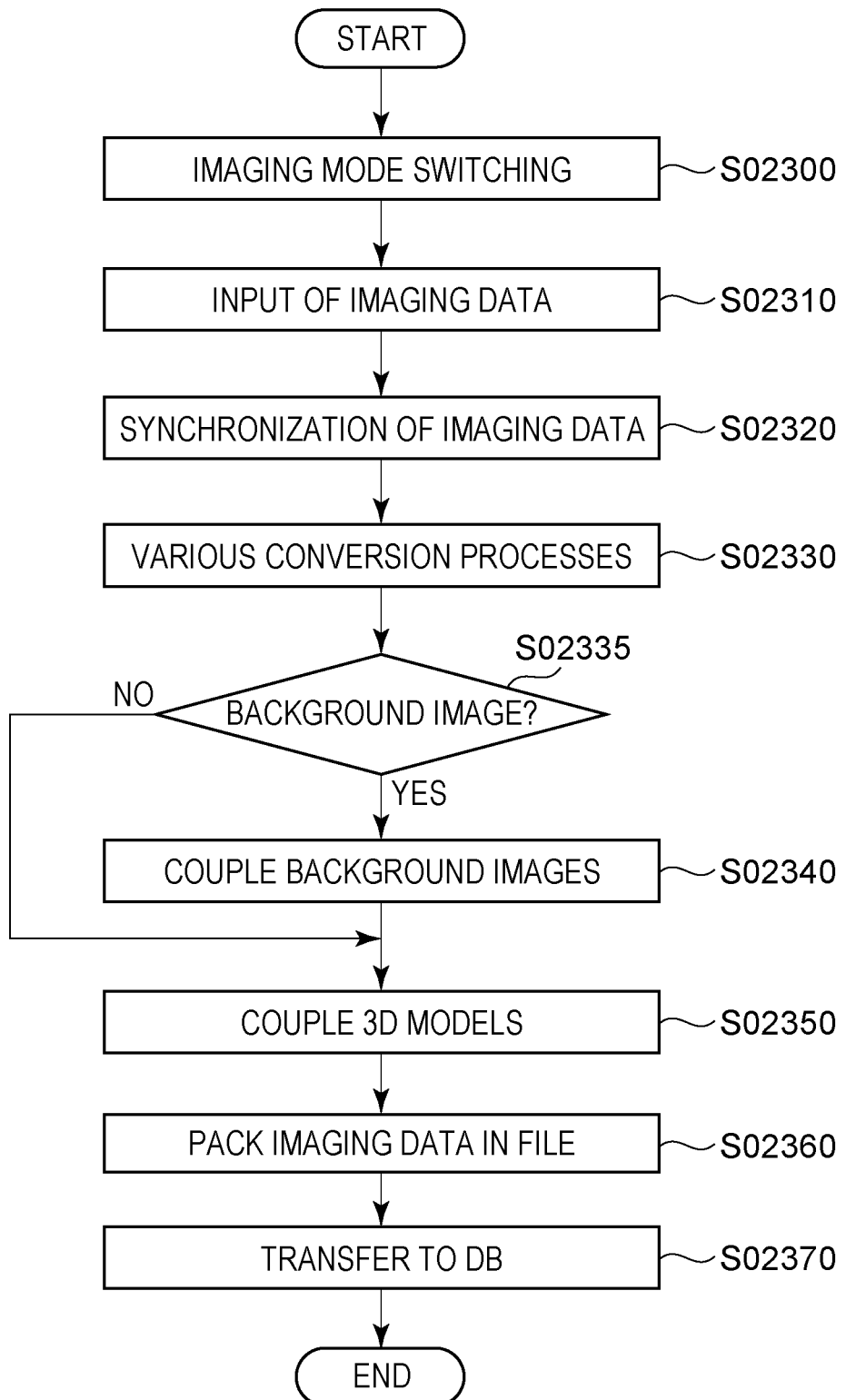
FIG. 31 is a flowchart of a file generation process.

Next, the operation of the front-end server 230 in step S1500 and step S1600 in the imaging-time workflows will be described with reference to a flowchart of FIG. 31.

The controller 02110 receives an instruction for switching to the imaging mode from the control station 310 and performs the switching to the imaging mode (S02300). When the imaging is started, the data input controller 02120 starts reception of imaging data from the camera adapter 120 (S02310).

The imaging data is buffered by the data synchronization unit 02130 until all imaging data required for generation of a file is obtained (S02320). Although not clearly illustrated in the flowchart, a determination as to whether matching of time information assigned to the imaging data is attained and a determination as to whether a predetermined number of cameras have been provided are made in this embodiment. Furthermore, image data may not be transmitted depending on a state of the camera 112, such as a state in which the calibration is being performed or a state in which the error process is being performed. In this case, lack of an image having a predetermined camera number is notified in the transfer to the database 250 (S2370) in a later stage. Here, a method for waiting arrival of image data for a predetermined period of time may be employed for performing the determination as to whether a predetermined number of cameras have been provided. However, in this embodiment, information indicating a result of a determination as to whether image data corresponding to the camera number exists is assigned when the camera adapters 120 transmit data by the daisy chain so as to suppress delay of the series of processes performed by the system. By this, the determination may be immediately made by the controller 02110 of the front-end server 230. Furthermore, an effect in which the period of time in which arrival of captured image is waited is not required may be obtained.

After the data required for the generation of a file is buffered by the data synchronization unit 02130, various conversion processes including a process of developing RAW image data, correction of lens distortion, adjustment of colors and luminance values of images captured by the cameras, such as the foreground image and the background image, are performed (S02330).

If the data buffered by the data synchronization unit 02130 includes background images, a process of coupling the background images (S02340) is performed, and otherwise, the process of coupling 3D models (S02350) is performed (S02335).

In step S02330, the image coupling unit 02170 obtains the background images processed by the image processor 02150. The background images are coupled in accordance with coordinates of the stadium shape data stored in the CAD data storage unit 02135 in step S02230, and the coupled background image is supplied to the imaging data file generation unit 02180 (S02340).

The 3D model coupling unit 02160 which obtains the 3D model from the data synchronization unit 02130 generates a 3D model of the foreground image using the 3D model data and the camera parameters (S02350).

The imaging data file generation unit 02180 which receives the imaging data generated by the process performed until the process in step S02350 converts the imaging data in accordance with a file format and packs the imaging data. Thereafter, the imaging data file generation unit 02180 transmits the generated file to the DB access controller 02190 (S02360). The DB access controller 02190 transmits the imaging data file supplied from the imaging data file generation unit 02180 in step S02360 to the database 250 (S02370).

Figure 32:
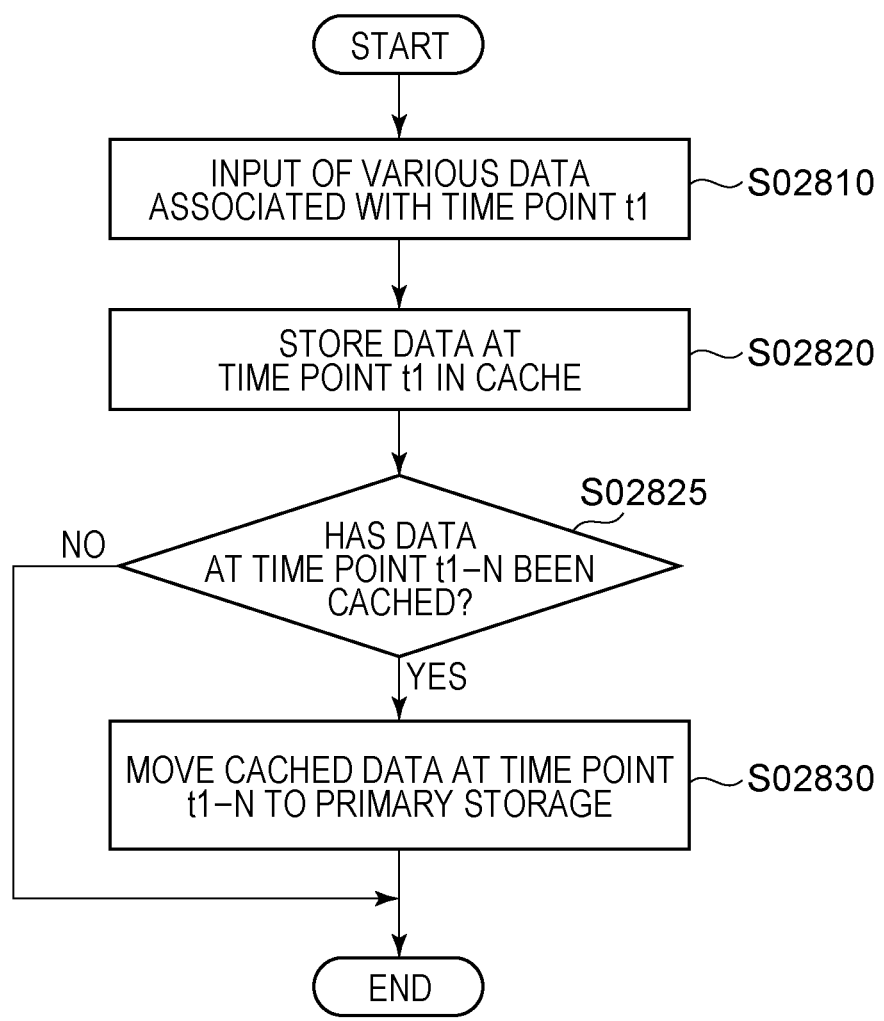
FIG. 32 is a flowchart of a process of writing a file to the database.

Next, a data writing operation included in the operation of the database 250 performed in the generation of a virtual viewpoint image in step S1500 and step S1600 in the imaging-time workflow will be particularly described with reference to a flowchart of FIG. 32.

The front-end server 230 supplies imaging data to the data input unit 02420 of the database 250. The data input unit 02420 extracts time information or time code information associated as metadata with the supplied imaging data and detects that the supplied imaging data was obtained at the time point t1 (S2810).

The data input unit 02420 transmits the supplied imaging data which was obtained at the time point t1 to the cache 02440, and the cache 02440 caches the imaging data obtained at the time point t (S02820).

The data input unit 02420 determines whether imaging data obtained N frames before the time point t1, that is, imaging data at a time point t1-N has been cached (S02825), and when the determination is affirmative, the process proceeds to step S02830, and otherwise, the process is terminated. Note that "N" varies depending on a frame rate. Here, "t1-N" may be a time point before the time point t1 by N-times a frame unit time or may be a time code before the frame of the time point t1 by N frames.

When caching the imaging data obtained at the time point t1, the cache 02440 transfers the imaging data obtained at the time point t1-N which has been cached to the primary storage 02450, and the primary storage 02450 records the imaging data obtained at the time point t1-N transmitted from the cache 02440 (S02830). By this, a frame before a predetermined time point is successively stored in the primary storage 02450 in accordance with restriction of capacity of the cache 02440 which is accessible at high speed. This is realized when the cache 02440 has a ring buffer configuration, for example.

Figure 33:
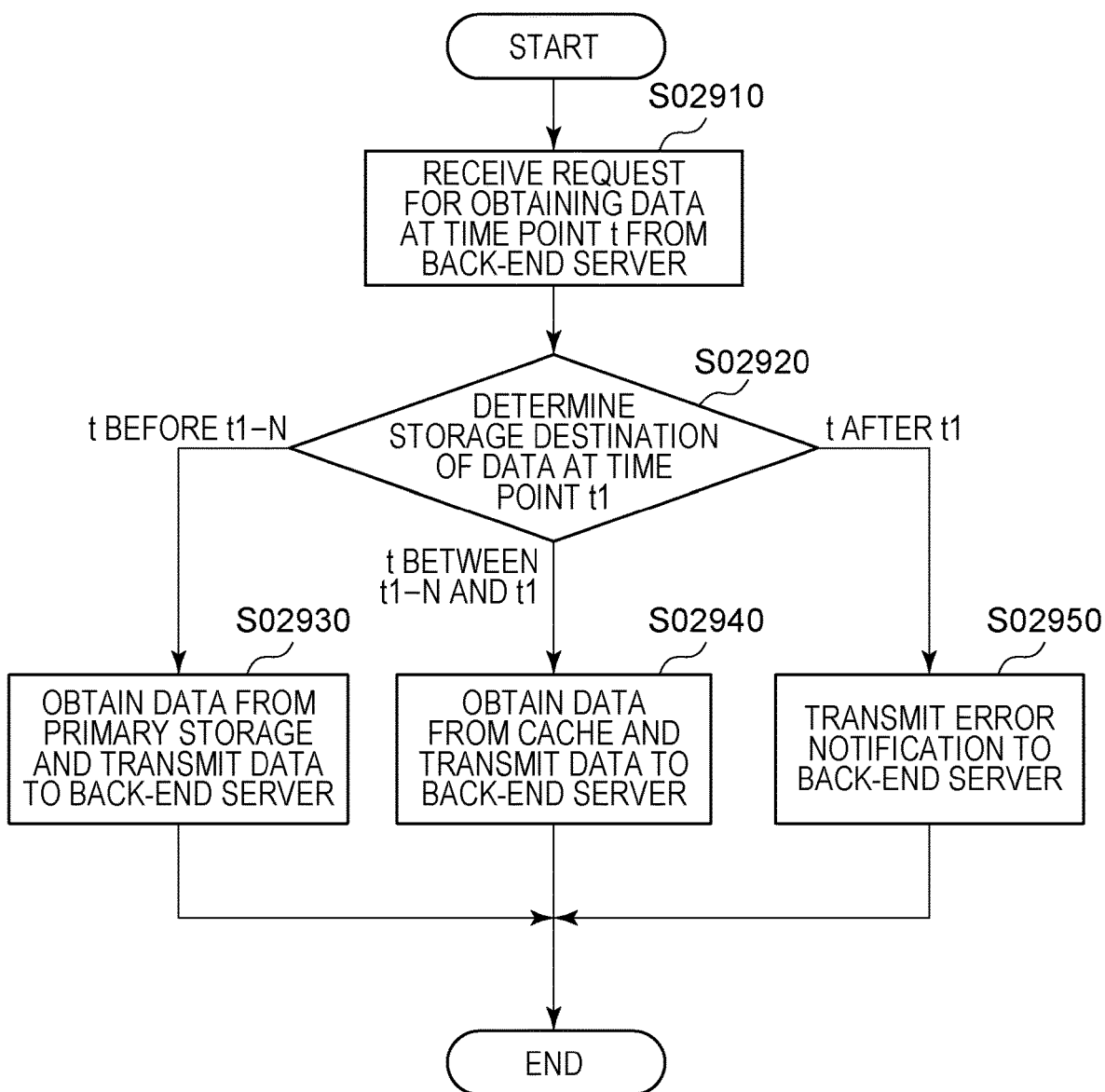
FIG. 33 is a flowchart of a process of reading a file from the database.

Next, a data reading operation included in the operation of the database 250 performed in the generation of a virtual viewpoint image in step S1500 and step S1600 in the imaging-time workflow will be particularly described with reference to a flowchart of FIG. 33.

The back-end server 270 requests the data output unit 02430 to transmit data corresponding to a time code of a time point t (S02910). The data output unit 02430 determines whether the data corresponding to the time point t has been stored in the cache 02440 or the primary storage 02450 so as to determine a source of the data reading (S02920). For example, when the imaging data is supplied to the data input unit 02420 at the time point t1, as with the case of FIG. 32 described above, if the time point t is before the time point t1-N, the data is read from the primary storage 02450 (S02930). If the time point t is between the time point t1-N and the time point t, data is read from the cache 02440 (S02940). When the time point t is later than the time point t1, the data output unit 02430 performs an error notification to the back-end server 270 (S02950).

Next, a processing flow of the image processor 06130 included in the camera adapter 120 will be described with reference to flowcharts of FIGS. 35A to 35E.

Figure 35A:
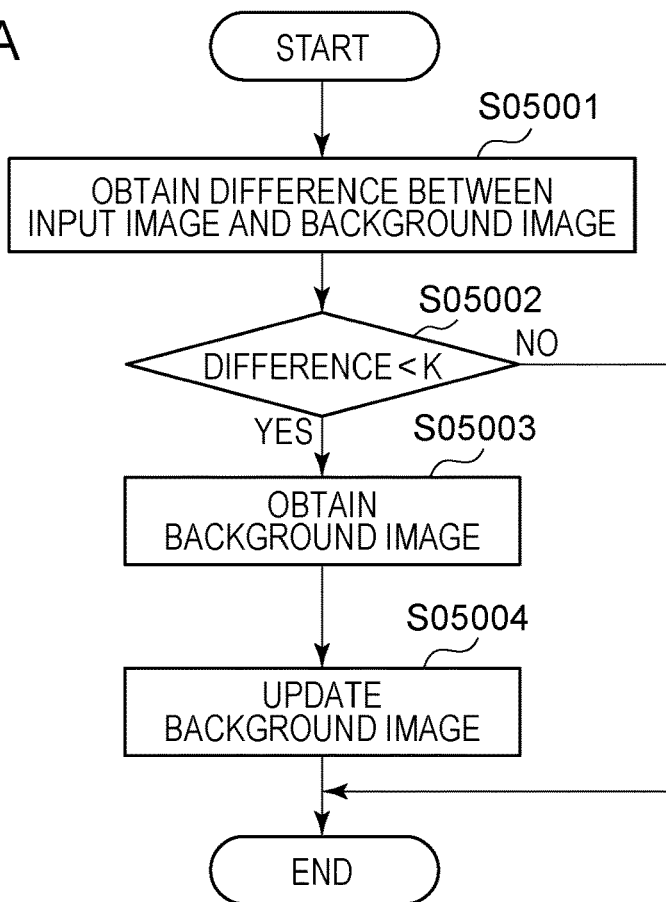
FIG. 35A is a flowchart of separation between a foreground and a background.

Before the process in FIG. 35A, the calibration controller 06133 performs a color correction process on input images for suppressing color variation among the cameras 112 and a blur correction process (an electronic vibration control process) on the input images for stabilizing the images by reducing blurs of the images caused by vibration of the cameras 112. In the color correction process, a process of adding offset values to pixel values of the input images in accordance with parameters supplied from the front-end server 230 or the like is performed. In the blur correction process, blur amounts of the images are estimated based on data output from sensors, such as acceleration sensors or jyro sensors incorporated in the cameras 112. The blue among the frame images may be suppressed by performing a shift of image positions and a process of rotating the images in accordance with the estimated blur amounts. Note that other methods may be used as the blur correction method. For example, a method for performing image processing of estimating and correcting a shift amount of an image by comparing the image with a plurality of frame images which are connected to one another in terms of time or a method which is realized in a camera, such as a lens shift method or a sensor shift method may be employed.

Figure 34A:
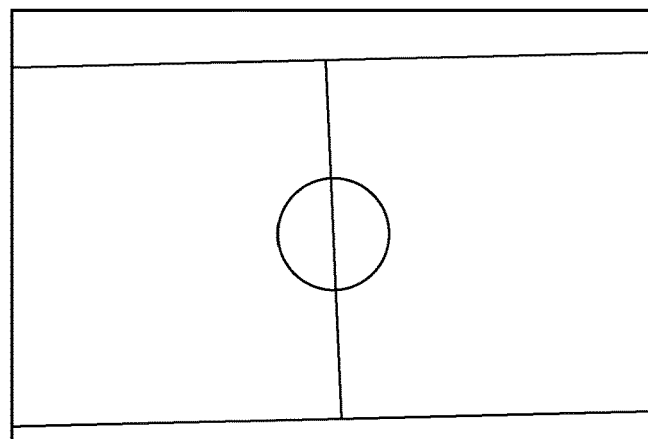
FIG. 34A is a diagram illustrating a captured image.

The background updating unit 05003 performs a process of updating the background image 05002 using the input image and the background image stored in the memory. An example of the background image is illustrated in FIG. 34A. The updating process is performed on individual pixels. The processing flow will be described with reference to FIG. 35A.

First the background updating unit 05003 obtains differences between pixels of the input image and pixels in corresponding positions in the background image in step S05001. In step S05002, it is determined whether the differences are smaller than a threshold value K. It is determined that a pixel correspond to the background image when the difference is smaller than the threshold value K (Yes in step S05002). In step S05003, the background updating unit 05003 calculates values by mixing the pixel values of the input image and the pixels values of the background image in a certain rate. In step S05004, the background updating unit 05003 performs update using a value obtained by extracting a pixel value in the background image.

Figure 34B:
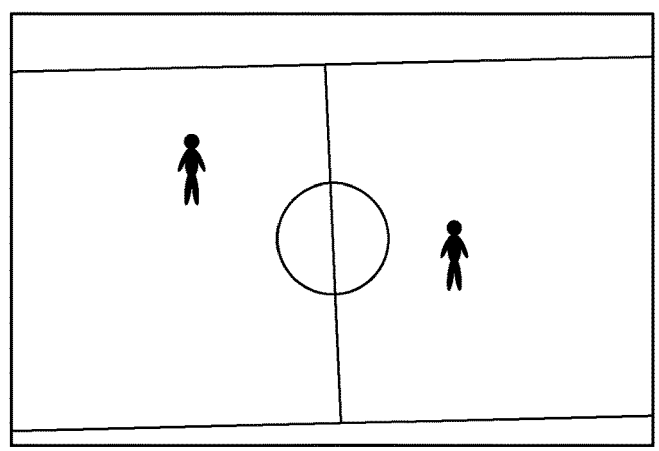
FIG. 34B is a diagram illustrating a captured image.

An example in which persons are included in the diagram illustrated in FIG. 34A which is a background image will be described with reference to FIG. 34B. In this case, when pixels corresponding to the persons are focused, differences between the pixel values relative to the background become large, and the differences become equal to or larger than the threshold value K in step S05002. In this case, since changes of the pixel values are large, it is determined that an object other than the background is included, and the background image 05002 is not updated (No in step S05002). Various other methods may be employed in the background update process.

Figure 34C:
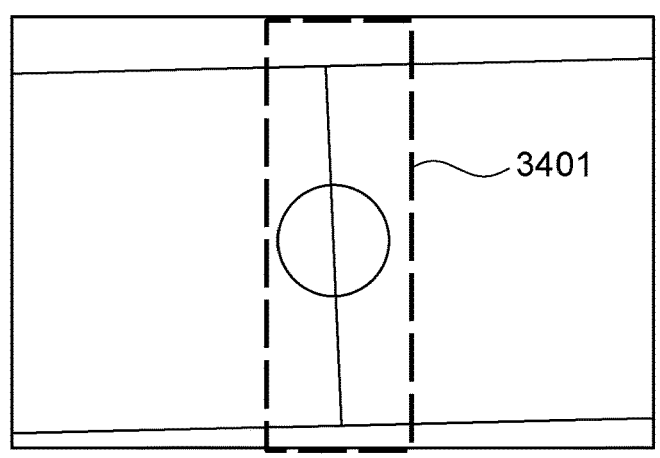
FIG. 34C is a diagram illustrating a captured image.

Next, the background extraction unit 05004 reads a portion of the background image 05002 and transmits the portion of the background image 05002 to the transmission unit 06120. In a case where a plurality of cameras 112 are installed so that the entire field may be subjected to imaging without a blind angle when an image of a game, such as a soccer game, is to be captured in the stadium or the like, large portions of background information of the cameras 112 overlap with one another. Since the background information is large, the images may be transmitted after deleting the overlapping portions in terms of the transmission band restriction so that a transmission amount may be reduced. A flow of this process will be described with reference to FIG. 35D. In step S05010, the background extraction unit 05004 sets a center portion of the background image as denoted by a partial region 3401 surrounded by a dotted line in FIG. 34C, for example. Specifically, the partial region 3401 indicates a background region which is transmitted by the camera 112 itself and other portions in the background region are transmitted by the others of the cameras 112. In step S05011, the background extraction unit 05004 reads the set partial region 3401 in the background image. In step S05012, the background extraction unit 05004 outputs the partial region 3401 to the transmission unit 06120. The output background images are collected in the image computing server 200 and used as texture of a background model. Positions of extraction of the background images 05002 in the camera adapters 120 are set in accordance with predetermined parameter values so that lack of texture information for a background model does not occur. Normally, requisite minimum of the extraction regions is set so that an amount of transmission data is reduced. Accordingly, a large transmission amount of background information may be efficiently reduced and the system may cope with high resolution.

Next, the foreground separation unit 05001 performs a process of detecting a foreground region (a region including an object, such as a person). A flow of the foreground region detection process executed for each pixel will be described with reference to FIG. 35B. A method using background difference information is used for the detection of a foreground. In step S05005, the foreground separation unit 05001 obtains differences between pixels of an image newly input and pixels in corresponding positions in the background image 05002. Then, it is determined whether the differences are larger than a threshold value L in step S05006. Assuming here that the newly-input image is illustrated in FIG. 34B, for example, on the background image 05002 in FIG. 34A, pixels in a region including persons have large differences. When the differences are larger than a threshold value L, the pixels are set as a foreground in step S05007. A method for detecting a foreground using background difference information has ingenious operations so that the foreground is detected with higher accuracy. Furthermore, various methods including a method using a feature value or a method using machine learning may be employed in the foreground detection.

Figure 35B:
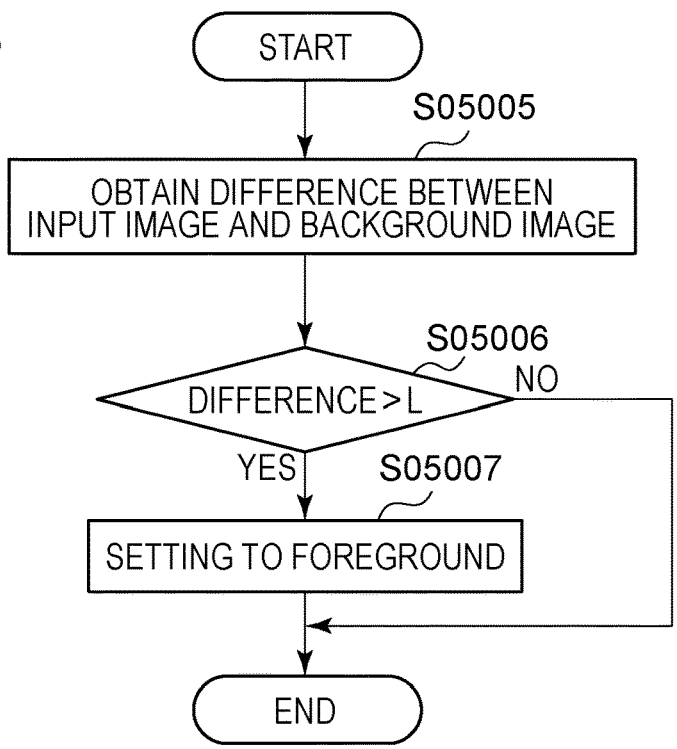
FIG. 35B is a flowchart of separation between a foreground and a background.
Figure 35C:
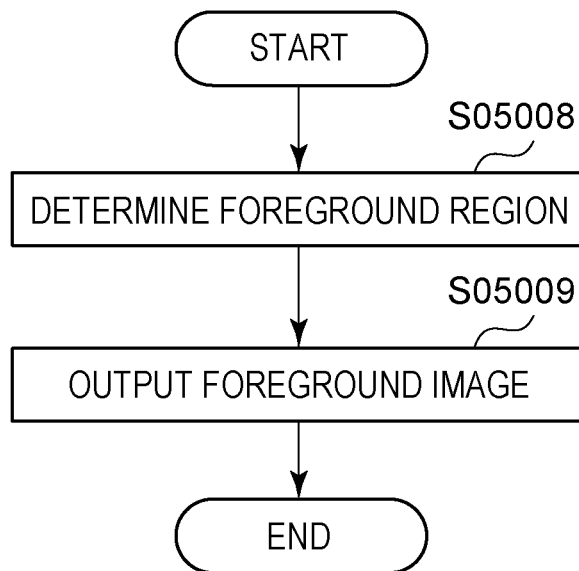
FIG. 35C is a flowchart of separation between a foreground and a background.
Figure 35D:
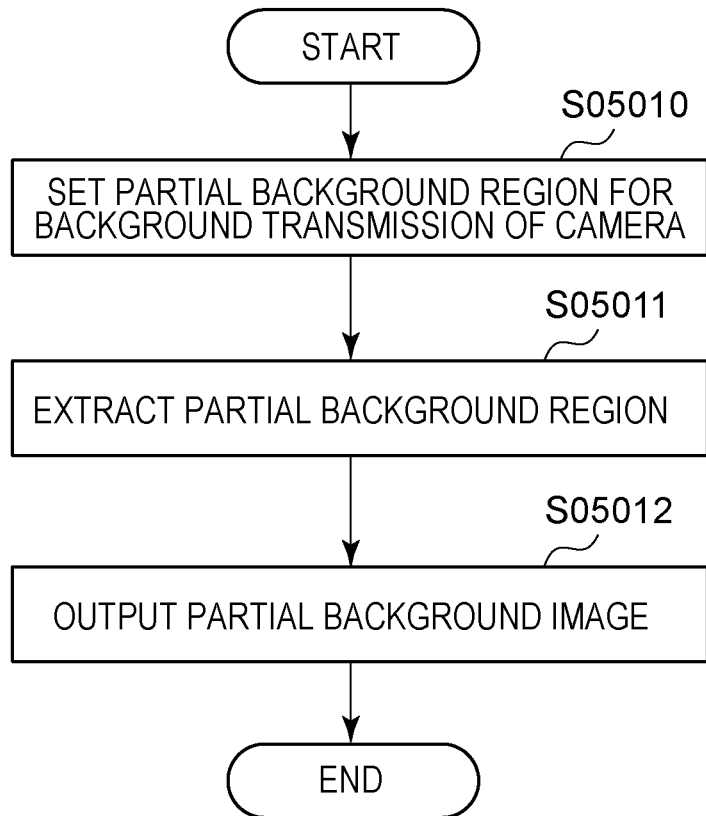
FIG. 35D is a flowchart of separation between a foreground and a background.

The foreground separation unit 05001 executes the process described with reference to FIG. 35B above on the individual pixels of the input image, and thereafter, performs a process of determining the foreground region as a block to be output. A flow of this process will be described with reference to FIG. 35C. In step S05008, a foreground region configured by a plurality of pixels coupled with one another is determined as one foreground image in the image in which the foreground region is detected. As a process of detecting a region including pixels coupled with one another, a region growth method is used, for example. Since the region growth method is a general algorithm, detailed description thereof is omitted. After the foreground regions are collected as foreground images in step S05008, the foreground images are successively read and output to the transmission unit 06120 in step S05009.

Next, the 3D model information generation unit 06132 generates 3D model information using the foreground images. When the camera adapter 120 receives the foreground image from the adjacent camera 112, the foreground image is supplied to the different-camera foreground reception unit 05006 through the transmission unit 06120. A flow of a process executed by the 3D model processor 05005 when a foreground image is input will be described with reference to FIG. 35E. Here, when the image computing server 200 collects captured image data of the cameras 112, starts image processing, and generates a virtual viewpoint image, a period of time required for the image generation may be increased due to a large amount of calculation. In particular, the calculation amount in the 3D model generation may be considerably increased. Therefore, in FIG. 35E, a method for successively generating 3D model information while data is transmitted by the daisy chain connecting the camera adapters 120 to one another to reduce an amount of processing performed by the image computing server 200 will be described.

First, in step S05013, the 3D model information generation unit 06132 receives a foreground image captured by one of the other cameras 112. Subsequently, the 3D model information generation unit 06132 determines whether the camera 112 which has captured the received foreground image belongs to the gazing point group of the target camera 112 and the cameras 112 is adjacent to the target camera 112. When the determination is affirmative in step S05014, the process proceeds to step S05015. On the other hand, when the determination is negative, it is determined that the foreground image of the other camera 112 is not associated with the target camera 112 and the process is terminated, that is, the process is not performed. Furthermore, although the determination as to whether the camera 112 is adjacent to the target camera 112 is made in step S05014, a method for determining the relationship between the cameras 112 is not limited to this. For example, the 3D model information generation unit 06132 may obtain and set a camera number of the associated camera 112 in advance and perform a process by obtaining image data only when the image data of the associated camera 112 is transmitted. Also in this case, the same effect may be obtained.

In step S05015, the 3D model information generation unit 06132 obtains depth information of the foreground image. Specifically, the 3D model information generation unit 06132 associates the foreground image supplied from the foreground separation unit 05001 with the foreground image of one of the other cameras 112, and thereafter, obtains depth information of the pixels included in the foreground image in accordance with coordinate values of the associated pixels and camera parameters. Here, as a method for associating images with each other, a block matching method is employed, for example. The block matching method is generally used, and therefore, a detailed description thereof is omitted. As the association method, various methods may be employed such as a method for improving capability by combining feature point detection, feature value calculation, a matching process, and the like with one another.

In step S05016, the 3D model information generation unit 06132 obtains 3D model information of the foreground image. Specifically, world coordinate values of the pixels included in the foreground image are obtained in accordance with the depth information obtained in step S05015 and the camera parameters stored in the camera parameter reception unit 05007. Then the world coordinate values and the pixel values are used as a set so that one point data of a 3D model configured as point group is set. As described above, information on a point group of a portion of the 3D model obtained from the foreground image supplied from the foreground separation unit 05001 and information on a point group of a portion of the 3D model obtained from the foreground image of the other camera 112 may be obtained. In step S05017, the 3D model information generation unit 06132 adds a camera number and a frame number to the obtained 3D model information as metadata (a time code and an absolute time may serve as the metadata, for example) and transmits the 3D model information to the transmission unit 06120.

In this way, even when the camera adapters 120 are connected to one another by the daisy chain and a plurality of gazing points are set, the image processing is performed in accordance with the correlations among the cameras 112 while data is transmitted by the daisy chain so that 3D model information is successively generated. As a result, high speed processing is efficiently realized.

According to this embodiment, although the processes described above are executed by hardware, such as FPGA or ASIC, implemented in the camera adapter 120, the processes may be executed by a software process using a CPU, a GPU, or a DSP, for example. Furthermore, although the camera adapter 120 executes the generation of 3D model information in this embodiment, the image computing server 200 which collects all the foreground images from the cameras 112 may generate 3D model information.

Next, a process of performing live image generation and replay image generation based on the data stored in the database 250 and causing the end-user terminal 190 to display a generated image which is performed by the back-end server 270 will be described. Note that the back-end server 270 of this embodiment generates virtual viewpoint content as a live image or a replay image. In this embodiment, the virtual viewpoint content is generated using images captured by the plurality of cameras 112 as a plurality of viewpoint images. Specifically, the back-end server 270 generates virtual viewpoint content based on viewpoint information specified in accordance with a user operation, for example. Although a case where the virtual viewpoint content includes sound data (audio data) is described as an example in this embodiment, the sound data may not be included.

When the user specifies a viewpoint by operating the virtual camera operation UI 330, an image to be captured by the camera 112 for generation of an image corresponding to a position of the specified viewpoint (a position of a virtual camera) may not exist, resolution of the image may not be sufficient, or quality of the image may be low. In this case, if a determination that a condition for providing an image for the user is not satisfied may not be made until a stage of image generation, it may be possible that operability is deteriorated. A method for reducing the possibility will be described hereinafter.

Figure 36:
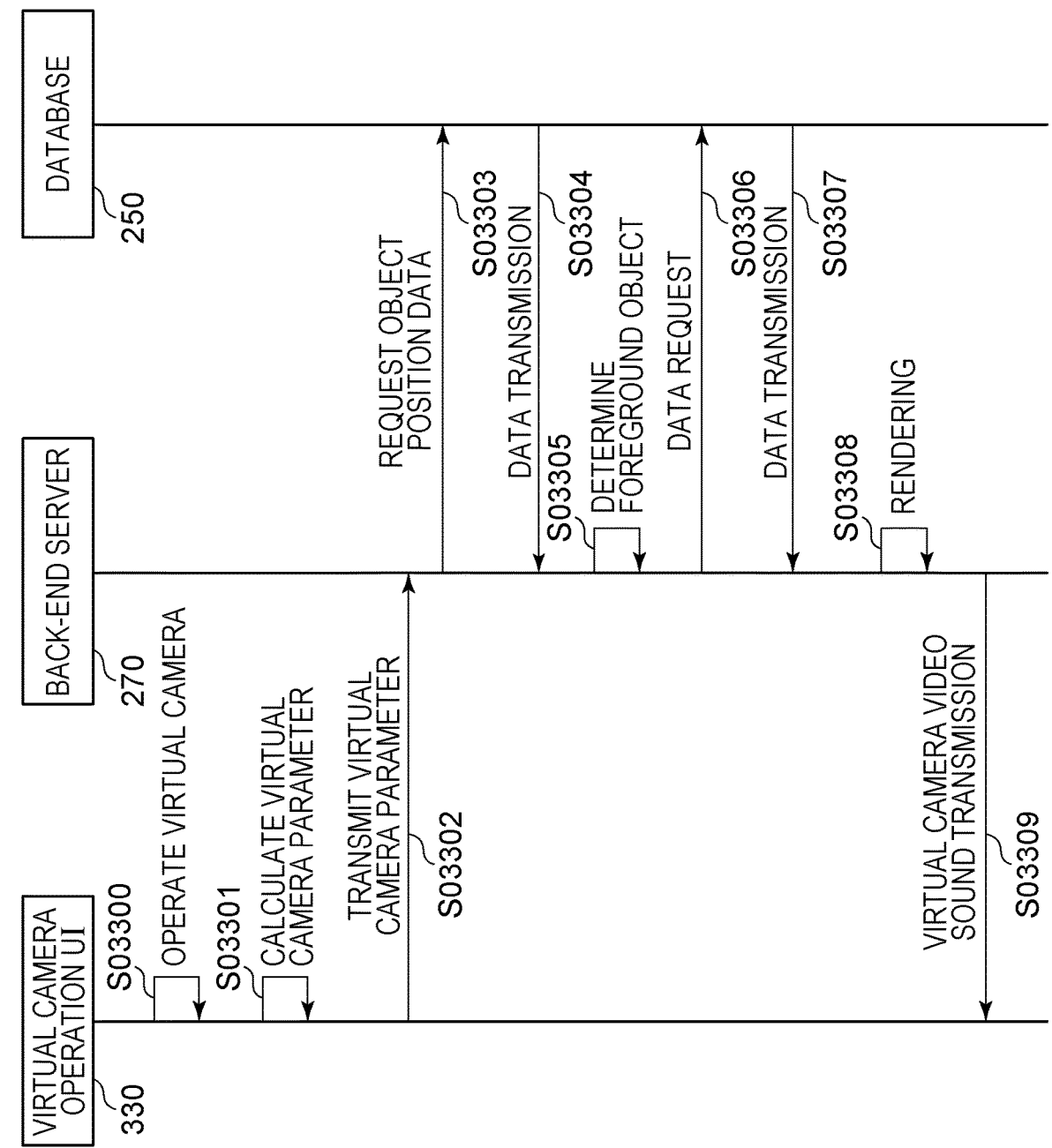
FIG. 36 is a sequence diagram illustrating a process of generating a virtual camera image.

FIG. 36 is a flow of processing performed by the virtual camera operation UI 330, the back-end server 270, and the database 250 in a period of time from when the operator (the user) performs an operation on the input device to when a virtual viewpoint image is displayed.

First, the operator operates the input device so as to operate the virtual camera (S03300).

Examples of the input device includes a joystick, a jog dial, a touch panel, a keyboard, and a mouse.

The virtual camera operation UI 330 obtains virtual camera parameters indicating an input position and an input orientation of the virtual camera (S03301).

The virtual camera parameters include external parameters indicating a position and an orientation of the virtual camera and internal parameters indicating a zoom magnification of the virtual camera.

The virtual camera operation UI 330 transmits the obtained virtual camera parameters to the back-end server 270.

When receiving the virtual camera parameters, the back-end server 270 requests the database 250 to transmit a foreground 3D model group (S03303). The database 250 transmits the foreground 3D model group including positional information of a foreground object to the back-end server 270 in response to the request (S03304).

The back-end server 270 geometrically obtains a foreground object group included in a view field of the virtual camera based on the virtual camera parameters and the positional information of the foreground object included in the foreground 3D model (S03305).

The back-end server 270 requests the database 250 to transmit a foreground image of the obtained foreground object group, the foreground 3D model, a background image, and a sound data group (S03306). The database 250 transmits data to the back-end server 270 in response to the request (S03307).

The back-end server 270 generates a foreground image and a background image in the virtual viewpoint from the received foreground image and the received foreground 3D model, and the received background image, and generates a full-view image in the virtual viewpoint by combining the images.

Furthermore, the back-end server 270 combines sound data corresponding to a position of the virtual camera in accordance with the sound data group so as to generate an image and sound in the virtual viewpoint by integrating the sound data with the full-view image in the virtual viewpoint (S03308).

The back-end server 270 transmits the generated image and sound in the virtual viewpoint to the virtual camera operation UI 330 (S03309). The virtual camera operation UI 330 realizes display of the image captured by the virtual camera by displaying the received image.

Figure 38A:
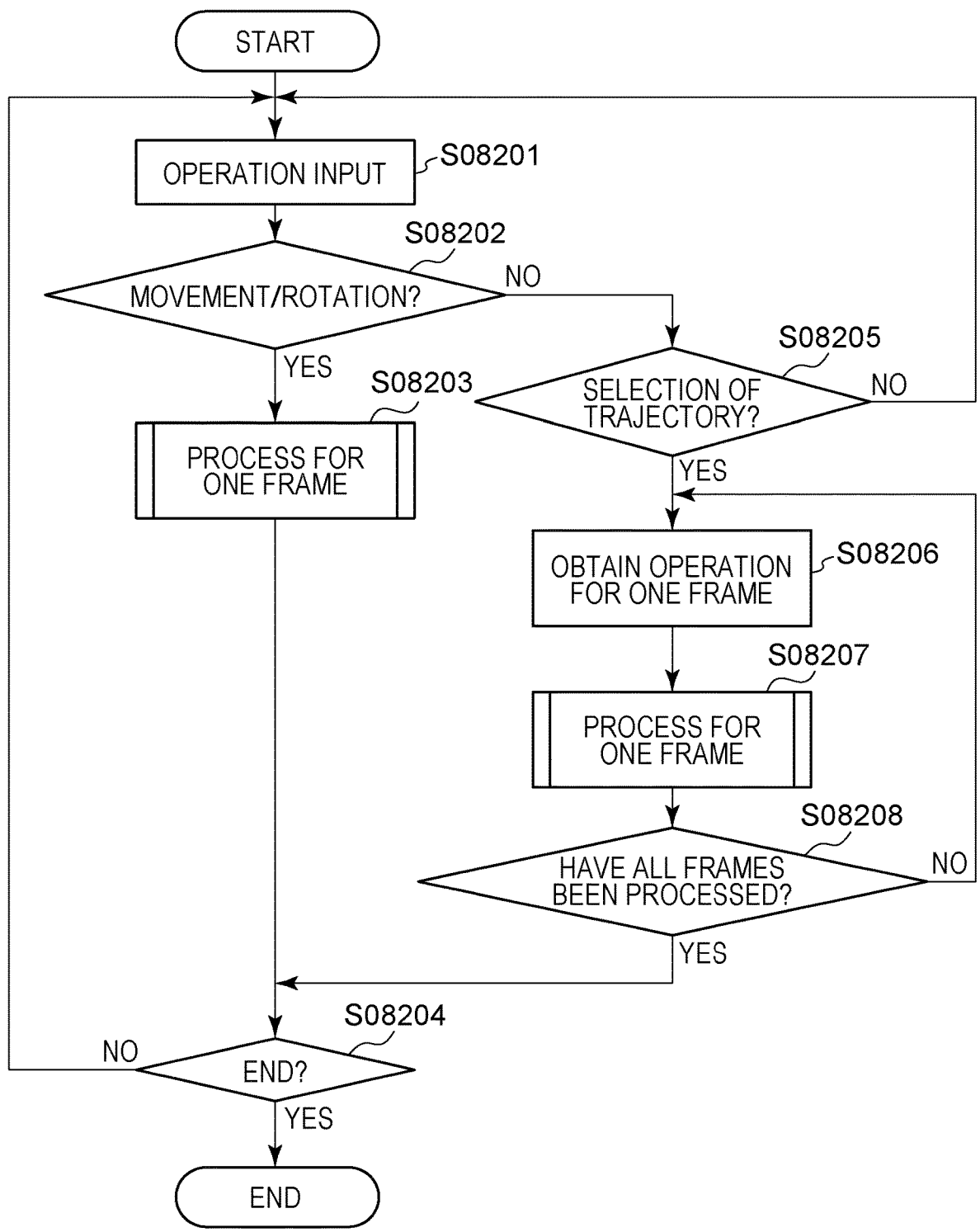
FIG. 38A is a flowchart of a process of generating a live image.

FIG. 38A is a flowchart of a procedure of processing performed when the virtual camera operation UI 330 generates a live image.

In step S08201, the virtual camera operation UI 330 obtains information on an operation input by the operator to the input device to operate the virtual camera 08001. In step S08202, the virtual camera operation unit 08101 determines whether the operation of the operator corresponds to movement or rotation of the virtual camera 08001. The movement or the rotation are performed for one frame. When the determination is affirmative, the process proceeds to step S08203. Otherwise, the process proceeds to step S08205. Here, different processes are performed for the movement operation, the rotation operation, and a trajectory selection operation. Accordingly, image expression in which the viewpoint position is rotated while time is stopped and image expression of continuous movement may be switched from one to another by a simple operation.

Figure 38B:
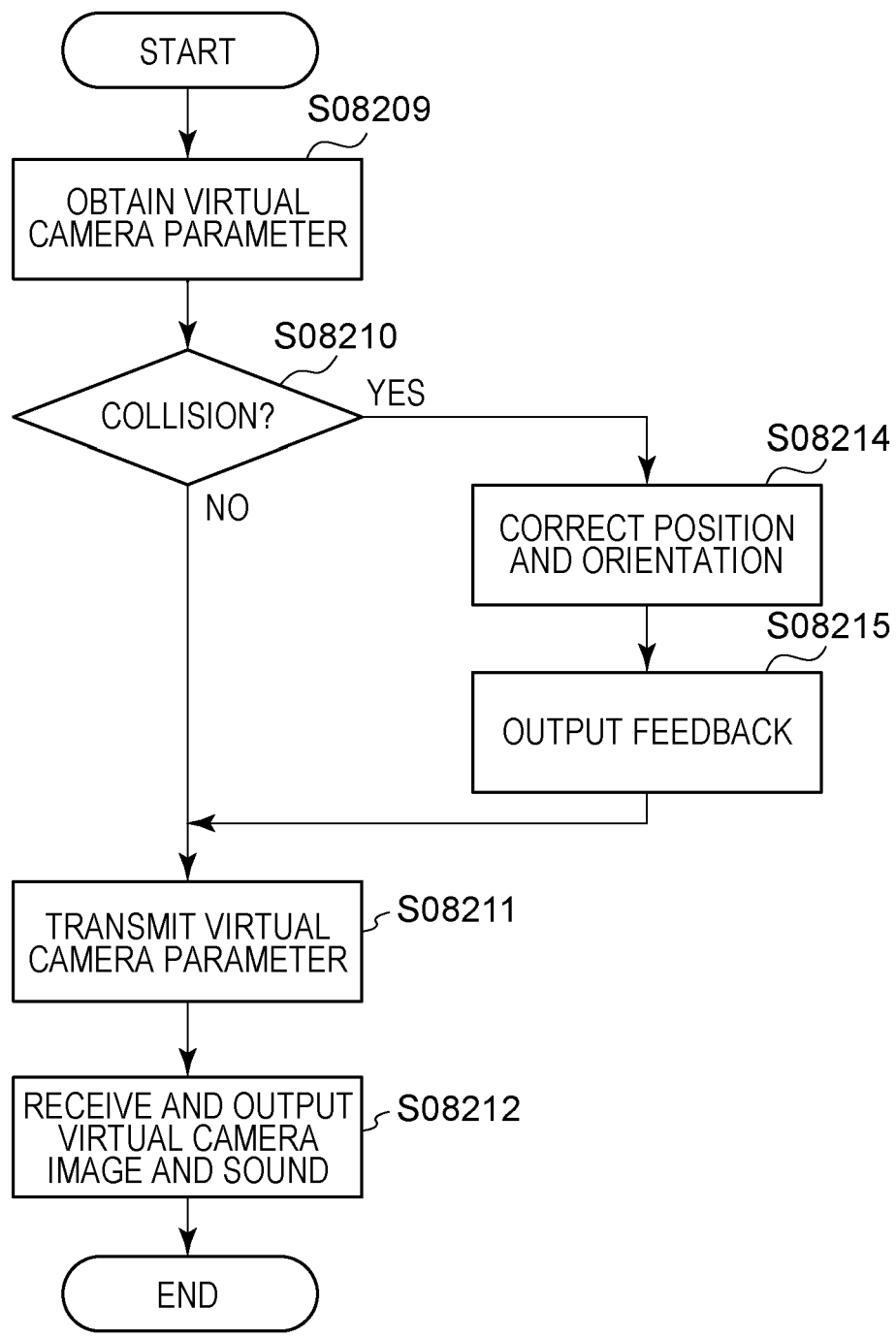
FIG. 38B is a flowchart of a process of generating a live image.

In step S08203, a process for one frame to be described with reference to FIG. 38B is performed. In step S08204, the virtual camera operation UI 330 determines whether the operator has input a termination operation. When the determination is affirmative, the process is terminated, and otherwise, the process returns to step S08201. In step S08205, the virtual camera operation unit 08101 determines whether the operator has input an operation of selecting a trajectory (a virtual camera path). For example, the trajectory may be represented by a line of information on operations of the virtual camera 08001 for a plurality of frames. When it is determined that the operation of selecting a trajectory has been input, the process proceed to step S08206. Otherwise, the process returns to step S08201.

In step S08206, the virtual camera operation UI 330 obtains an operation of a next frame in accordance with the selected trajectory. In step S08207, a process for one frame to be described with reference to FIG. 38B is performed. In step S08208, it is determined whether processing has been performed on all frames of the selected trajectory. When the determination is affirmative, the process proceeds to step S08204, and otherwise, the process returns to step S08206. FIG. 38B is a flowchart of the process for one frame performed in step S08203 and step S08206.

In step S08209, the virtual camera parameter obtaining unit 08102 obtains a virtual camera parameter after the position and the orientation are changed. In step S08210, the collision determination unit 08104 performs a collision determination. When collision occurs, that is, when the virtual camera restriction is not satisfied, the process proceeds to step S08214. When collision does not occur, that is, when the virtual camera restriction is satisfied, the process proceeds to step S08211.

In this way, the virtual camera operation UI 330 performs the collision determination. Then a process of locking the operation unit or a process of generating alert by displaying a message of a different color is performed in accordance with a result of the determination so that immediate feedback to the operator may be improved. As a result, operability is improved.

In step S08211, the virtual camera path management unit 08106 transmits the virtual camera parameter to the back-end server 270. In step S08212, the virtual camera image/sound output unit 08108 outputs the image supplied from the back-end server 270.

In step S08214, the position and the orientation of the virtual camera 08001 are corrected so that the virtual camera restriction is satisfied. For example, a latest operation input performed by the user is cancelled, and the virtual camera parameter is brought into a state of a preceding frame again. By this, when collision occurs after a trajectory is input, for example, the operator may interactively correct the operation input from the portion in which collision occurs without performing the operation input from the beginning, and accordingly, the operability is improved.

In step S08215, the feedback output unit 08105 notifies the operator of information indicating that the virtual camera restriction is not satisfied. The notification is performed by sound, a message, or a method for locking the virtual camera operation UI 330. However, the notification method is not limited to these.

Figure 39:
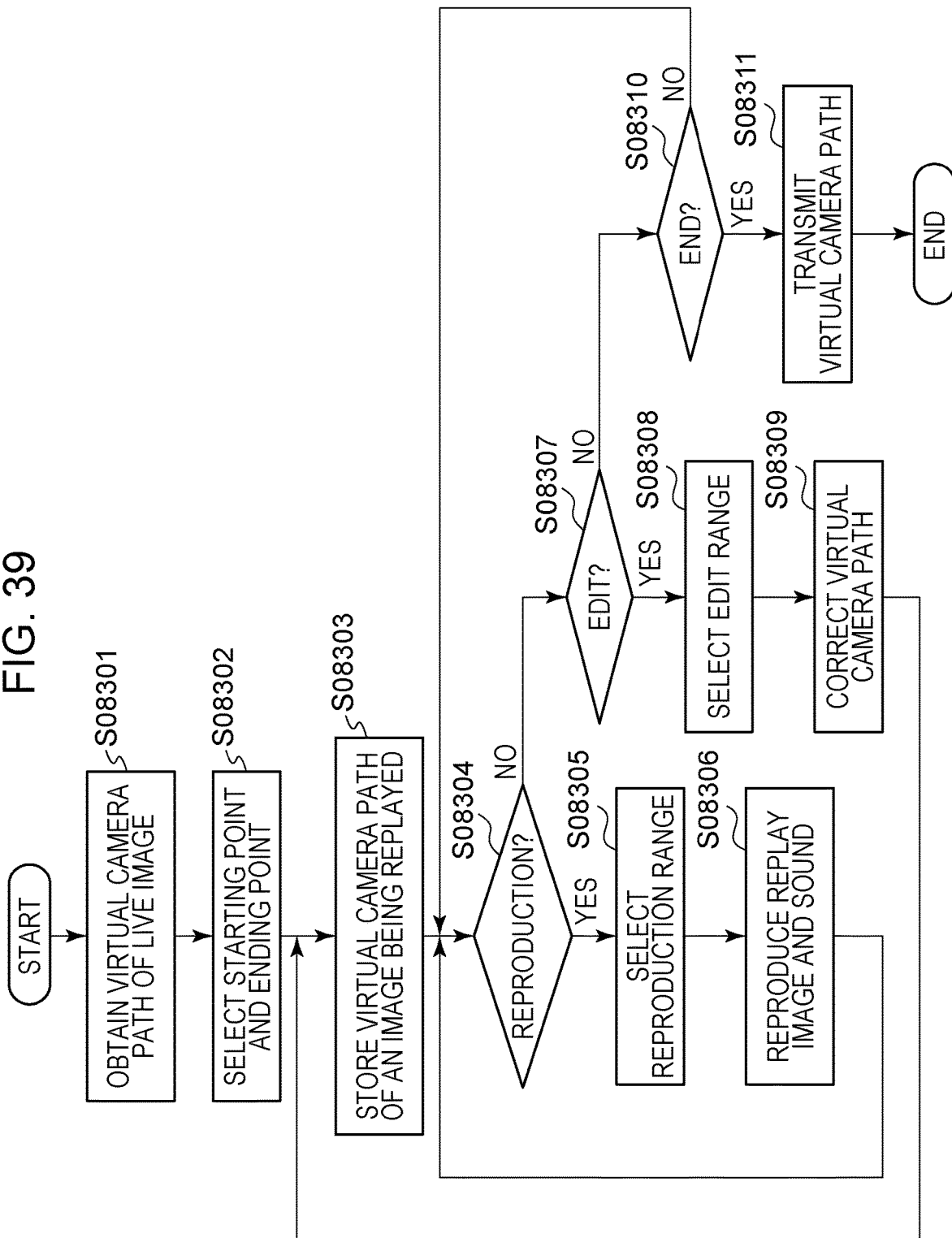
FIG. 39 is a flowchart of a process of generating a replay image.

FIG. 39 is a flowchart of a procedure of processing performed when the virtual camera operation UI 330 generates a replay image.

In step S08301, the virtual camera path management unit 08106 obtains the virtual camera path 08002 of a live image. In step S08302, the virtual camera path management unit 08106 accepts an operation performed by the operator to select a starting point and an ending point of the virtual camera path 08002 of the live image. For example, the virtual camera path 08002 for 10 seconds before and after a goal scene is selected. When the live image has 60 frames per second, 600 virtual camera parameters are included in the virtual camera path 08002 for 10 seconds. By this, different virtual camera parameter information to be managed is associated with different frames.

In step S08303, the selected virtual camera path 08002 for 10 seconds is stored as an initial value of the virtual camera path 08002 in the replay image. Furthermore, in a process from step S08307 to step S08309, when the virtual camera path 08002 is edited, a result of the editing is stored as update.

In step S08304, the virtual camera operation UI 330 determines whether an operation input by the operator is a reproduction operation. When the determination is affirmative, the process proceeds to step S08305, and otherwise, the process proceeds to step S08307.

In step S08305, an operator input associated with a selection of a reproduction range is accepted. In step S08306, an image and sound in the range selected by the operator are reproduced. Specifically, the virtual camera path management unit 08106 transmits the virtual camera path 08002 in the selected range to the back-end server 270. That is, the virtual camera path management unit 08106 successively transmits the virtual camera parameters included in the virtual camera path 08002. The virtual camera image/sound output unit 08108 outputs a virtual viewpoint image and virtual viewpoint sound supplied from the back-end server 270. In step S08307, the virtual camera operation UI 330 determines whether an operation input by the operator is an editing operation. When the determination is affirmative, the process proceeds to step S08308, and otherwise, the process proceeds to step S08310.

In step S08308, the virtual camera operation UI 330 specifies a range selected by the operator as an editing range. In step S08309, an image and sound in the selected editing range are reproduced by a process the same as that performed in step S08306. However, when the virtual camera 08001 is operated using the virtual camera operation unit 08101, a result of the operation is reflected. Specifically, a replay image may be edited so as to be an image in a viewpoint different from the live image. Furthermore, the replay image may be edited so that slow reproduction is performed and the reproduction is stopped. For example, editing may be performed such that a time is stopped and a viewpoint is moved.

In step S08310, the virtual camera operation UI 330 determines whether an operation input by the operator is a termination operation. When the determination is affirmative, the process proceeds to step S08311, and otherwise, the process proceeds to step S08304.

In step S08311, the virtual camera path 08002 which has been edited is transmitted to the back-end server 270.

Figure 40:
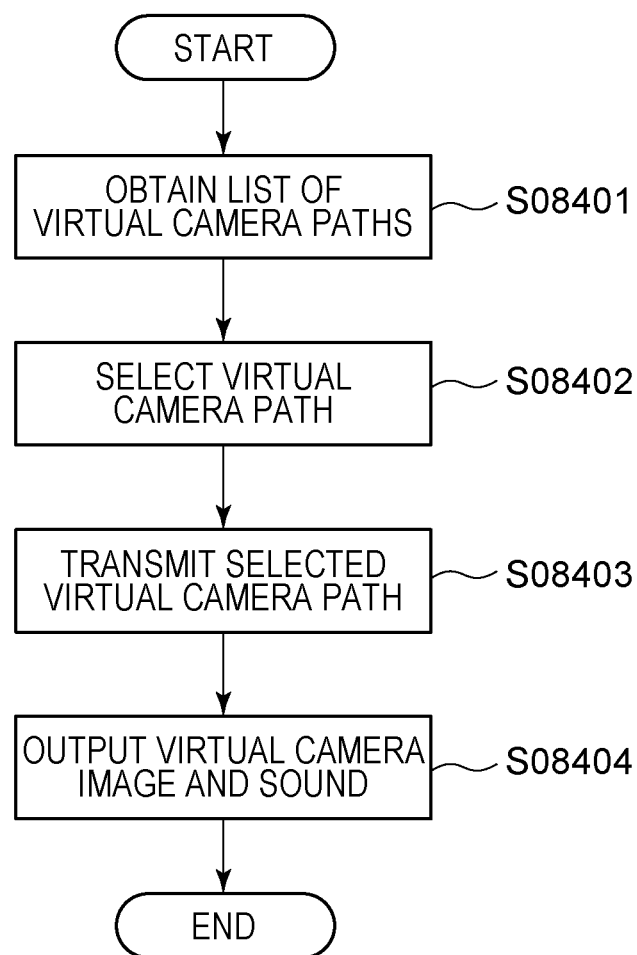
FIG. 40 is a flowchart of selection of a virtual camera path.

FIG. 40 is a flowchart of a procedure of a process of selecting a virtual camera image desired by the user from among a plurality of virtual camera images generated by the virtual camera operation UI 330 and viewing the selected virtual camera image. For example, the user views the virtual camera image using the end-user terminal 190. Note that the virtual camera path 08002 may be stored in the image computing server 200 or a web server (not illustrated) different from the image computing server 200.

In step S08401, the end-user terminal 190 obtains a list of the virtual camera paths 08002. A thumbnail, user's evaluation, and the like may be added to the virtual camera path 08002. In step S08401, the end-user terminal 190 displays the list of the virtual camera paths 08002.

In step S08402, the end-user terminal 190 obtains designation information associated with the virtual camera path 08002 selected by the user from the list.

In step S08403, the end-user terminal 190 transmits the virtual camera path 08002 selected by the user to the back-end server 270. The back-end server 270 generates a virtual viewpoint image and virtual viewpoint sound from the received virtual camera path 08002 to be transmitted to the end-user terminal 190.

In step S08404, the end-user terminal 190 outputs the virtual viewpoint image and the virtual viewpoint sound supplied from the back-end server 270.

In this way, since the list of the virtual camera paths 08002 is stored and an image may be reproduced thereafter using the virtual camera path 08002, the virtual viewpoint images are not required to be continuously stored, and accordingly, cost of a storage device may be reduced. Furthermore, in a case where the image generation corresponding to a virtual camera path 08002 having a high priority degree is requested, image generation of a virtual camera path 08002 having a low priority degree may be performed later. Furthermore, if the virtual camera path 08002 is disclosed in the web server, a virtual viewpoint image may be provided or shared for end users connected to a web, and accordingly, serviceability for users may be improved.

Figure 41:
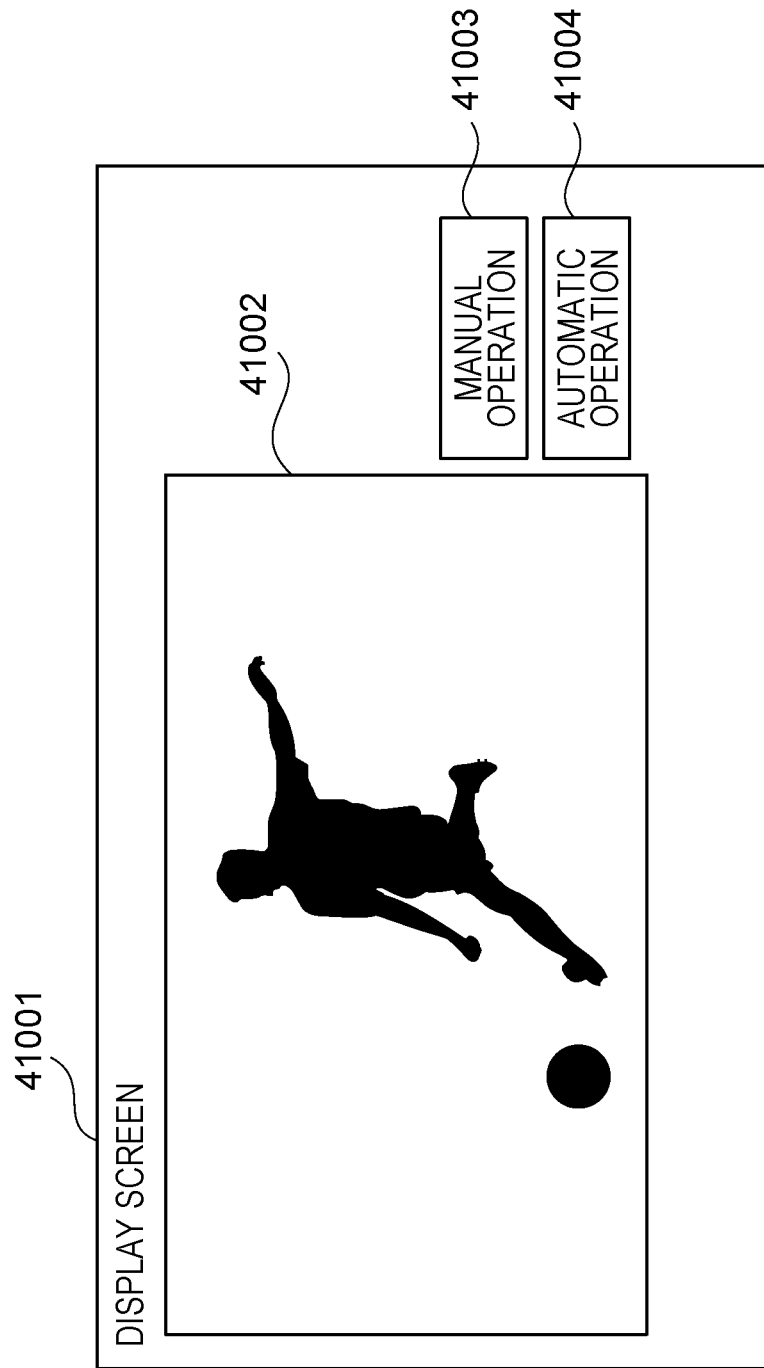
FIG. 41 is a diagram illustrating a screen displayed by the end-user terminal.

A screen displayed in the end-user terminal 190 will be described. FIG. 41 is a diagram illustrating a display screen 41001 displayed by the end-user terminal 190 (an author of the illustration: Vector Open Stock, use consent: http://creativecommons.org/licenses/by/2.1/jp/legalcode).

The end-user terminal 190 successively displays images supplied from the back-end server 270 in a region 41002 in which images are to be displayed so that the viewer (the user) may view the virtual viewpoint image, such as a soccer game. The viewer operates a user input device in accordance with the displayed image so as to change a viewpoint of the image. If the user moves the mouse leftward, for example, an image in which a viewpoint is directed to the left in the displayed image is displayed. If the user moves the mouse upward, an image in which an upper direction in the displayed image is viewed is displayed.

Graphic user interface (GUI) buttons 41003 and 41004 in which a manual operation and an automatic operation may be switched from one to another are disposed in a region different from the image display region 41002. When the button 41003 or the button 41004 is operated, the viewer may determine whether the viewpoint is changed before viewing or the viewing is performed in the preset viewpoint.

For example, the end-user terminal 190 successively uploads viewpoint operation information indicating a result of switching of a viewpoint manually operated by the user to the image computing server 200 or the web server (not illustrated). Thereafter, a user who operates another end-user terminal 190 may obtain the viewpoint operation information and may view a virtual viewpoint image corresponding to the viewpoint operation information. Furthermore, the user may view a selected image corresponding to popular viewpoint operation information, for example, by rating the uploaded viewpoint operation information, and the service may be easily used even by the user who is not familiar with the operation.

Figure 42:
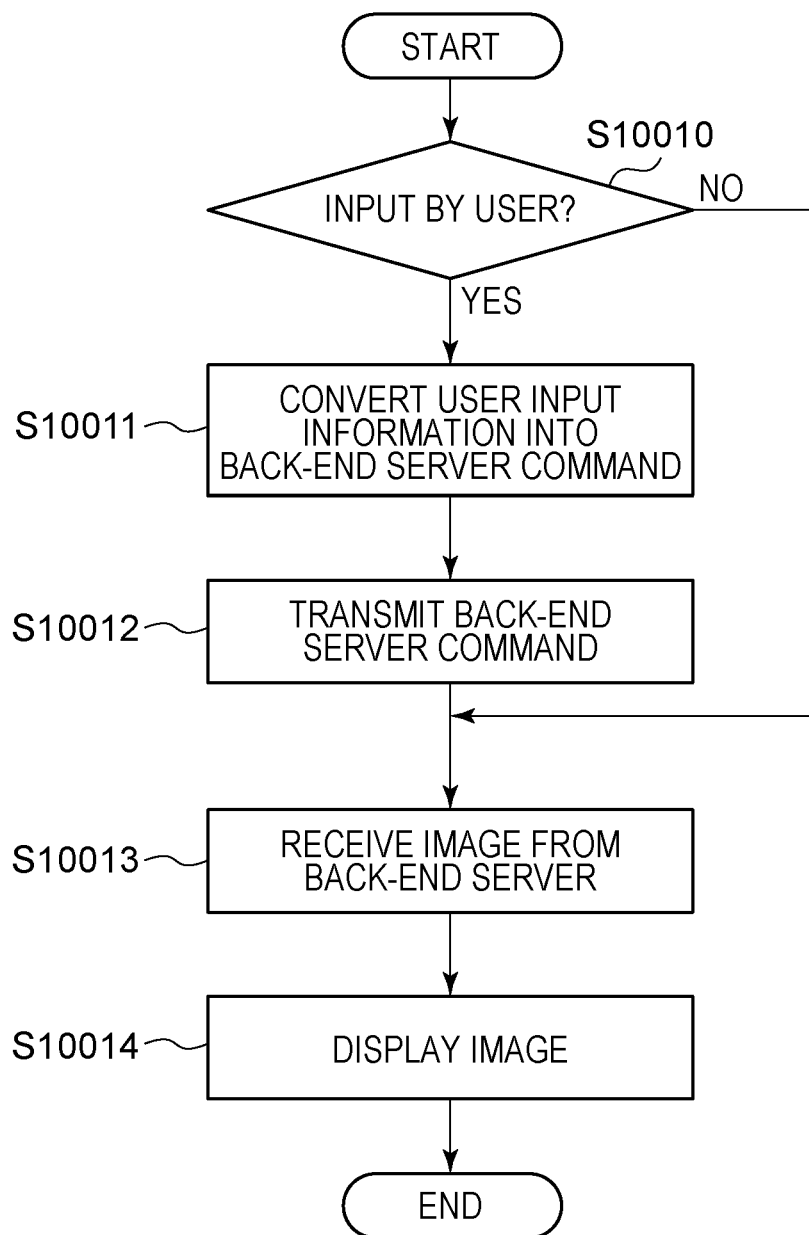
FIG. 42 is a flowchart of a process of a manual operation performed by an application management unit.

Next, an operation of the application management unit 10001 which is manually operated since the viewer selects the manual operation will be described. FIG. 42 is a flowchart of a manual operation process performed by the application management unit 10001.

The application management unit 10001 determines whether the user has performed input (S10010).

When the determination is affirmative (Yes in step S10010), the application management unit 10001 converts the user input information into a backend server command so that the back-end server 270 may recognize the user input information (S10011).

On the other hand, when the determination is negative (No in step S10010), the process proceeds to step S10013.

Subsequently, the application management unit 10001 transmits the back-end server command through the operating system unit 10002 and the network communication unit 10003 (S10012). After the back-end server 270 generates an image in which a viewpoint is changed based on the user input information, the application management unit 10001 receives an image from the back-end server 270 through the network communication unit 10003 and the operating system unit 10002 (S10013). Then the application management unit 10001 displays the received image in the predetermined image display region 41002 (S10014). By performing the process described above, a viewpoint of an image is changed by the manual operation.

Figure 43:
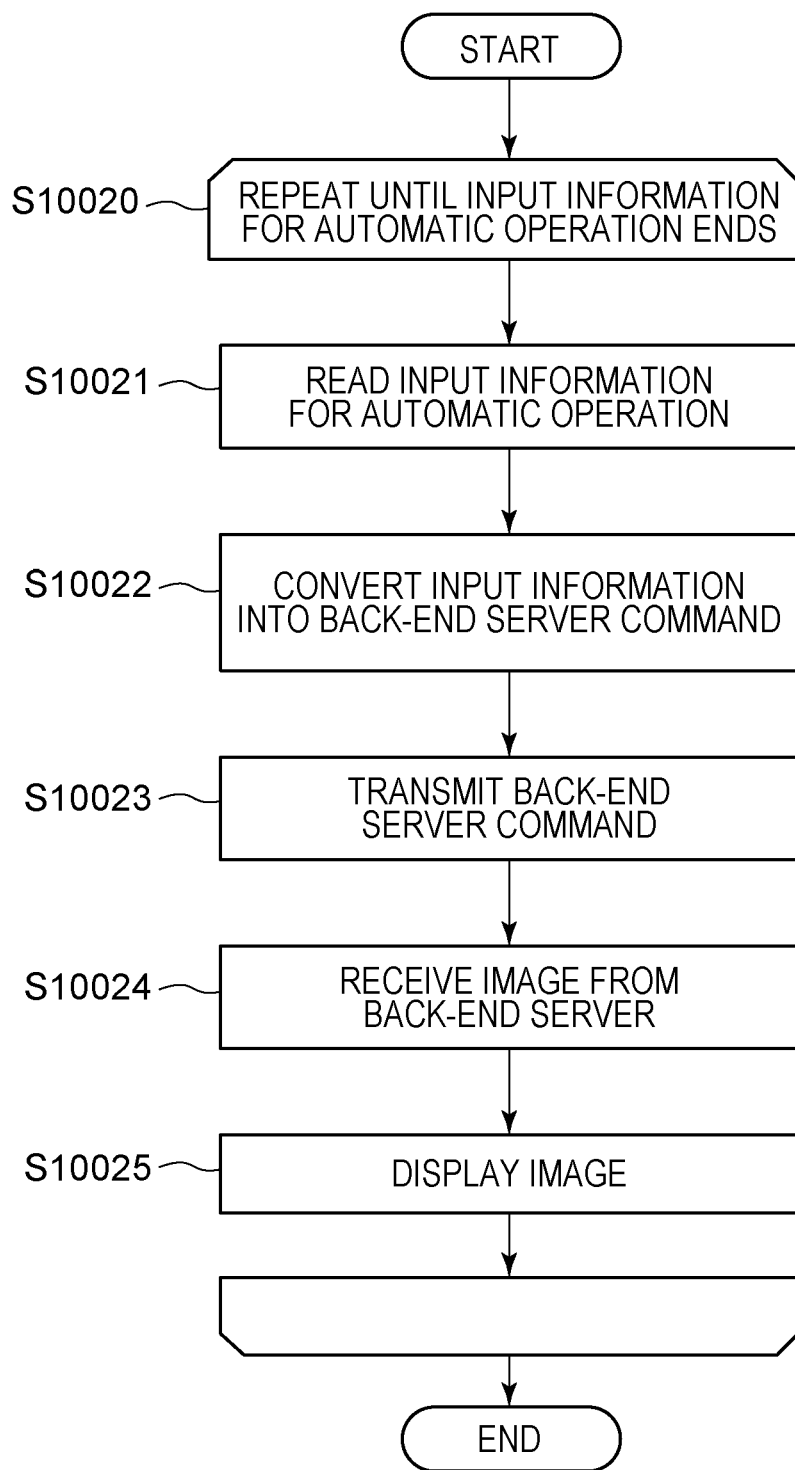
FIG. 43 is a flowchart of a process of an automatic operation performed by the application management unit.

Next, an operation of the application management unit 10001 when the viewer (the user) selects the automatic operation will be described. FIG. 43 is a flowchart of an automatic operation process performed by the application management unit 10001.

When input information for the automatic operation is detected (S10020), the application management unit 10001 reads the input information for the automatic operation (S10021).

The application management unit 10001 converts the read input information for the automatic operation into a backend server command recognizable by the back-end server 270 (S10022).

Subsequently, the application management unit 10001 transmits the back-end server command through the operating system unit 10002 and the network communication unit 10003 (S10023).

After the back-end server 270 generates an image in which a viewpoint is changed based on the user input information, the application management unit 10001 receives an image from the back-end server 270 through the network communication unit 10003 and the operating system unit 10002 (S10024). Finally, the application management unit 10001 displays the received image in a predetermined image display region (S10025). The process described above is repeatedly performed as long as the input information for automatic operation exists so that a viewpoint of an image is changed due to the automatic operation.

Figure 44:
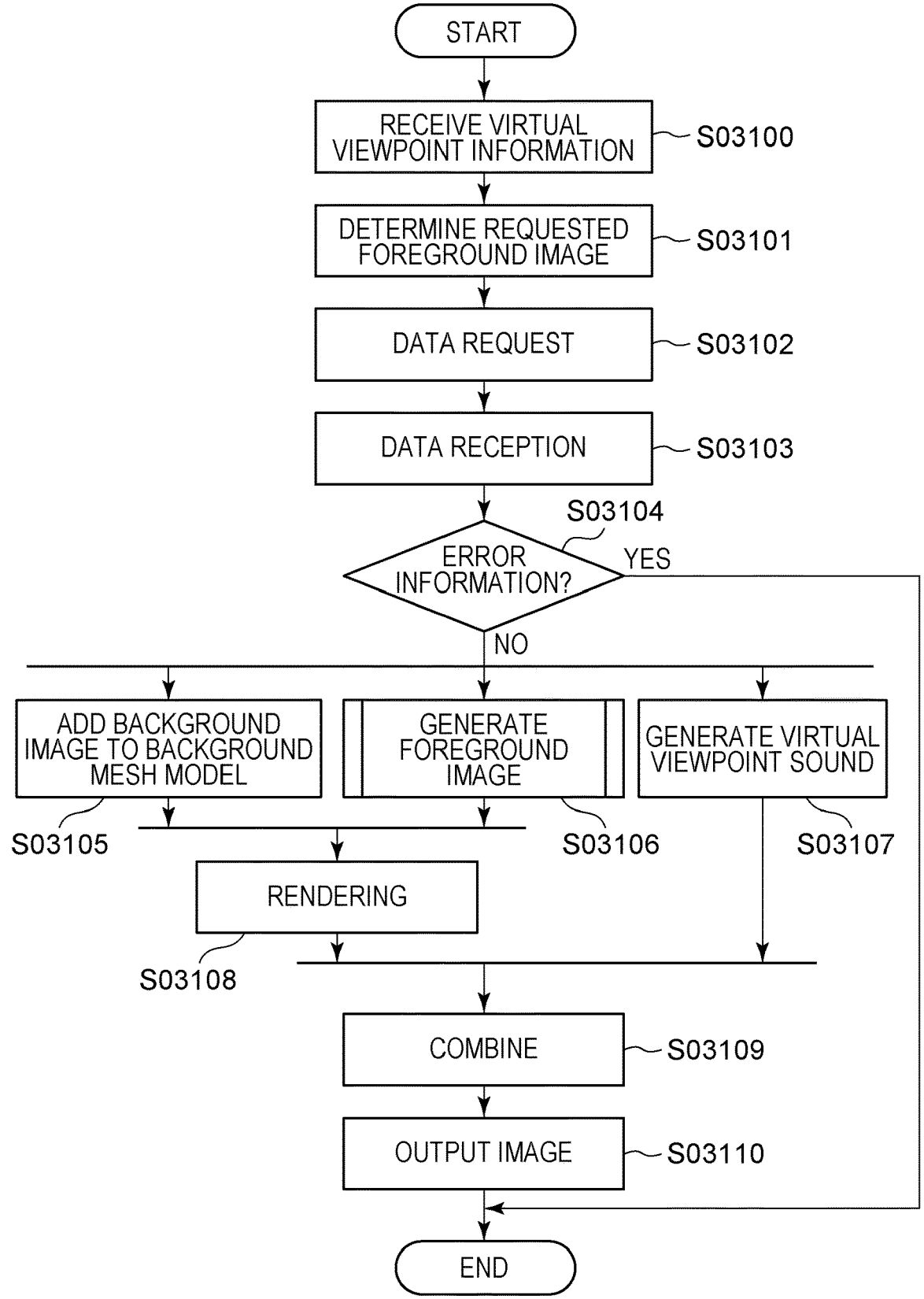
FIG. 44 is a flowchart of a rendering process.

FIG. 44 is a flowchart of a process of generating a virtual viewpoint image for one frame performed by the back-end server 270.

The data reception unit 03001 receives virtual camera parameters from the controller 300 (S03100). As described above, the virtual camera parameters indicate a position and an orientation of a virtual viewpoint and the like.

The foreground object determination unit 03010 determines a foreground object required for generation of a virtual viewpoint image based on the received virtual camera parameters and the position of the foreground object (S03101). The foreground object included in a view field when viewed from the virtual viewpoint is 3D-geometrically obtained. The request list generation unit 03011 generates a request list of a foreground image of the determined foreground object, a foreground 3D model group, a background image, and a sound data group, and the request data output unit 03012 transmits a request to the database 250 (S03102). The request list includes content of data to be requested to the database 250.

The data reception unit 03001 receives the requested information from the database 250 (S03103). The data reception unit 03001 determines whether the information supplied from the database 250 includes information indicating an error (S03104).

Here, examples of the information indicating an error include an image transfer amount overflow, image capturing failure, and failure of storage of an image in the database 250. The error information is stored in the database 250.

When the information indicating an error is included in step S03104, the data reception unit 03001 determines that generation of a virtual viewpoint image is not possible and terminates the process without outputting data. When it is determined that the information indicating an error is not included in step S03104, the back-end server 270 performs generation of a background image in a virtual viewpoint, generation of a foreground image, and generation of sound corresponding to the viewpoint. The background texture addition unit 03002 generates a background mesh model having texture from a background mesh model which is obtained after activation of the system and which is stored in the background mesh model management unit 03013 and the background image obtained by the database 250 (S03105).

Furthermore, the back-end server 270 generates a foreground image in accordance with a rendering mode (S03106). Furthermore, the back-end server 270 generates sound by synthesizing sound data groups as if sound in the virtual viewpoint is copied (S03107). In the synthesizing of sound data groups, sizes of individual sound data are controlled based on positions of the obtainment of the virtual viewpoint and the audio data.

The rendering unit 03006 generates a full-view image in the virtual viewpoint by trimming the background mesh model having texture generated in step S3105 within a view field viewed from a virtual viewpoint, and the full-view image of the virtual viewpoint by combining foreground images (S03108).

The combining unit 03008 integrates the virtual sound generated in the virtual viewpoint sound generation (S03107) and the rendered full-view image in the virtual viewpoint (S03109) so as to generate virtual viewpoint content for one frame.

The image output unit 03009 outputs the generated virtual viewpoint content for one frame to the external controller 300 and the external end-user terminal 190 (S03110).

Next, a flexible control determination for coping with various request for generation of a virtual viewpoint image performed to increase use cases to which this system is applicable will be described.

Figure 45:
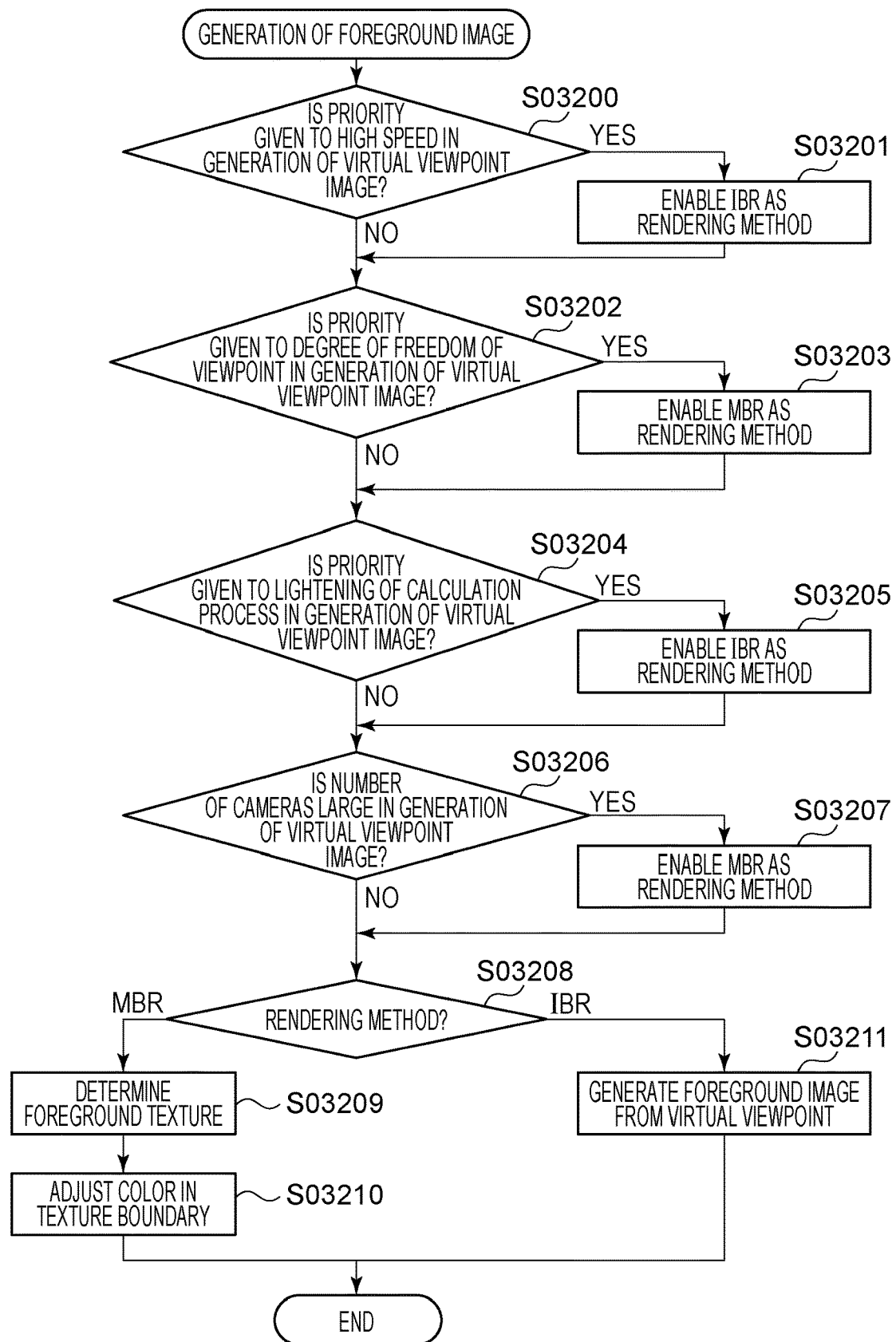
FIG. 45 is a flowchart of a process of generating a foreground image.

FIG. 45 is a flowchart of the generation of a foreground image. Here, an example of a policy of selection of one of a plurality of rendering algorithms so that a request corresponding to an image output destination is coped with in the virtual viewpoint image generation will be described.

First, the rendering mode management unit 03014 of the back-end server 270 determines a rendering method. Requirements for determining a rendering method is set by the control station 310 to the back-end server 270. The rendering mode management unit 03014 determines a rendering method in accordance with the requirements. The rendering mode management unit 03014 checks whether a request for giving a priority to high-speed operation is performed in the generation of a virtual viewpoint image performed by the back-end server 270 based on imaging by the camera platform 113 (S03200). The request for giving a priority to high-speed operation is equivalent to a request for image generation with little delay. When the determination is affirmative in step S03200, IBR is enabled as the rendering (S03201). Subsequently, a determination as to whether a request for giving a priority to a specified degree of freedom of a viewpoint associated with the generation of a virtual viewpoint image has been made (S03202). When the determination is affirmative in step S03202, MBR is enabled as the rendering (S03203). Subsequently, a determination as to whether a request for giving a priority to lightening of a calculation process in the generation of a virtual viewpoint image is made (S03204). The request for giving a priority to lightening of a calculation process is performed when the system is configured with low cost while a small amount of computer resource is used, for example. When the determination is affirmative in step S03204, TBR is enabled as the rendering (S03205). Thereafter, the rendering mode management unit 03014 determines whether the number of cameras 112 to be used for the generation of a virtual viewpoint image is equal to or larger than a threshold value (S03206). When the determination is affirmative in step S03206, MBR is enabled as the rendering (S03207).

The back-end server 270 determines whether a rendering method is MBR or IBR in accordance with the mode information managed by the rendering mode management unit 03014 (S03208). Note that, if any of the processes in step S03201, S03203, S03205, and S03207 is not performed, a default rendering method determined in advance when the system is activated is used.

When it is determined that a rendering method is a model base (MBR) in step S03208, the foreground texture determination unit 03003 determines texture of the foreground based on the foreground 3D model and the foreground image group (S03209). Thereafter, the foreground texture border color adjustment unit 03004 performs color matching in a boundary of the determined foreground texture (S03210). The texture of the foreground 3D model is extracted from a plurality of foreground image groups, and therefore, the color matching is performed to address color differences in the texture caused by differences of imaging states of the foreground images.

When it is determined that a rendering method is IBR in step S03208, the virtual viewpoint foreground image generation unit 03005 performs geometric conversion, such as perspective transformation, on the foreground images based on the virtual camera parameters and the foreground image groups so that foreground images in the virtual viewpoint are generated (S03211).

Note that the user may arbitrarily change the rendering method during the system operation or the system may change the rendering method in accordance with a state of the virtual viewpoint. Furthermore, candidate rendering methods may be changed during the system operation.

Accordingly, a rendering algorithm associated with the generation of a virtual viewpoint may be not only set at a time of activation but also changed in accordance with a situation, and therefore, various requests may be processed. Specifically, even when elements corresponding to different image output destinations (priority degrees of parameters, for example) are requested, the request is flexibly coped with. Note that although one of IBR and MBR is used as the rendering method in this embodiment, the present invention is not limited to this and a hybrid method using both of the methods may be employed. When the hybrid method is employed, the rendering mode management unit 03014 determines a plurality of methods to be used for generation of divided regions obtained by dividing the virtual viewpoint image in accordance with the information obtained by the data reception unit 03001. Specifically, a portion of the virtual viewpoint image for one frame may be generated based on the MBR and other portions may be generated based on the IBR. For example, an object which is glossy, which does not have texture, and which has a non-recessed surface may avoid deterioration of accuracy of the 3D model by using the IBR, and an object which is near the virtual viewpoint may avoid flatness of an image by using the MBR. Furthermore, the object near the center of the screen is to be clearly displayed, and therefore, an image is generated by the MBR and a processing load of an object located at an end may be reduced by generating an image by the IBR. In this way, the processing load associated with the generation of a virtual viewpoint image and the image quality of the virtual viewpoint image may be controlled in detail.

Furthermore, although different settings appropriate for the system including settings of a gazing point, a camera work, and transmission control, may be set for different games, if the operator manually performs the settings of the system every time a game is held, a burden for the operator may be increased, and accordingly, simplicity of the setting is required. Accordingly, the image processing system 100 automatically updates settings of a device to be subjected to a setting change so that a mechanism for reducing the burden of the operator who performs the settings of the system for generating a virtual viewpoint image is provided. This mechanism will be described hereinafter.

FIG. 46 is a table of an information list which is generated in the post-installation workflow described above and which is associated with operations set to the devices included in the system in the pre-imaging workflow. The control station 310 obtains information on a game to be imaged by the plurality of cameras 112 in accordance with an input operation performed by the user. Note that the method for obtaining game information is not limited to this, and the control station 310 may obtain the game information from other devices, for example. Then the control station 310 stores the obtained game information and the setting information of the image processing system 100 which are associated with each other as the information list. Hereinafter, the information list associated with the operation is referred to as a "setting list". When the control station 310 operates as a control device which performs a setting process of the system in accordance with the stored setting list, a burden of the operator who performs the system setting is reduced.

The game information obtained by the control station 310 includes at least one of a type and a starting time of a game which is a target of the imaging, for example. However, the game information is not limited to this, and other information associated with the game may be the game information.

An imaging number 46101 indicates a scene corresponding to each game to be imaged, and an estimated time 46103 indicates an estimated starting time and an estimated ending time of each game. Before the starting time of each scene, the control station 310 transmits a change request in accordance with the setting list to the devices.

A name of the game 46102 indicates a name of a game type. A gazing point (a coordinate designation) 46104 includes the number of gazing points of the cameras 112a to 112z, coordinate positions of the gazing points, and camera numbers corresponding to the gazing points. Imaging directions of the individual cameras 112 are determined in accordance with the positions of the gazing points. For example, if a type of a game is soccer, a center of a field, an area before a goal, and the like are set as the gazing points. A camera work 46105 indicates a range of a camera path when the virtual camera operation UI 330 and the back-end server 270 operate a virtual viewpoint and an image is generated. A designation available range of the viewpoint associated with the generation of a virtual viewpoint image is determined based on the camera work 46105.

A calibration file 46106 stores values of camera parameters which are obtained in the installation-time calibration described with reference to FIG. 17 and which are associated with positioning of the plurality of cameras 112 associated with the generation of a virtual viewpoint image, and is generated for each gazing point.

An image generation algorithm 46107 indicates a setting of a result of a determination as to whether the TBR, the MBR, or a hybrid method of the IBR and MBR is used as the rendering method associated with the generation of a virtual viewpoint image based on the captured image. The rendering method is set to the back-end server 270 by the control station 310. For example, game information indicating a type of a game corresponding to a number of players which is equal to or smaller than a threshold value, such as shot-putting or high-jump, corresponding to an imaging number of 3 and setting information indicating the MBR method for generating a virtual viewpoint image using a 3D model generated based on a plurality of captured images are associated with each other. Accordingly, a degree of freedom of designation of a viewpoint in a virtual viewpoint image of a game corresponding to a small number of players becomes high. On the other hand, a processing load becomes large if a virtual viewpoint image is generated by the MBR method in a game corresponding to a number of players which is larger than the threshold value, such as an opening ceremony, corresponding to an imaging number of 1, and therefore, the IBR method for generating a virtual viewpoint image with a smaller processing load using a number of captured images smaller than a number of captured images used in the generation of a 3D model employing the MBR method is associated.

A foreground/background transmission 46108 indicates settings of compression rates and frame rates (a unit is fps) of the foreground image (FG) and the background image (BG) which are separated from the captured image. Note that the foreground image is generated based on a foreground region extracted from the captured image for generation of a virtual viewpoint image and is transmitted in the image processing system 100. Similarly, the background image is generated and transmitted based on a background region extracted from the captured image. FIG. 47 is an operation sequence when information corresponding to an imaging number of 2 in the setting list is set to the devices included in the system in the pre-imaging workflow performed by the control station 310.

The control station 310 checks an estimated starting time of a game serving as a target of imaging specified using the stored setting list after the system operation is started (F47101). Thereafter, the control station 310 starts the setting process corresponding to the imaging number of 2 when a time point which is before the estimated starting time by a predetermined period of time is reached (F47102). The predetermined period of time described above is longer than a period of time required for the setting process performed based on the game information obtained by the control station 310 and varies depending on a type of a game serving as the imaging target. In this way, when the setting process is automatically started in a time point before start of the game by a predetermined period of time, the setting may be completed when the game is started without an instruction for starting settings by the operator. Note that, when an instruction for starting settings is issued by the user, the control station 310 may start the setting process irrespective of a start time of the game.

The setting process performed by the control station 310 includes a process of setting parameters associates with the image processing performed by the device which generates a virtual viewpoint image and a process of setting parameters associates with imaging performed by the cameras 112, for example. The parameters associated with the image processing specify a generation method to be used for the generation of a virtual viewpoint image from image data based on the imaging, for example. Furthermore, examples of the parameters associated with imaging include a direction of imaging of a camera and a zoom magnification. Note that content of the setting process is not limited to this, and may be a process of activating the devices included in the image processing system 100.

First, the control station 310 performs a gazing point setting (F47103). Thereafter, a request for setting a coordinate of a gazing point for each camera is transmitted to the camera adapter 120 (F47104). Here, the cameras 112 are grouped according to a gazing point, and a gazing point in the same coordinate is set to the cameras 112 included in the gazing point groups. The camera adapter 120 which has received the request for setting a virtual viewpoint coordinate for each camera transmits a camera-platform PT instruction request including an instruction for setting panning/tilting (PT) and an instruction for setting to the camera 112 and a lens, such as a lens low angle (F47105). The process in F47104 and F47105 is repeatedly performed for the number of sensor systems 110. Furthermore, the control station 310 sets information on a gazing point group for each camera to the front-end server 230 and the database 250 (F47106).

Next, the control station 310 sets a value obtained by the calibration (F47107). Specifically, information on a calibration file is set to all the sensor systems 110. The control station 310 transmits a calibration setting request to the camera adapters 120 (F47108). The camera adapters 120 which have received the request perform settings of imaging parameters, focusing, and zooming to the camera 112, the lenses, and the camera platform 113 (F47109). Furthermore, the control station 310 also transmits the calibration setting request to the front-end server 230 (F47110).

Subsequently, the control station 310 performs a setting of camera work (F47111). Then the control station 310 transmits a request for setting camera groups based on the gazing point, imaging ranges of the cameras 112, and a range of a virtual camera path to the back-end server 270 (F47112). The back-end server 270 requires information on the camera work for mapping a viewpoint path of the virtual camera 08001 from the virtual camera operation UI 330 to the physical cameras 112 so that an image is rendered. The back-end server 270 transmits a virtual camera attempt request to the virtual camera operation UI 330 so as to check a movable range of the virtual camera (F47113). Thereafter, the back-end server 270 receives a virtual camera operation notification from the virtual camera operation UI 330 (F47114). Here, the back-end server 270 determines that an effective image corresponding to a viewpoint position in accordance with the received virtual camera operation notification does not exist (F47115). Then the back-end server 270 transmits an error notification to the virtual camera operation UI 330 (F47116). The virtual camera operation UI 330 determines that the viewpoint may not be further moved in accordance with the error notification, operates the virtual camera to another viewpoint, and transmits a notification to the back-end server 270 (F47117). The back-end server 270 determines that an effective image corresponding to the viewpoint corresponding to the notification exists (F47118) and transmits a corresponding image response to the virtual camera operation UI 330 (F47119).

Next, the control station 310 performs a setting of an image generation algorithm (F47120). Then the control station 310 determines one of the algorithm methods, i.e., the IBR, the MBR, and the hybrid, and notifies the back-end server 270 of the determined algorithm method (F47121).

Thereafter, the control station 310 performs settings associated with a method for transmitting the foreground image and the background image (F47112). The control station 310 performs settings of compression rates of the foreground image (FG) and the background image (BG) and a frame rate (the number of frames per one second: fps) to the camera adapters 120 in accordance with the setting list. In FIG. 47, an instruction for setting a compression rate of FG of ⅓ compression and a frame rate of FG of 60 fps and information indicating that BG is not transmitted are supplied to the camera adapters 120 (F47123). In this case, since the background image is not transmitted from the camera adapter 120, the back-end server 270 may not obtain texture of the background at a time of rendering. Therefore, the control station 310 transmits an instruction for using a background 3D model, that is, an instruction for generating a background image based on a wire frame of a stadium shape to the back-end server 270 (F47124).

The imaging is continuously performed until the end time of the game while the processes described above are performed. Note that the game time may be extended, and therefore, the operator may finally determine stop of the imaging.

After the imaging is terminated, the control station 310 newly performs a system start process before an estimated start time of a next scene. Specifically, the control station 310 checks an estimated starting time of a scene having an imaging number of 3 (F47125), and performs a setting corresponding to the imaging number of 3 on the devices included in the system (F47126). Thereafter, the process described above is repeatedly performed in accordance with the setting list.

In this way, since the control station 310 automatically performs setting of the devices, the operator only performs a system starting operation and a system checking operation, and accordingly, operation of the operator associated with complicated imaging control may be simplified.

Figure 48:
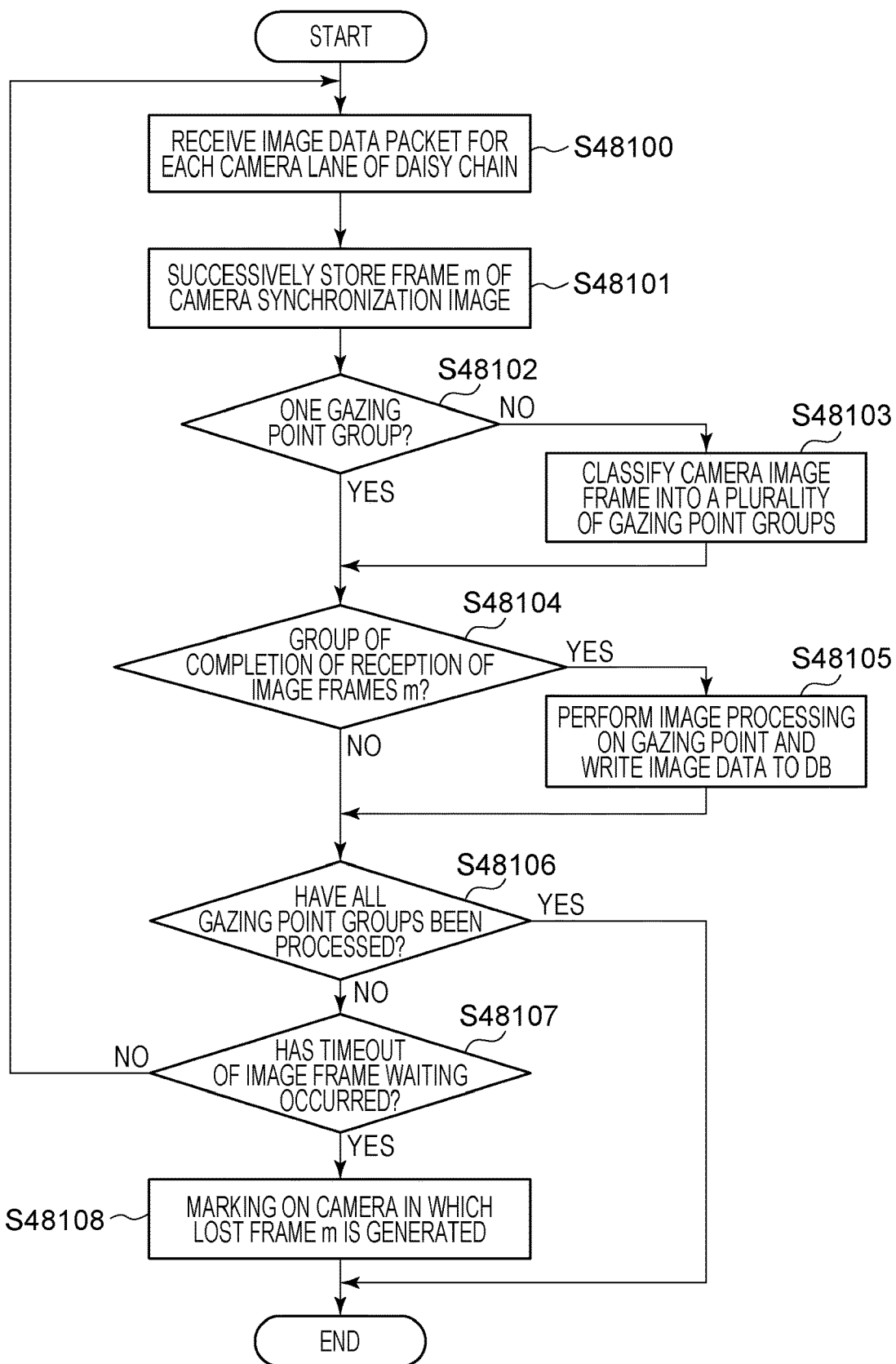
FIG. 48 is a flowchart of a data reception process performed by the front-end server.

FIG. 48 is a flowchart of reception control, performed by the front-end server 230, of a camera synchronization image frame m supplied from the camera adapter 120 through a lane of the daisy chain. In a case where the daisy chain is differently configured each half circumference or when the daisy chain is provided across a plurality of floors, it is possible that realization of generation of a virtual viewpoint image generation with little delay may become difficult, when the front-end server 230 waits for reception of the image data of all the camera 112. A method for reducing the possibility will be described hereinafter.

First, the front-end server 230 receives an image data packet for each camera lane of the daisy chain (S48100). Then camera synchronization image frames m are successively stored (S48101). Next, it is determined whether the number of gazing point group is 1 (S48102). When the determination is negative in step S48102, that is, in a case of a plurality of gazing point groups, the camera image frames are classified to a plurality of gazing point groups (S48103). Thereafter, the front-end server 230 determines whether at least one of the gazing point groups has completed reception of an image frame m in the cameras 112 (S48104). When the determination is affirmative, image processing is performed by the image processor 02150, the 3D model coupling unit 02160, the image coupling unit 02170, and the imaging data file generation unit 02180 for each gazing point group (S48105). Subsequently, the front-end server 230 determines whether image processing has been performed on all the gazing point groups. When the determination is negative (No in step S48106), the front-end server 230 determines whether a timeout for waiting for an image frame has occurred (S48107). A threshold value may be fixed in accordance with a unit time for one frame. When the determination is affirmative in step S48107, the front-end server 230 detects a lost image frame and marks a target frame of the camera 112 in which the lost occurs with information indicating the lost (S48108) and writes the image data in the database 250. By this, the back-end server 270 recognizes the lost of the image frame, and this is effective for the rendering process. Specifically, when mapping of the virtual camera and the real camera 112 specified by the virtual camera operation UI 330 is performed by the back-end server 270, the back-end server 270 may immediately determine an image of the camera 112 in which the lost has occurred. Therefore, when it is possible that the generated virtual viewpoint image fails, a correction process and the like may be automatically performed on an image output without visual contact of the operator.

Next, hardware configurations of the devices according to this embodiment will be described in detail. As described above, in this embodiment, the case where the camera adapter 120 implement hardware, such as FPGA and/or ASIC, and the hardware executes the various processes described above is mainly illustrated. This is true to the various devices included in the sensor system 110, the front-end server 230, the database 250, the back-end server 270, and the controller 300. However, at least some of the devices may use a CPU, a GPU, a DSP, or the like for executing the process of this embodiment by a software process.

Figure 2:
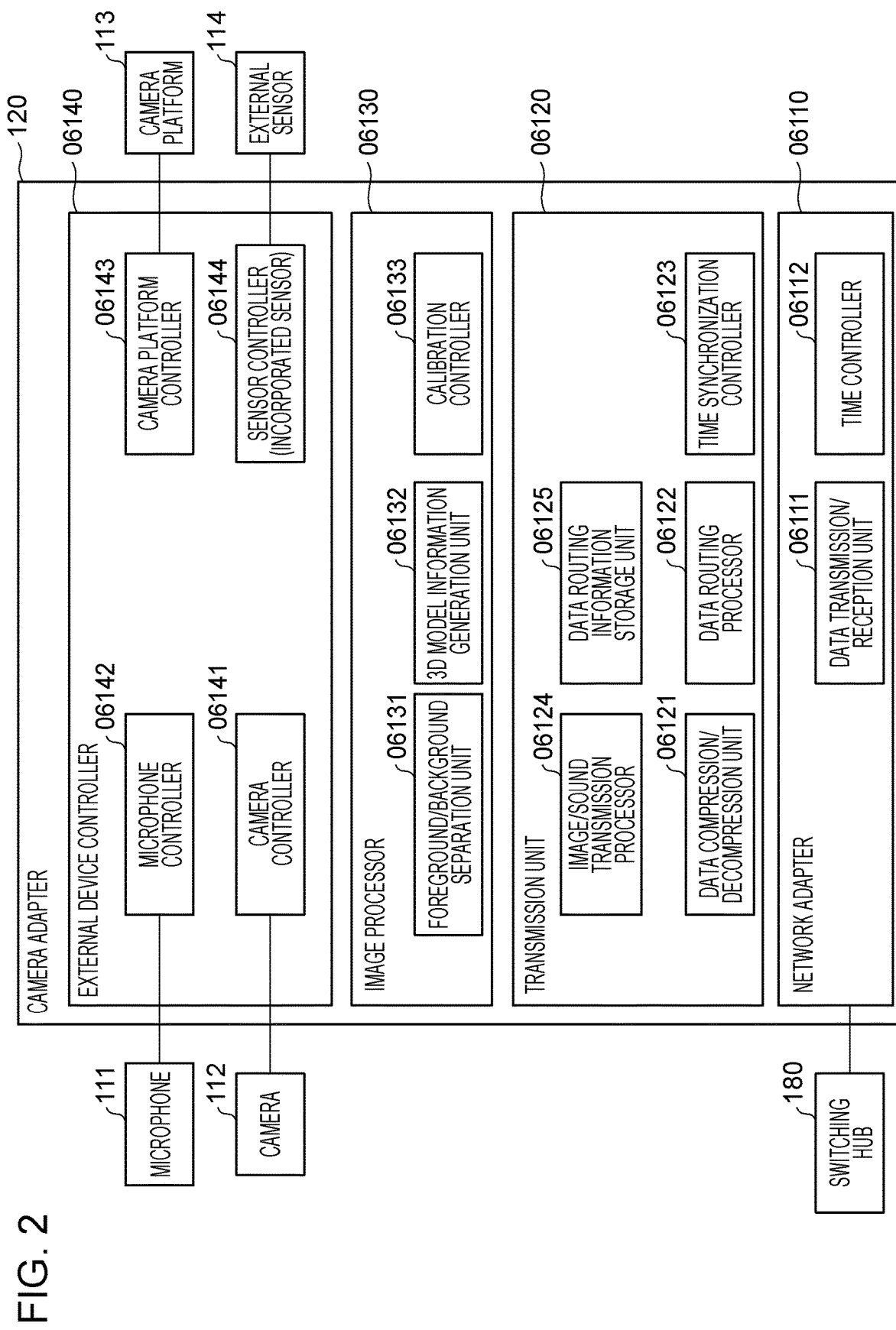
FIG. 2 is a block diagram illustrating a functional configuration of a camera adapter.
Figure 49:
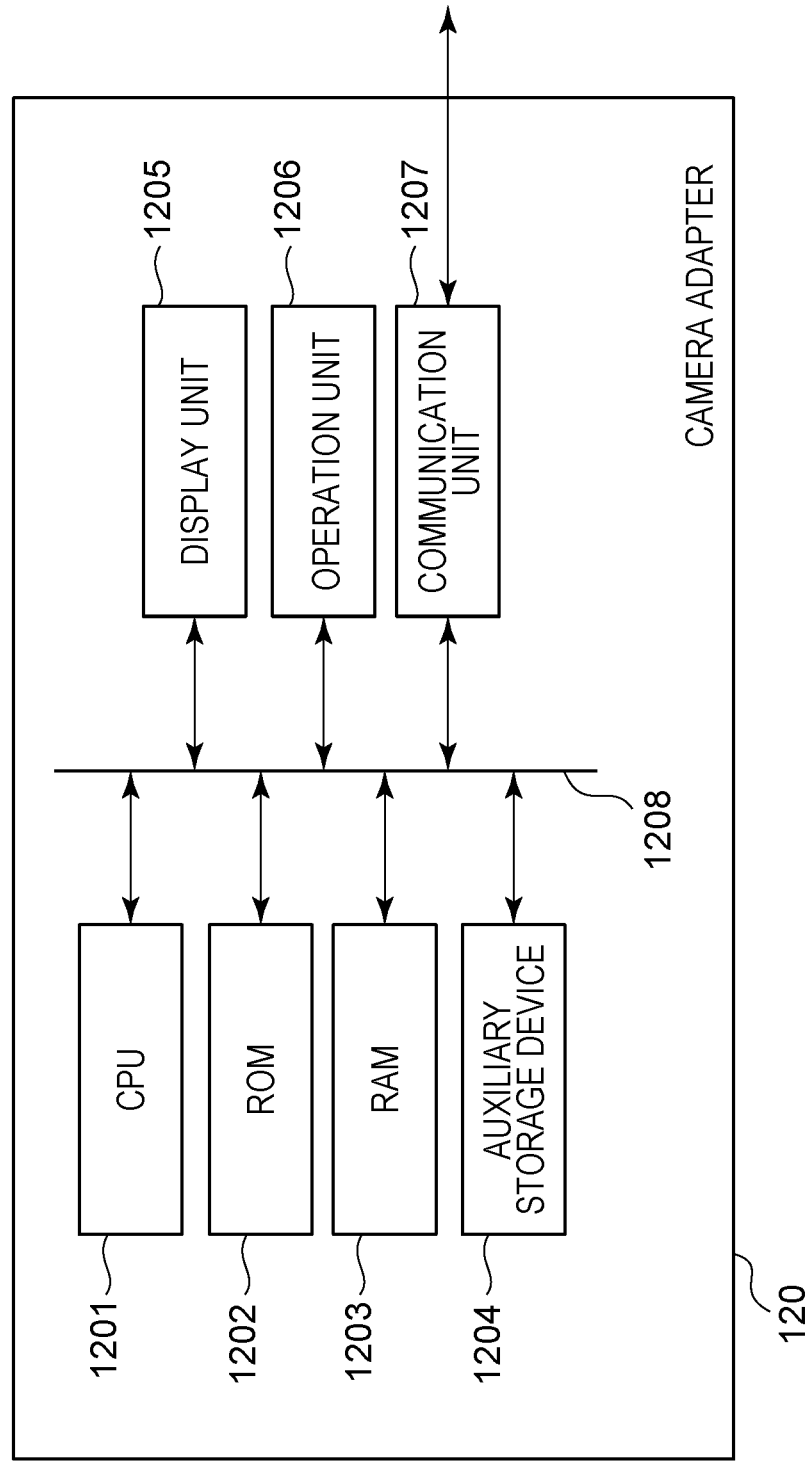
FIG. 49 is a block diagram illustrating a hardware configuration of the camera adapter.

FIG. 49 is a block diagram illustrating a hardware configuration of the camera adapter 120 for realizing the functional configuration illustrated in FIG. 2 by a software process. Note that the front-end server 230, the database 250, the back-end server 270, the control station 310, the virtual camera operation UI 330, and the end-user terminal 190 may be the hardware configuration of FIG. 49. The camera adapter 120 includes a CPU 1201, a ROM 1202, a RAM 1203, an auxiliary storage device 1204, a display unit 1205, an operation unit 1206, a communication unit 1207, and a bus 1208.

The CPU 1201 controls the entire camera adapter 120 using computer programs and data stored in the ROM 1202 and the RAM 1203. The ROM 1202 stores programs and parameters which are not required to be changed. The RAM 1203 temporarily stores programs and data supplied from the auxiliary storage device 1204 and data externally supplied through the communication unit 1207. The auxiliary storage device 1204 is constituted by a hard disk drive, for example, and stores content data, such as still images and moving images.

The display unit 1205 is constituted by a liquid crystal display or the like, and displays graphical user interface (GUI) used by the user to operate the camera adapter 120. The operation unit 1206 is constituted by a keyboard or a mouse, for example, and supplies various instructions to the CPU 1201 in response to user operations. The communication unit 1207 communicates with external devices, such as the camera 112 and the front-end server 230. In a case where the camera adapter 120 is connected to an external device in a wired manner, for example, a LAN cable and the like are connected to the communication unit 1207. Note that in a case where the camera adapter 120 has a function of realizing wireless communication with an external device, the communication unit 1207 has an antenna. The bus 1208 is used to connect the portions of the camera adapter 120 so as to transmit information.

Note that a portion of the process performed by the camera adapter 120 may be performed by FPGA, and the other portion of the process may be realized by the software process using the CPU. Furthermore, components of the camera adapter 120 illustrated in FIG. 49 may be configured by a single electron circuit or a plurality of electron circuits. For example, the camera adapter 120 may include a plurality of electron circuits operating as the CPU 1201. When the plurality of electron circuits perform the process as the CPU 1201 in parallel, a processing speed of the camera adapter 120 may be improved.

Furthermore, although the display unit 1205 and the operation unit 1206 of this embodiment are included in the camera adapter 120, the camera adapter 120 may not include at least one of the display unit 1205 and the operation unit 1206. At least one of the display unit 1205 and the operation unit 1206 may be disposed outside the camera adapter 120 as an independent device, and the CPU 1201 may function as a display controller which controls the display unit 1205 and an operation controller which controls the operation unit 1206. The other devices included in the image processing system 100 function in the same way. Furthermore, the front-end server 230, the database 250, and the back-end server 270 may not include the display unit 1205 but the control station 310, the virtual camera operation UI 330, and the end-user terminal 190 may include the display unit 1205, for example. Furthermore, the case where the image processing system 100 is installed in facilities, such as a stadium or a concert hall, is mainly described as an example in this embodiment. Examples of other facilities include amusement parks, play grounds, racetracks, bicycle racetracks, casinos, pools, ice links, ski areas, and clubs with live music. Furthermore, events held in various facilities may be indoor events or outdoor events. Furthermore, the facilities in this embodiment may be open temporarily (for an only limited time).

According to the embodiment described above, a virtual viewpoint image may be easily generated irrespective of scales of devices included in a system, such as the number of cameras 112, output resolution of captured images, and an output frame rate. Although the embodiment of the present invention has been described hereinabove, the present invention is not limited to the foregoing embodiment, and various modifications and changes may be made within the scope of the present invention set forth in claims.

According to the embodiment described above, in generation of a virtual viewpoint image, a viewpoint may be specified in a range which is changed depending on a situation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-104431, filed May 25, 2016, which is hereby incorporated by reference herein in its entirety.

The invention claimed is:

1. An information processing apparatus comprising:
one or more memories storing instructions; and
one or more processors executing the instructions to:
determine, based on a condition of imaging by a plurality of imaging apparatuses, a generation method for generating a virtual viewpoint image using image data obtained by performing imaging from a plurality of directions using the plurality of imaging apparatuses, from among a plurality of generation methods including a first generation method for generating a virtual viewpoint image using a 3D model generated based on a plurality of images of an object captured from a plurality of directions and a second generation method for generating a virtual viewpoint image based on at least one or a number of captured images which is smaller than the number of the plurality of captured images for generation of the 3D; and
output data in accordance with the determination.

2. The information processing apparatus according to claim 1, wherein the one or more processors further execute the instructions
to generate a virtual viewpoint image using the determined generation method,
wherein the generated virtual viewpoint image is output as the data.

3. The information processing apparatus according to claim 1, wherein information for specifying the determined generation method is output as data to at least one of a storage device connected to the information processing apparatus through a network and an image generation apparatus which generates a virtual viewpoint image.

4. The information processing apparatus according to claim 1, wherein the condition of imaging by a plurality of imaging apparatuses includes the number of imaging apparatuses which perform imaging.

5. The information processing apparatus according to claim 1, wherein the generation method to be used for generation of a virtual viewpoint image using the image data is determined from among a plurality of generation methods in accordance with a specified condition of a virtual viewpoint associated with the generation of a virtual viewpoint image.

6. The information processing apparatus according to claim 1, wherein the generation method to be used for the generation of a virtual viewpoint image using the image data is determined as the first generation method, when a height of a virtual viewpoint is specified.

7. The information processing apparatus according to claim 1, wherein the generation method to be used for the generation of a virtual viewpoint image using the image data is determined as the first generation method when the number of cameras to be used for imaging is equal to or smaller than a threshold value, and determines the generation method to be used for the generation of a virtual viewpoint image using the image data as the second generation method when the number of cameras to be used for imaging is larger than the threshold value.

8. An information processing apparatus comprising:
one or more memories storing instructions; and
one or more processors executing the instructions to:
determine, based on a condition of imaging by a plurality of imaging apparatuses, a generation method for generating a virtual viewpoint image using image data obtained by performing imaging from a plurality of directions using the plurality of imaging apparatuses, from among a plurality of generation methods, wherein different generation methods to be used for generation of different portions of a virtual viewpoint image is determined; and
output data in accordance with the determination.

9. The information processing apparatus according to claim 1, wherein the condition of imaging by the plurality of imaging apparatuses includes operation states of the cameras.

10. The information processing apparatus according to claim 9, wherein the operation states includes at least one of a normal state in which imaging is normally performed, a failure state in which imaging is restricted, a boot preparation state in which a process of starting imaging is performed, and a reboot state in which a predetermined initial setting is performed.

11. A information processing apparatus comprising:
one or more memories storing instructions; and
one or more processors executing the instructions to:
determine a generation method for generating a virtual viewpoint image using image data obtained by performing imaging from a plurality of directions using the plurality of imaging apparatuses, from among a plurality of generation methods, based on a specified condition of a virtual viewpoint associated with the generation of a virtual viewpoint image, wherein the specified condition of the virtual viewpoint includes at least one of a method for specifying a virtual viewpoint and a type of a specifying device which specifies a virtual viewpoint; and
output data in accordance with the determination.

12. A method for controlling an information processing apparatus, the method comprising:
determining, based on a condition of imaging by a plurality of imaging apparatuses, a generation method for generating a virtual viewpoint image using image data obtained by performing imaging from a plurality of directions using the plurality of imaging apparatuses, from among a plurality of generation methods including a first generation method for generating a virtual viewpoint image using a 3D model generated based on a plurality of images of an object captured from a plurality of directions and a second generation method for generating a virtual viewpoint image based on at least one or a number of captured images which is smaller than the number of the plurality of captured images for generation of the 3D model; and
outputting data in accordance with the determination.

13. A non-transitory storage medium storing a program that causes a computer to execute an image generation method, the image generation method comprising:
determining, based on a condition of imaging by a plurality of imaging apparatuses, a generation method for generating a virtual viewpoint image using image data obtained by performing imaging from a plurality of directions using the plurality of imaging apparatuses, from among a plurality of generation methods including a first generation method for generating a virtual viewpoint image using a 3D model generated based on a plurality of images of an object captured from a plurality of directions and a second generation method for generating a virtual viewpoint image based on at least one or a number of captured images which is smaller than the number of the plurality of captured images for generation of the 3D model; and
generating a virtual viewpoint image using the determined generation method.

* * * * *